United States Patent
Kirchhoffer et al.

(10) Patent No.: US 6,292,731 B1
(45) Date of Patent: Sep. 18, 2001

(54) AUTOMATIC SHIFT CONTROL SYSTEM FOR AN AUTOMATIC TRANSMISSION INCLUDING A SELECT-SHIFT MANUAL CONTROL

(75) Inventors: Johann Kirchhoffer, Kapuzinerstrasse; Werner Croonen, Koppelsweg, both of (DE); Eric Reichert, Abattoirs (FR); Thomas Wagner, Northville, MI (US); Scott Raymond Crandall, Wixom, MI (US); Robert Cary Haase, Southfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/123,040

(22) Filed: Jul. 27, 1998

(51) Int. Cl.$^7$ .............................. F16H 61/08; F16H 61/30
(52) U.S. Cl. ............................. 701/55; 701/51; 475/149; 477/296; 74/733
(58) Field of Search ........................ 701/55, 51; 475/116, 475/153, 159

(56) References Cited

U.S. PATENT DOCUMENTS

| | | | |
|---|---|---|---|
| 4,817,473 | * 4/1989 | Baltusis et al. | ............ 74/869 |
| 5,553,694 | 9/1996 | Schulz et al. | . |
| 5,586,029 | 12/1996 | Schulz et al. | . |
| 5,612,874 | * 3/1997 | Schulz et al. | ............ 364/424.08 |
| 5,642,283 | * 6/1997 | Schulz et al. | ............ 364/424.08 |
| 5,646,842 | 7/1997 | Schulz et al. | . |
| 5,722,519 | 3/1998 | Kirchhoffer et al. | . |
| 5,758,302 | * 5/1998 | Schulz et al. | ............ 701/51 |
| 6,007,445 | * 12/1999 | Kirchhoffer et al. | ............ 475/116 |

OTHER PUBLICATIONS

"Porsch Tiptronic", Von Ulrich Maier et al, Automobiltechnische Zeltschrift 92, 1990, pp. 308–319, including German-to-English translation.

* cited by examiner

Primary Examiner—William A. Cuchlinski, Jr.
Assistant Examiner—Tuan C To
(74) Attorney, Agent, or Firm—Frank G. McKenzie

(57) ABSTRACT

A multiple ratio automatic transmission control system for an automotive vehicle comprising a multiple ratio gear set and a simple planetary gear set arranged in series. The control system has multiple control modes including an automatic control mode in which upshifts and downshifts between adjacent ratios are achieved by engaging and releasing friction clutches and brakes in the simple planetary gear set and in the multiple ratio gear set and wherein a manual shift control mode includes a select-shift control. Engine braking is available in each gear for both operating modes. In the select-shift manual control mode, a particular gear can be chosen by the operator for continuous single-ratio operation. The control system includes variable force solenoids that are multiplexed in combination with pressure modulator valves for achieving each operating mode.

17 Claims, 60 Drawing Sheets

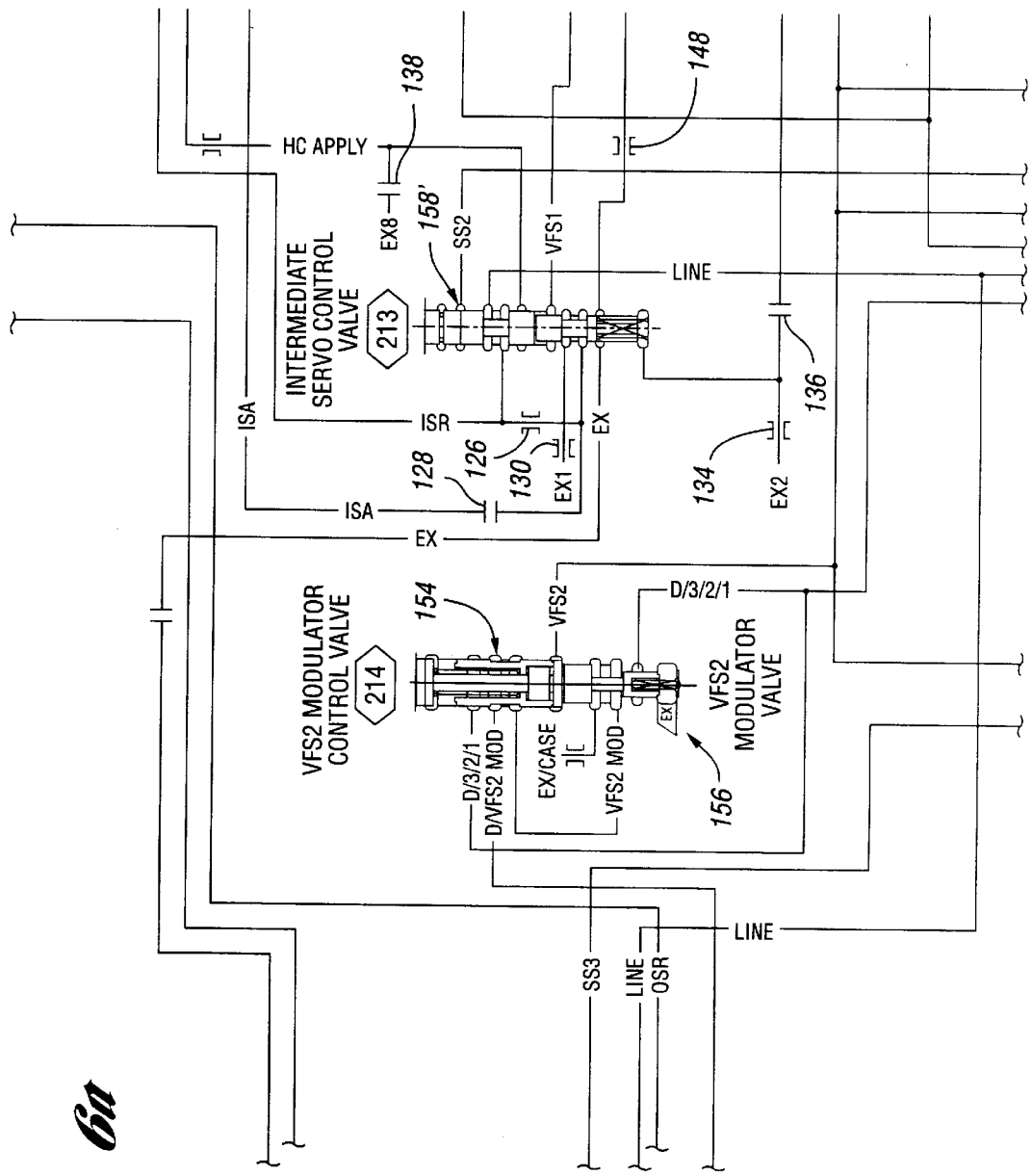

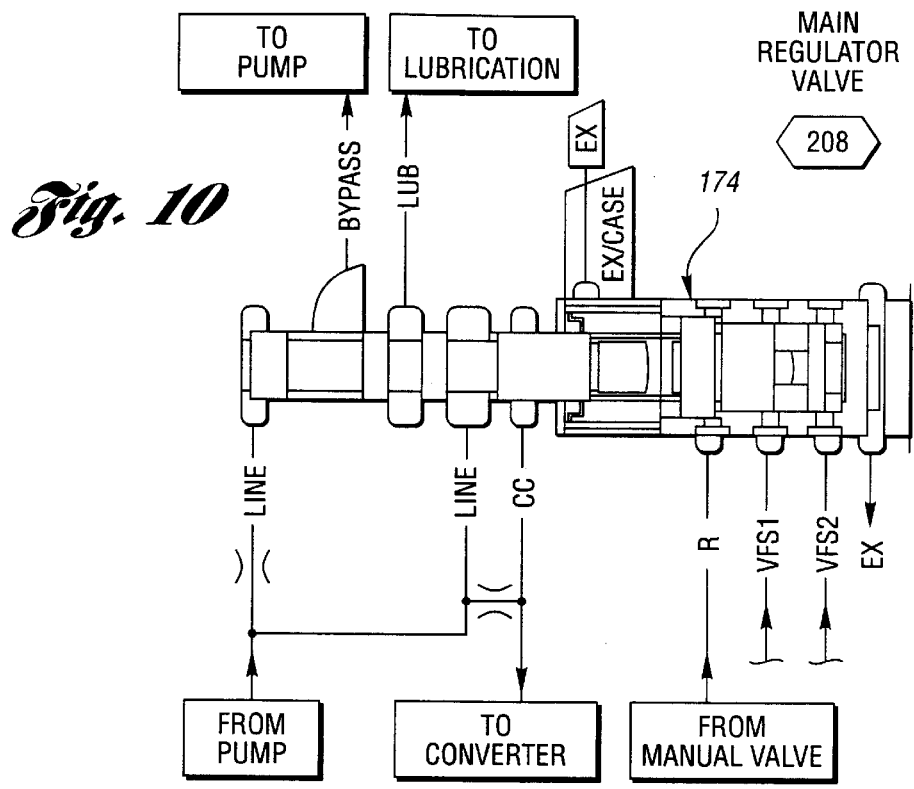
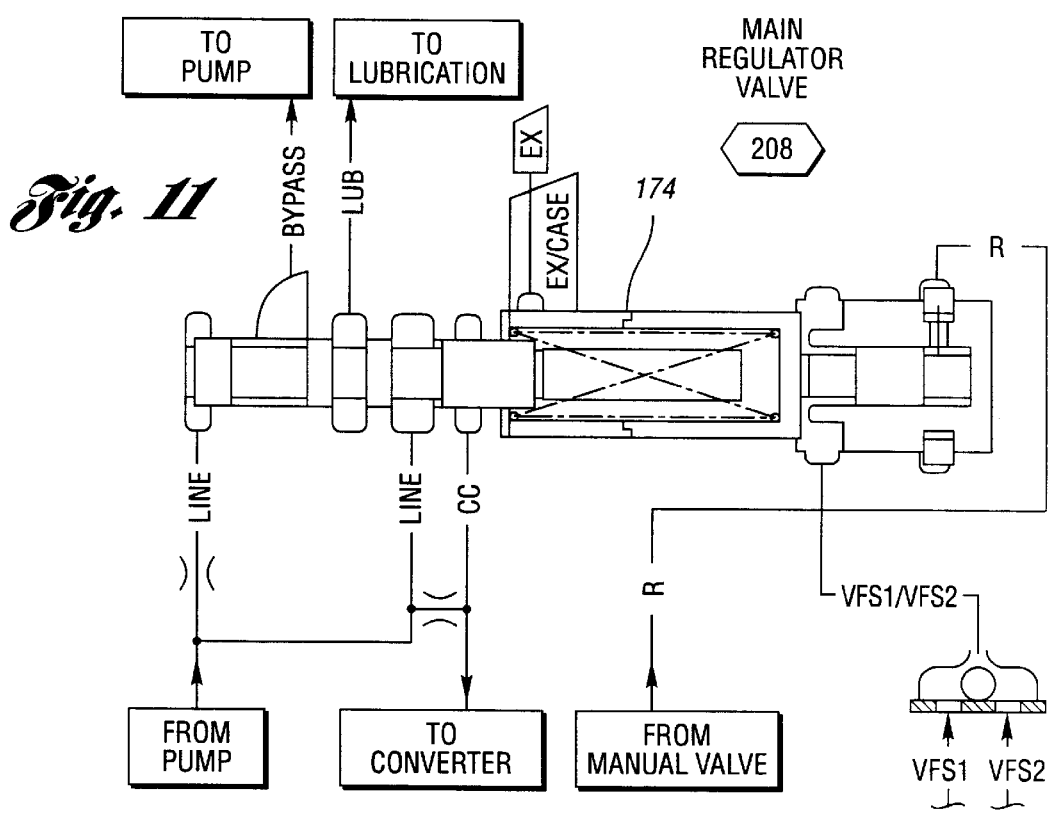

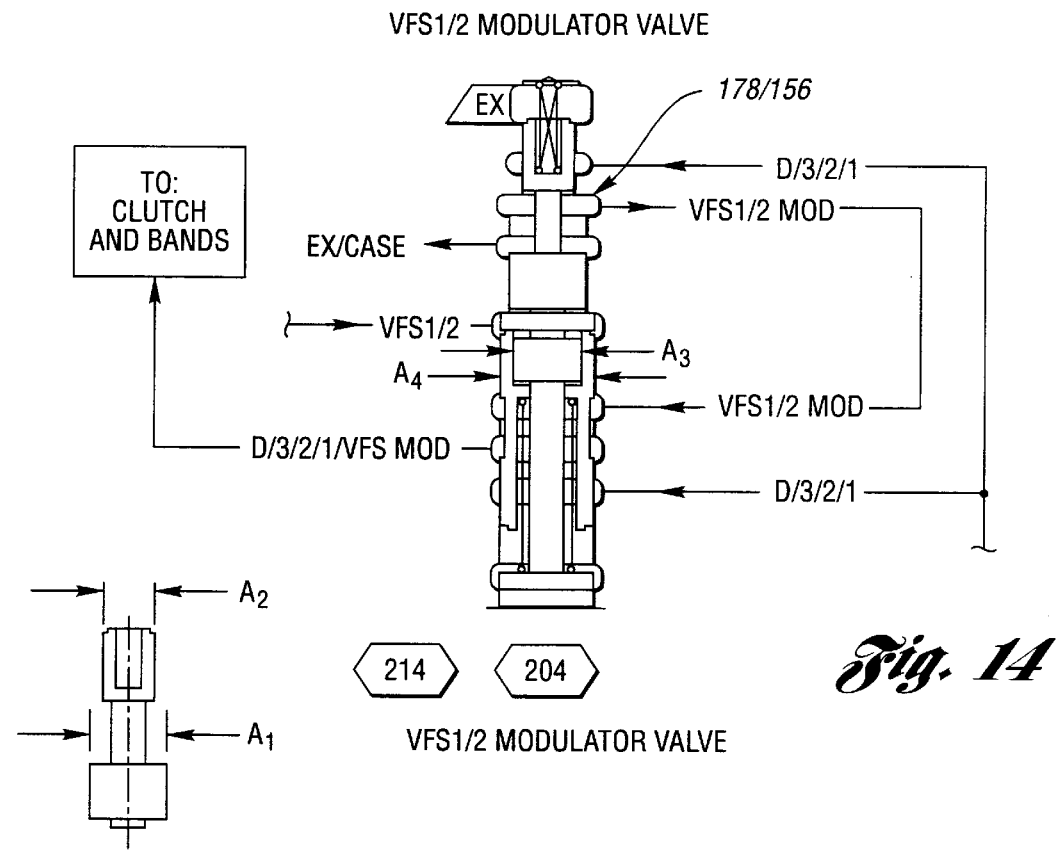
*Fig. 14*
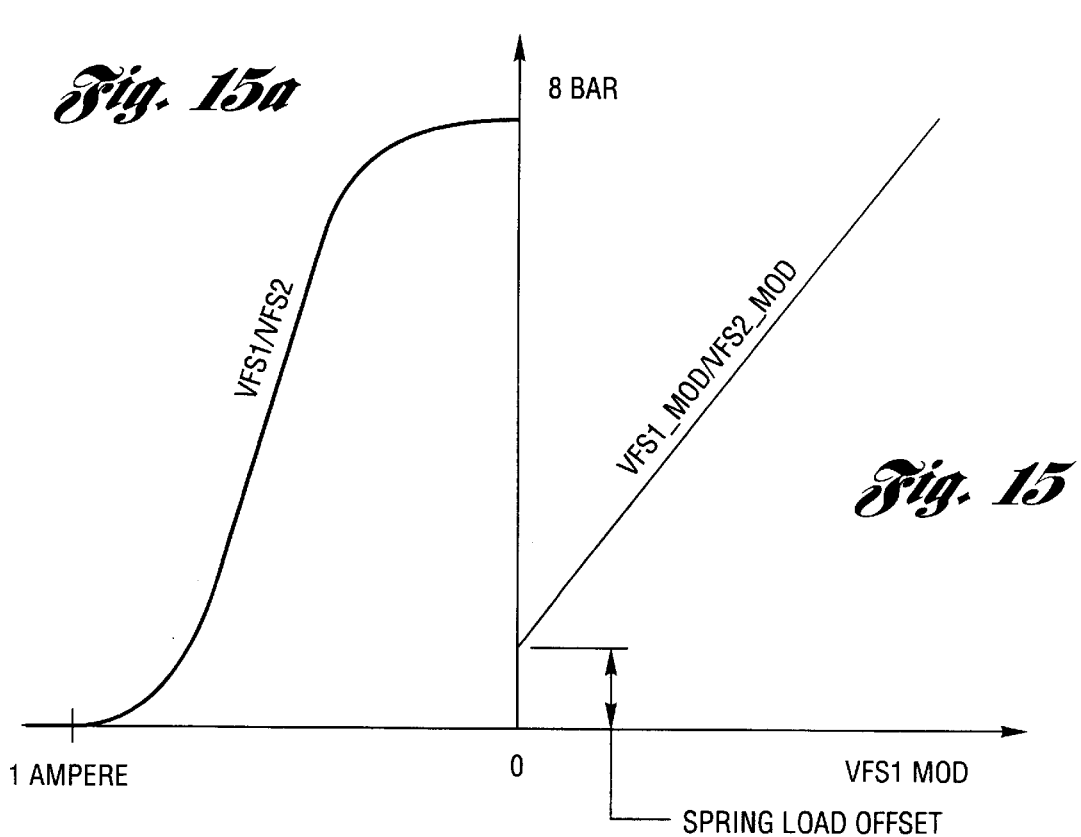
*Fig. 15a*
*Fig. 15*

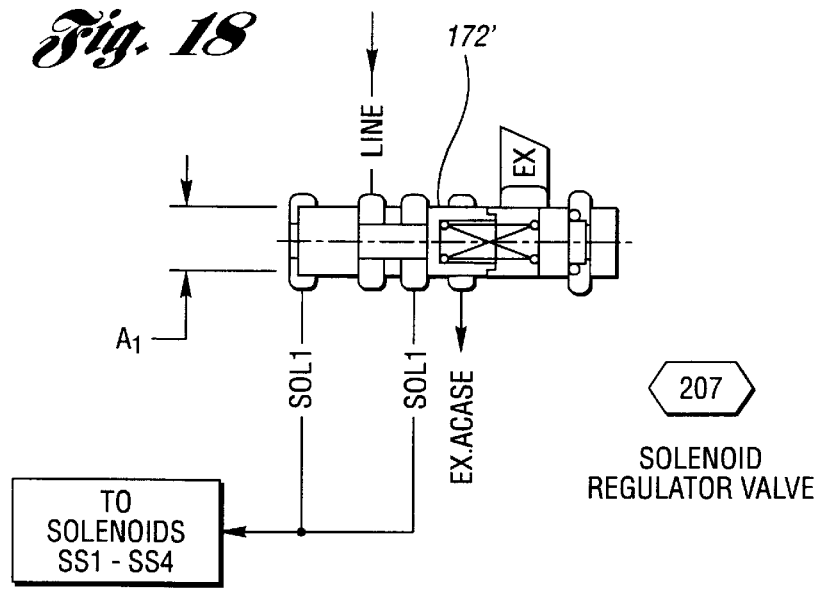
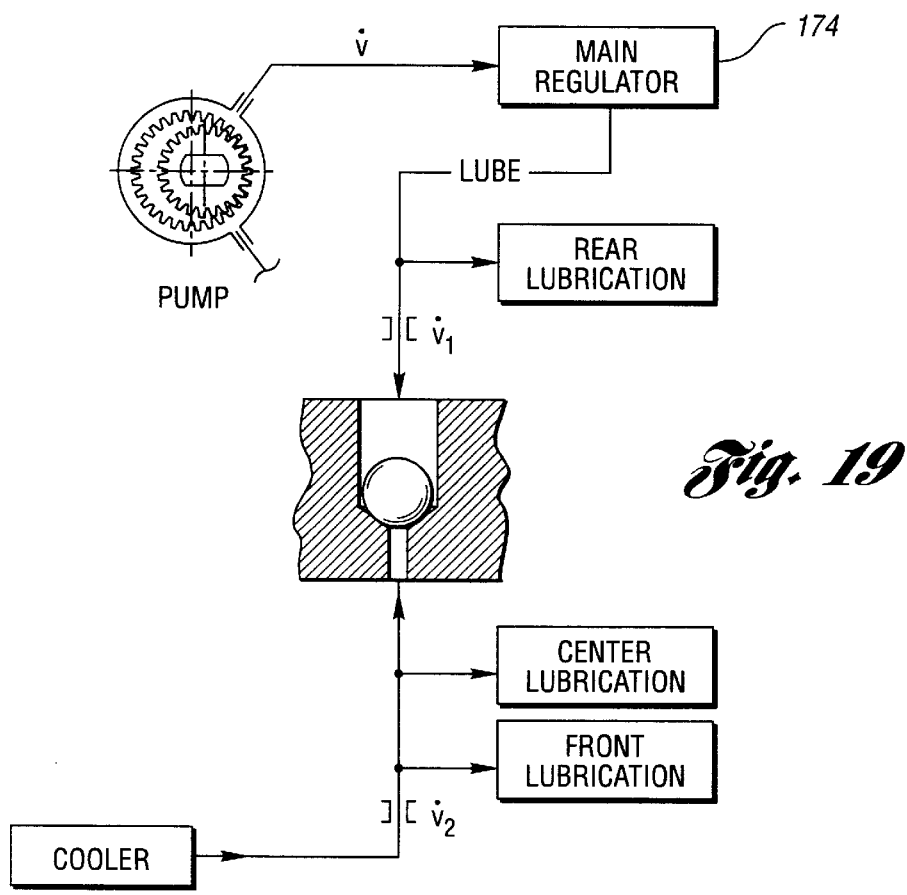

AUTOMATIC SHIFT CONTROL SYSTEM FOR AN AUTOMATIC TRANSMISSION INCLUDING A SELECT-SHIFT MANUAL CONTROL

TECHNICAL FIELD

The invention comprises an automatic transmission control system capable of providing an automatic ratio changing mode and manual ratio selection modes.

BACKGROUND OF THE INVENTION

The invention comprises improvements in an automatic transmission control system of the kind shown in U.S. Pat. Nos. 5,612,874; 5,586,029; and 5,642,283. Each of these prior art patents is assigned to the assignee of the present invention. Their disclosures are incorporated in this disclosure by reference.

The present invention includes features that are common to each of the prior art patents identified above. The '874 patent describes an automatic upshift and downshift control for a four-speed ratio version of the transmission gearing of the present invention. The control includes a pressure build-up system with one variable force solenoid. The electronic control pressure that responds to control strategy executed by an electronic microprocessor is distributed to a booster valve in the main regulator valve system. The main regulator valve effects control of the brake capacity and clutch capacity for all operating conditions. The regulator valve system can be calibrated to provide appropriate pressure needed for achieving the smooth ratio changes without affecting the control strategy required to maintain clutch and brake capacity under stall conditions. Conventional accumulators are not required to soften the engagement of the clutch and the brakes since the pressure boost system is capable of adjusting the capacity of the main regulator valve to achieve optimum upshift and downshift smoothness. A separate valve system is used for forward drive engagements and for reverse drive engagements.

The '029 patent describes a transmission having a compound multiple ratio gear set in combination with a simple planetary gear set as in the case of the present invention. A first overrunning coupling establishes a reaction element for the simple planetary gear set and a second overrunning coupling in the multiple ratio gear set is used for the purpose of establishing non-synchronous shifts in the multiple ratio gear set. In each instance, a forward engagement is obtained by engaging a forward clutch. A separate reverse engagement clutch is used to establish a torque flow path for reverse. In each instance, turbine speed is used as a feedback signal to initiate the start of either the forward engagement or the reverse engagement.

The '283 patent, like the '874 and the '029 patents, has a three-speed ratio gear set in series with a simple planetary gear set. It provides five forward driving ratios, however, rather than four. So-called "swap-shifts" are achieved as the multiple ratio gear set is upshifted and the simple planetary gear set is downshifted. Conversely, an upshift of the simple planetary gear set occurs as the multiple ratio gear set is downshifted. The torque reaction point for the overall transmission gearing is transferred from the multiple ratio gear set to the simple planetary gear set on a downshift and is transferred from the simple planetary gear set to the multiple ratio gear set on an upshift.

BRIEF DESCRIPTION OF THE INVENTION

The control system of the present invention is capable of being used with five-speed gearing as well as four-speed gearing such as that described in the '874, '029 and '283 patents. It is capable of being used also with a five-speed transmission gear system that employs synchronous 3–4 upshifts and 4–3 downshifts using the swap-shift technique described in the preceding discussion and with a transmission having a mechanically synchronized 3–4 upshift and a 4–3 downshift using an overrunning coupling on the reaction elements to achieve non-synchronous ratio changes. A control system having common elements may be used for both transmission versions. The valve system can be designed with reduced complexity because of the common functions of the valve elements.

Each of the control systems is capable of providing a so-called "select-shift" manual control mode as well as a manual control mode and a fully automatic control mode. The synchronous swap-shifts between the second and the third ratio and between the third ratio and the second ratio and the non-synchronous upshifts and downshifts between the first and second ratios and between the fourth and the fifth ratios are common for each of these control modes. Engine braking may be provided in each gear in the select-shift manual control mode as well as in the manual control mode. Free-wheeling is available when the transmission is in the so-called automatic control mode.

All of these functions can be achieved by the control system of the present invention using only three variable force solenoids. The variable force solenoids are multiplexed in cooperation with pressure modulator valves for the clutches and brakes. For purposes of this disclosure, the verb "multiplexed" is used in describing variable force solenoids that have multiple functions depending upon the operating mode that is selected by the vehicle operator, thereby eliminating the need for providing a separate variable force solenoid for each function.

The invention includes further an improved main regulator valve system using two variable force solenoids with a main regulator valve, which ensures a sufficiently high feed pressure to protect the forward clutch capacity. Separate on/off solenoids are used to control the operation of shift valves, which in turn distribute control pressure to the transmission clutches and brakes. A separate on/off solenoid is used to control the braking of the reaction element in the simple planetary gear unit and in the multiple ratio gear unit.

BRIEF DESCRIPTION OF THE DRAWINGS

FIGS. 5a, 5b, 5c and 5d show the overall control system for the non-synchronous version of the transmission gearing shown in schematic form in FIG. 1;

FIGS. 6a and 6b show a control valve system for a synchronous version of the transmission gearing shown in schematic form in FIG. 2;

FIGS. 7a, 7b, 7c and 7d show the overall control valve system for the synchronous transmission gearing of FIG. 2 including a modified main regulator, pressure modulator valve for reverse and engagement control valve for reverse;

FIG. 10 is a detailed view of the main regulator valve used in the overall control valve system;

FIG. 11 is an optional design for the main regulator valve;

FIG. 14 is a detailed view of the variable force solenoid modulator control valve for the non-synchronous version of the transmission gearing;

FIG. 15 is a plot showing the characteristic for the modulator valve of FIG. 14;

FIG. 15a is a detailed view of the modulator valve element of FIG. 14;

FIG. 18 is a solenoid regulator valve for the transmission gearing of both FIGS. 1 and 2;

FIG. 19 is a lubrication oil flow circuit for the transmission schematically shown in FIG. 2;

FIGS. 25a and 25b show a shift control system corresponding to FIGS. 22a through 24b wherein the gear elements are positioned for operation in fourth gear, automatic drive mode, select-shift manual mode (SSM4) and wherein the overdrive cancel switch is on;

FIGS. 30a and 30b show a shift control valve system for the transmission of FIG. 2 corresponding to the control valve system of FIGS. 27a through 29b showing the valve elements positioned for automatic drive mode fourth ratio, select-shift manual mode fourth ratio, and wherein the overdrive cancel switch is on;

PARTICULAR DESCRIPTION OF THE INVENTION

Figure 1:
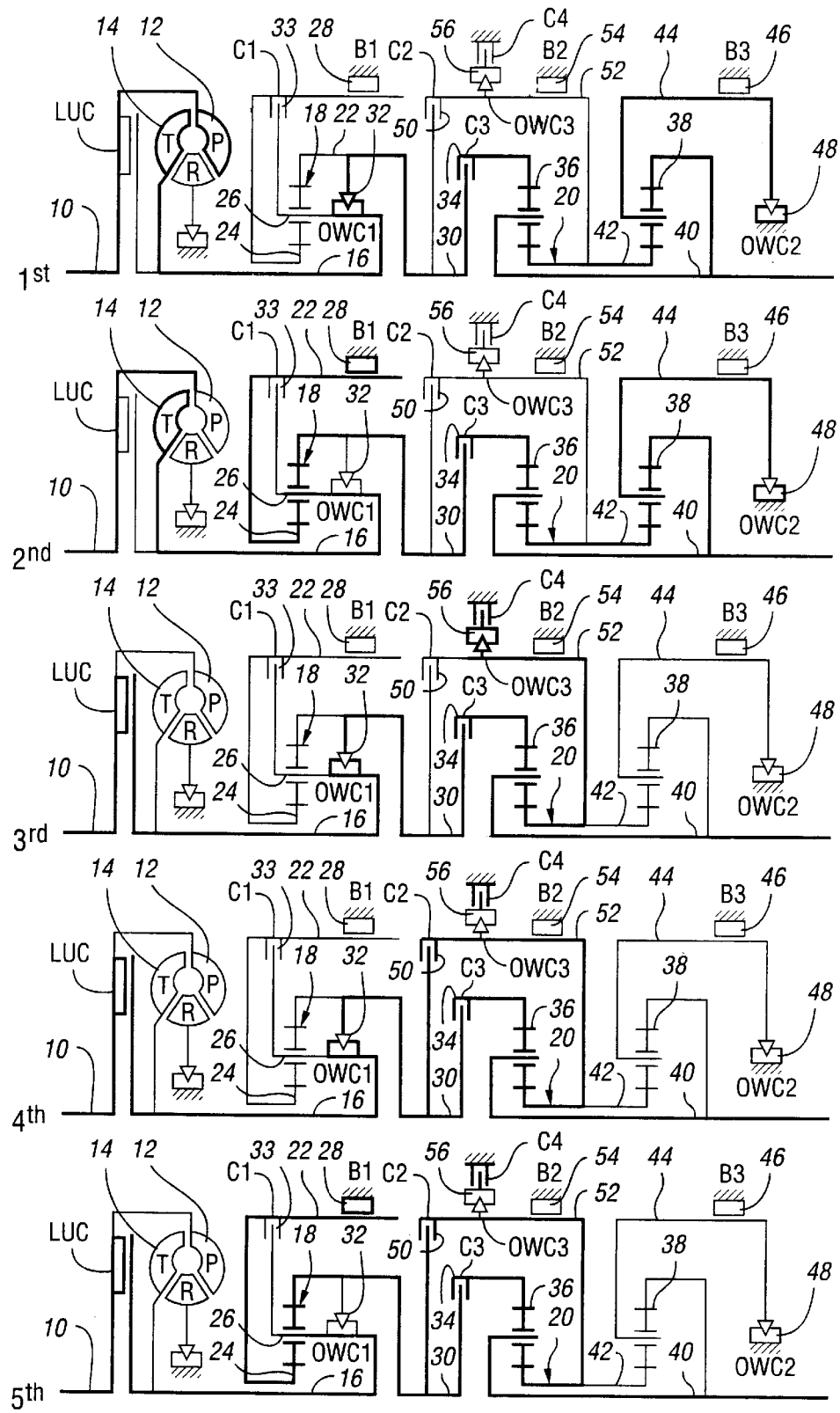
FIG. 1 shows a schematic diagram of a transmission gear system having a multiple ratio gear set and a simple planetary gear set wherein a reaction element for the multiple ratio gear unit during ratio changes between the third ratio and the fourth ratio includes an overrunning coupling to achieve non-synchronous ratio changes.
Figure 2:
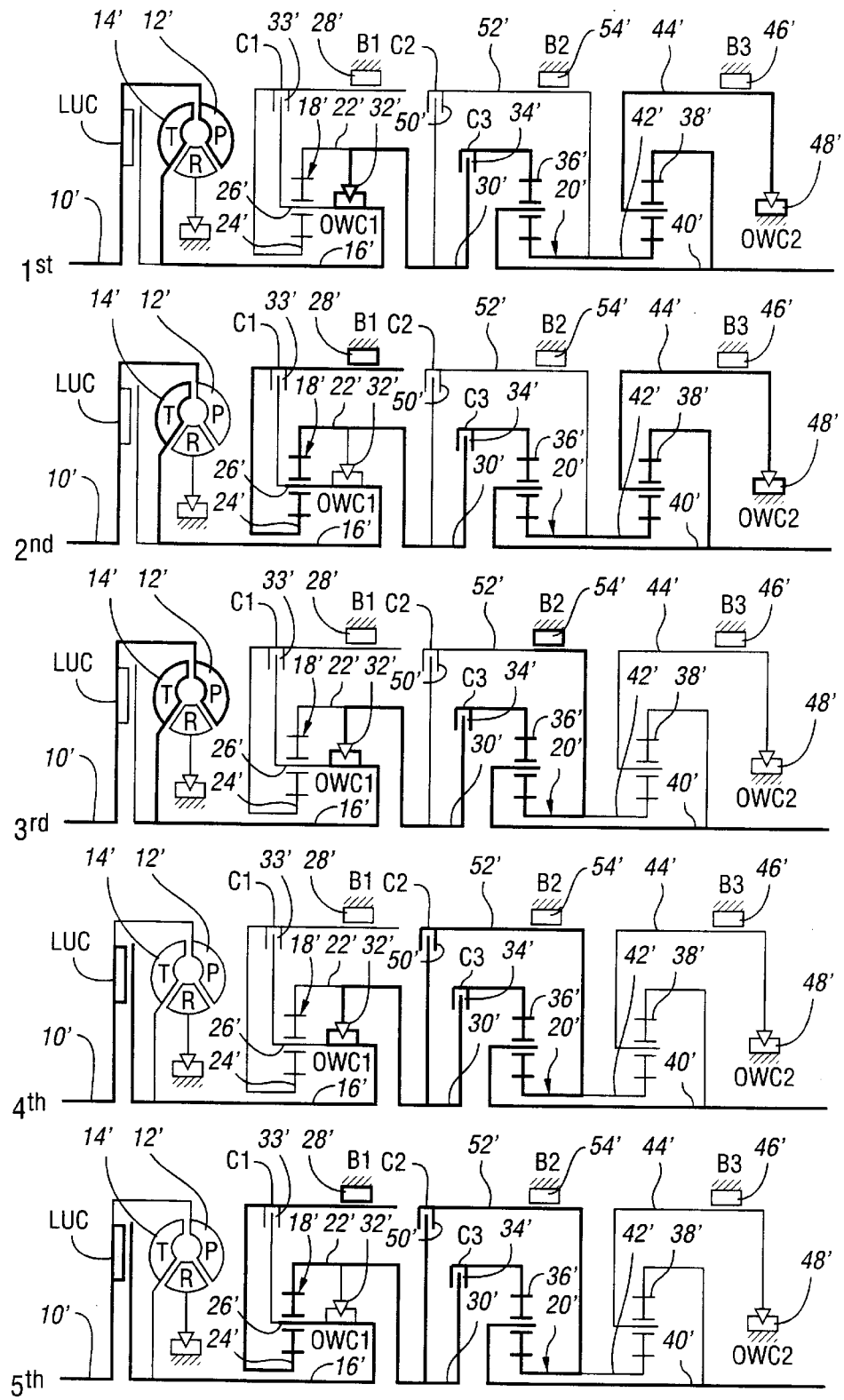
FIG. 2 is a schematic diagram of a transmission mechanism capable of providing 3–4 and 4–3 synchronous shifts without the necessity for using an overrunning coupling for the reaction element of the multiple ratio gear unit during non-synchronous ratio changes between the third ratio and the fourth ratio.

FIG. 1 shows in schematic form an automatic transmission with a non-synchronous shift between the third and the fourth ratios. FIG. 2 is a synchronous shift version of the transmission. Each transmission has five speed ratios in the forward drive mode and a single reverse ratio.

The engine of the vehicle has a crankshaft 10 that is drivably connected to the impeller or pump of a hydrokinetic torque converter, shown at 12. The turbine of the torque converter, shown at 14, is connected to turbine shaft 16, which serves as a torque input shaft for the planetary gearing.

The planetary gearing comprises a simple planetary gear set 18 and a multiple-ratio, compound planetary gear set 20. Gear set 18 has a ring gear 22, a sun gear 24, and a carrier for planetary pinions as shown at 26. The carrier 26 is connected drivably to the turbine shaft 16.

A first friction brake 28 surrounds a brake drum drivably connected to sun gear 24. When brake 28, which carries the symbol B1, is applied, ring gear 22 is overdriven relative to the turbine shaft 16. When brake 28 is released, turbine shaft 16 is connected directly to shaft 30 through an overrunning coupling 32.

A coast clutch 33 drivably connects the carrier 26 with the sun gear 24, thereby locking the elements of the gear unit 18 together so that it can accommodate reverse torque delivery during engine braking. A forward clutch 34 connects shaft 30 to the ring gear 36 of the planetary gear set 20. A second ring gear 38 of the planetary gear set 20 is connected drivably to output shaft 40 as is the carrier for the planetary pinions engaging ring gear 36. The sun gears are connected to a common sun gear shaft 42. The carrier for the gear set 20 is connected to a brake drum 44, which is anchored selectively by brake band 46, also identified as brake B3. Brake band 46 is engaged during reverse drive. During forward drive in the automatic operating mode, brake drum 44 is braked by overrunning coupling 48.

A high clutch 50 connects the shaft 30 with a common sun gear shaft 42. During operation in the fourth and fifth ratios, sun gear shaft 42 is connected to brake drum 52, which in turn is selectively anchored by intermediate speed ratio brake band 54 to provide a torque reaction during coasting. Brake drum 52, during forward drive operation, is anchored by intermediate brake 56, which serves as an overrunning coupling for accommodating torque reaction. During intermediate speed ratio operation, the overrunning coupling portion of the brake, which carries the symbol C4, is identified as overrunning coupling OWC3. The overrunning coupling 32 for the simple planetary gear set is identified in the drawings as OWC1. The reaction coupling 48 is identified in the drawings as OWC2.

The five schematic illustrations of FIG. 1 show with heavy lines the elements that are subjected to torque. The light lines illustrate the elements that do not carry torque. In first ratio operation, overrunning coupling 32 acts to deliver driving torque from turbine shaft 16 to the shaft 30. Clutch 34 is engaged, thereby driving the ring gear 36 in a forward driving direction. This imparts a forward driving torque to output shaft 40. Reverse driving torque is imparted to the sun gear shaft 42. With the overrunning coupling 48 acting as a reaction point, the ring gear 38 is driven in a forward driving direction, thereby complementing the torque delivered to the output shaft 40 through the carrier for the pinions engaging ring gear 36.

Second ratio operation is obtained by applying brake 28, which anchors the sun gear 24 of the simple planetary gear set 18. This causes shaft 30 to be overrun relative to the turbine shaft 16. The elements of the gear set 20 function in the same manner as they do during operation in the first ratio. The overall gear ratio thus is increased relative to the first gear ratio.

Third speed ratio operation is obtained by anchoring shaft 42 with brake 56. Simultaneously, brake 28 is released. Thus, torque is delivered through the overrunning coupling 32 to the ring gear 36. The carrier for the pinions engaging ring gear 36 thus drives output shaft 40 at an increased speed ratio relative to the second speed ratio.

The high clutch 50 is engaged during fourth ratio operation. Since clutch 34 also is applied, the elements of the gear unit 20 are locked up for rotation in unison. The overall gear ratio during fourth ratio operation then is unity.

To achieve fifth ratio operation, which is an overdrive, brake band 28 is applied so that the sun gear 24 acts as a reaction point. The elements of the gear set 20 function in the same manner as they do during fourth ratio operation. Since the ring gear for the gear set 18 is overdriven, the overall gear ratio then is an overdrive.

FIG. 2 shows a transmission corresponding to the transmission of FIG. 1, but it is synchronous. It does not have an overrunning brake 56. Brake 54' provides the reaction point for the sun gear shaft 42' during operation in third ratio. Brake 54' is released, however, during operation in the fourth ratio as direct clutch 50' is applied. Clutch 50' is released during operation in the third ratio. Thus, ratio changes in the third ratio and the fourth ratio are accomplished by engaging and releasing in sequence the brake 54' and the clutch 50'. This is called a synchronous band-to-clutch/center-to-band-shift. Except for the presence of the synchronous ratio change between the third ratio and the fourth ratio, the transmission of FIG. 2 functions in the same manner as the transmission of FIG. 1.

The elements of the transmission of FIG. 2 that have a counterpart in the transmission of FIG. 1 have been identified by similar reference numerals in FIG. 2, although prime notations are added.

In the case of the transmission of FIG. 2, torque is delivered from crankshaft 10' through the converter to the turbine shaft 16'. Torque is transmitted through the overrunning coupling 32' during first ratio operation. During forward motion, torque is transferred through the clutch 34' to the gear set 20. The torque delivered to ring gear 36' is split into two torque components. One component is transmitted over the carrier for the planet set that engages ring gear 36' to the output shaft. The sun gear shaft carries the remaining component of the torque to the rear portion of the gear set 20'. With overrunning coupling 48' acting as a reaction point, the torque transmitted through the sun gear shaft drives the ring gear 38' so that the torque transmitted to the output shaft is multiplied.

In order to provide engine braking during first ratio operation, the overrunning coupling 48' and the overrunning coupling 32' must be held. In the case of the gear set 18', coast clutch 33' must be applied, which connects the carrier and the sun gear of the gear set 18'. Further, brake 46' for the gear set 20' must be applied to prevent overrunning of the overrunning coupling 48'.

Brake 28' is applied during operation in the second ratio. It acts as a reaction point during second ratio operation. Engagement of clutch 33' is hydraulically inhibited at this time.

During operation in the coast mode, engine braking can be achieved by engaging brake 46'. Since the sun gear of the simple planetary gear unit 18' is grounded by brake 28', torque is transmitted to the ring gear for the gear set 18' and then to the carrier, which drives the turbine shaft 16'.

During third ratio operation, the torque flow is the same as that described previously for second gear operation except that brake 54' is applied and brake 28' is released. Since clutch 33' is not applied at this time, overrunning coupling 32' free-wheels. If engine braking is desired, coast clutch 33' is applied.

During operation in the fourth ratio, when engine braking is not available, brake 54' is released and clutch 50' is applied. The shift from the third ratio to the fourth ratio is a synchronized shift since no reaction element is available to hold the brake drum 52'. When brake 54' is released, torque input to the clutch 50' and to the clutch 34' is split. Since they both are applied, gear set 20 operates with a ratio of unity. In the coast mode, no engine braking is provided since the coast clutch 33' is disengaged and overrunning coupling 32' free-wheels. Engine braking is provided only by engaging clutch 33'.

Reverse drive is achieved by engaging clutch 50' or 50 so that torque is delivered to the sun gear shaft 42' or 42. The carrier for the rear portion of the gear set 20' or 20 is held by brake band B3 so that the ring gear 38' rotates in a reverse direction.

Figure 3:
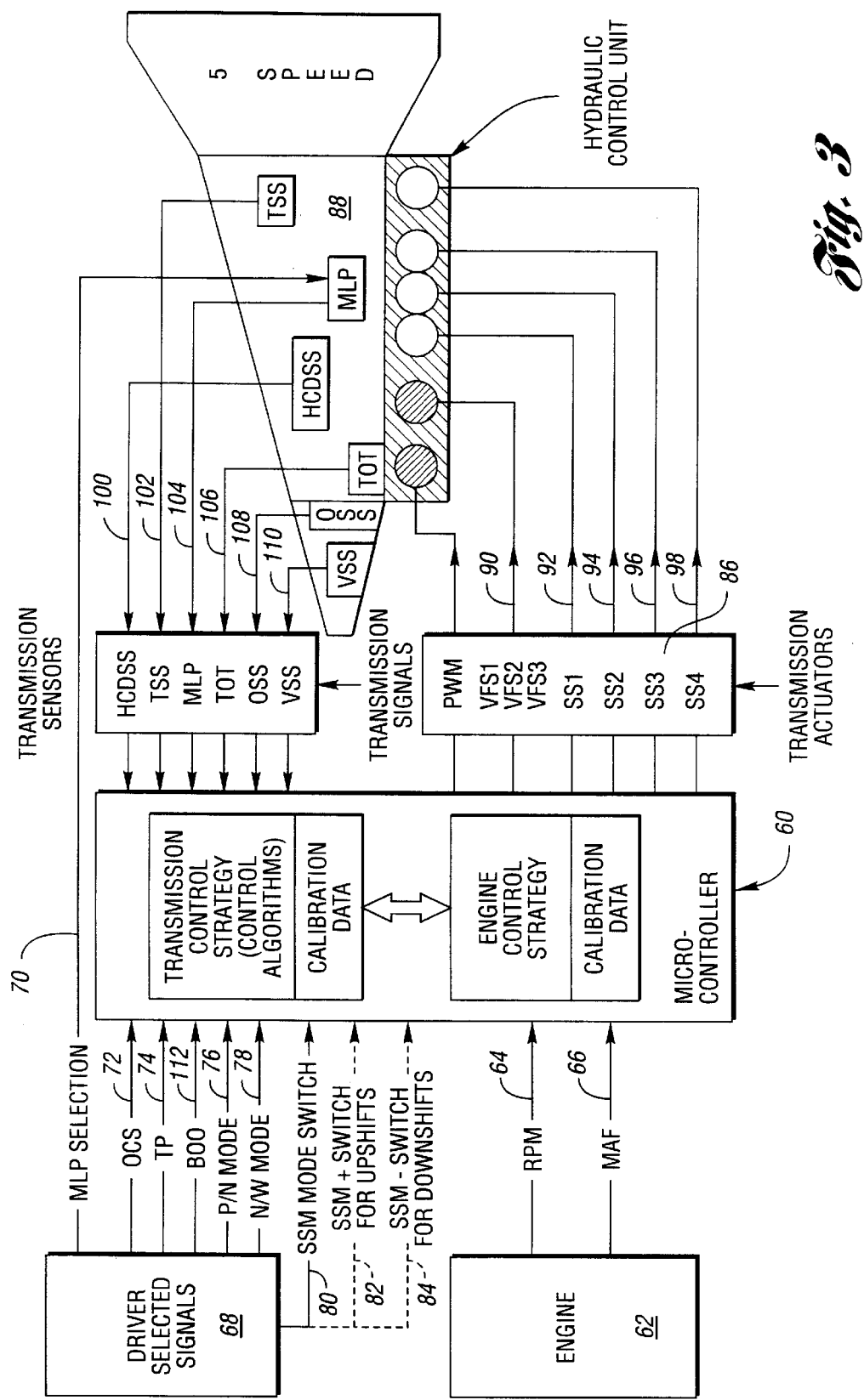
FIG. 3 is a schematic representation of the overall transmission system that includes microprocessor signal inputs from the engine and from the driver and output signals delivered to the transmission together with feedback signals from the transmission to the microprocessor.

FIG. 3 shows a schematic overview of the complete control system. This includes a microprocessor controller 60, which has a memory that contains transmission control strategy (control algorithms) and an engine control strategy.

The controller 60 receives control signals from engine 62. These include an engine speed signal 64 and a mass air flow signal 66 developed by a mass air flow sensor. The driver-selected signals 68 include a manual lever position selection signal 70, an overdrive cancel switch signal 72 and a throttle position signal 74. Other driver-selected signals are the performance/normal switch signal 76 and the switch signal 78, which designates whether the driver has selected a normal operating mode or a winter operating mode.

In addition to the foregoing, the driver selects three other signals designated as the select-shift manual mode switch signal 80 and the select-shift manual mode plus (SSM+) switch signal, which conditions the transmission for upshifts from the fixed ratio that is selected by the operator. This is indicated at 82. Finally, the driver-selected signals include a select-shift manual minus (SSM−) switch signal, which conditions the transmission for downshifts from the fixed ratio that is selected manually by the driver. This is shown at 84.

The microprocessor 60 controls transmission actuators 86, which distribute to the transmission 88 various solenoid signals including VFS1, VFS2, and VFS3, as indicated at 90. Shift solenoids SS1, SS2, SS3 and SS4, which are on/off solenoids, develop signals as shown at 92, 94, 96 and 98.

Transmission feedback signals are distributed to the microprocessor 60. These include the high clutch drum speed signal 100, a turbine speed sensor signal 102, a manual lever position signal 104, which should conform to the input signal at 70, a transmission oil temperature signal 106, an output shaft speed sensor signal 108, and a vehicle speed sensor signal 110.

The following table designates the shift solenoids and the variable force solenoids that are energized or deenergized in order to accomplish the various gear ratio changes. The clutches and brakes that are involved in the various gear ratios also are indicated. This table is relevant to the transmission indicated in FIG. 2.

Interface Diagram For The Transmission of FIG. 2

| GEAR | SS1 | SS2 | SS3 | SS4 | VFS1 | VFS2 | VFS3 | B1 | OWC1 | CL2 | CL3 | B2 | OWC2 | B3 | CL1 |
|---|---|---|---|---|---|---|---|---|---|---|---|---|---|---|---|
| D-1st | ON | OFF | OFF | ON | H | L | L | | | | | | | | |
| D-2nd | ON | OFF | ON | ON | H | H | L | | | | | | | | |
| IS3 | ON | ON | ON | ON | C | C | L | | | | | | | | |
| D-3rd | ON | ON | OFF | ON | H | L | L | | | | | | | | |
| IS1 | OFF | ON | OFF | ON | C | L | C | | | | | | | | |
| IS2 | OFF | OFF | OFF | ON | H | L | C | | | | | | | | |
| D-4th | OFF | OFF | OFF | ON | H | L | H | | | | | | | | |
| D-5th | OFF | OFF | ON | ON | H | H | H | | | | | | | | |
| D-(OCN=ON) OR SSM4 | OFF | OFF | OFF | OFF | H | H | H | | | | | | | | |
| M3 OR SSM3 | ON | ON | OFF | OFF | H | H | L | | | | | | | | |
| M2 OR SSM2 | ON | OFF | ON | OFF | H | H | L | | | | | | | | |
| M1 OR SSM1 | ON | OFF | OFF | OFF | H | H | L | | | | | | | | |
| N | ON | OFF | OFF | ON | L | H | L | | | | | | | | |
| R | ON | OFF | OFF | ON | H | L | H | | | | | | | | |
| R-Inhibition | ON | ON | OFF | OFF | L | H | L | | | | | | | | |

H = High, L = Low, C = Control
Element engaged/controlled = Shaded Areas and Dashed lines
Element disengaged = Non-filled Areas A chart corresponding to the above chart, which corresponds to the transmission schematically indicated in FIG. 1 is set forth as follows.

Interface Diagram For The Transmission of FIG. 1

| GEAR | SS1 | SS2 | SS3 | SS4 | VSF1 | VSF2 | VSF3 | B1 | OWC1 | CL2 | CL3 | CL4 | B2 | OWC3 | OWC2 | B3 | CL1 |
|---|---|---|---|---|---|---|---|---|---|---|---|---|---|---|---|---|---|
| D-1st | ON | OFF | OFF | ON | H | L | L | | | | | | | | | | |
| D-2nd | ON | OFF | ON | ON | H | H | L | | | | | | | | | | |
| IS3 | ON | ON | ON | ON | C | C | L | | | | | | | | | | |
| D-3rd | ON | ON | OFF | ON | H | L | L | | | | | | | | | | |
| D-4th | OFF | OFF | OFF | ON | H | L | H | | | | | | | | | | |
| D-5th | OFF | OFF | ON | ON | H | H | H | | | | | | | | | | |
| D-(OCN=ON) OR SSM4 | OFF | OFF | OFF | OFF | H | H | H | | | | | | | | | | |
| M3 OR SSM3 | ON | ON | OFF | OFF | H | H | L | | | | | | | | | | |
| M2 OR SSM2 | ON | OFF | ON | OFF | H | H | L | | | | | | | | | | |
| M1 OR SSM1 | ON | OFF | OFF | OFF | H | H | L | | | | | | | | | | |
| N | ON | OFF | OFF | ON | L | H | L | | | | | | | | | | |
| R | ON | OFF | OFF | ON | H | L | H | | | | | | | | | | |
| R-Inhibition | ON | ON | OFF | OFF | L | H | L | | | | | | | | | | |

H = High, L = Low, C = Control
Element engaged/controlled = Shaded Areas and Dashed lines
Element disengaged = Non-filled Areas The foregoing tables designate all possible driving conditions that may be executed by the driver. These include the SSM, D and M control modes. SSM means select-shift manual, D means that the driver has selected the manual D position to condition the transmission for automatic upshifts and downshifts. The symbol M represents all manual lever positions in forward drive. Each driving mode selected by the driver has an "on/off" solenoid stage pattern as well as a capacity state for the three variable force solenoids VFS1, VFS2, and VFS3.

The torque converter includes a converter clutch that is engageable and releasable. The converter clutch should be released when the brakes are applied. For this purpose, one of the driver-selected signals is a brake on/off switch signal shown at 112.

The capacity states for the tables set forth above are H, L and C where H stands for high pressure state, L stands for low pressure state, and C stands for controlled pressure. The engaged elements in the foregoing tables are indicated by solid shading. The controlled state for the elements of the foregoing tables are indicated by hatched shading. A disengaged element is indicated by a blank space.

When a variable force solenoid is in the high state, it is capable of satisfying the static and dynamic torque capacity. When a shift into a particular gear ratio is occurring or when the transmission is operating continuously in that particular ratio, the low state provides an output for the variable force solenoid that is zero.

In addition, intermediate solenoid stages are present. These are the IS1, IS2 and IS3 intermediate stages. These are used only for the synchronous shift control. The IS3 intermediate stage is used as an intermediate solenoid stage to execute a 2–3 shift, a 3–2 shift, or a 4–2 shift, which are so-called swap-shifts as explained previously. Intermediate step 1 (IS1) is used for 3–4 shifts and 4–3 synchronous shifts. The IS2 stage can be used for synchronous 4–3 shifts and 5–3 shifts for the transmission schematically shown in FIG. 2. The letter "C" in the foregoing charts indicates that the particular solenoids in the intermediate steps control the synchronization event. These features and the concept of using intermediate solenoid stages is described in the prior art patents mentioned in the foregoing background discussion. Another prior disclosure in which the synchronous shifts are described is U.S. patent application Ser. No. 996,489, filed Dec. 23, 1997 entitled "Upshift And Downshift Control Valve System For Multiple Ratio Automatic Transmission". That application is assigned to the assignee of the present invention.

Unlike the control valve system shown in prior art U.S. Pat. No. 5,612,874, 5,586,029, and 5,642,283, which have a six position manual shift lever, the transmission of the present invention has seven manual positions for the manual shift lever. In the case of the transmission of the prior art patents, an overdrive cancel switch was used to cancel the top gear, which was fourth ratio in the case of the '029 patent, for example, and was fifth ratio in the case of the '283 patent. In the manual two position (M2), the control system of the prior art patents commands second gear or an overdrive plus second gear, depending on the vehicle speed. A downshift into the first gear is hydraulically inhibited. In the manual one position (M1), a sequenced downshift depending on vehicle speed can be executed. Once the transmission of the prior art patents is in first gear, it remains in first gear. Engine braking is provided in both manual positions. The transmission of the prior art patents does not have a so-called manual three position (M3).

The pressure build-up system for the four-speed version and the five-speed version of the transmissions described in the prior art patents mentioned above consists of only one variable force solenoid that has multiplex functions for the various clutches and brake bands. One forward modulator valve is used to control the forward engagement as well as the capacity of the elements in the overdrive planetary gear set and the multiple ratio planetary gear set for upshifts and downshifts. The single variable force solenoid also provides for pressure control for line pressure. Four shift solenoids execute ratio changes, one shift solenoid is used for controlling the coast clutch to provide engine braking during operation of the direct drive gear ratio. The remaining shift solenoids are used in conjunction with the variable force solenoid and the pressure modulator valve to effect the shift control functions of the shift valves.

Figure 4:
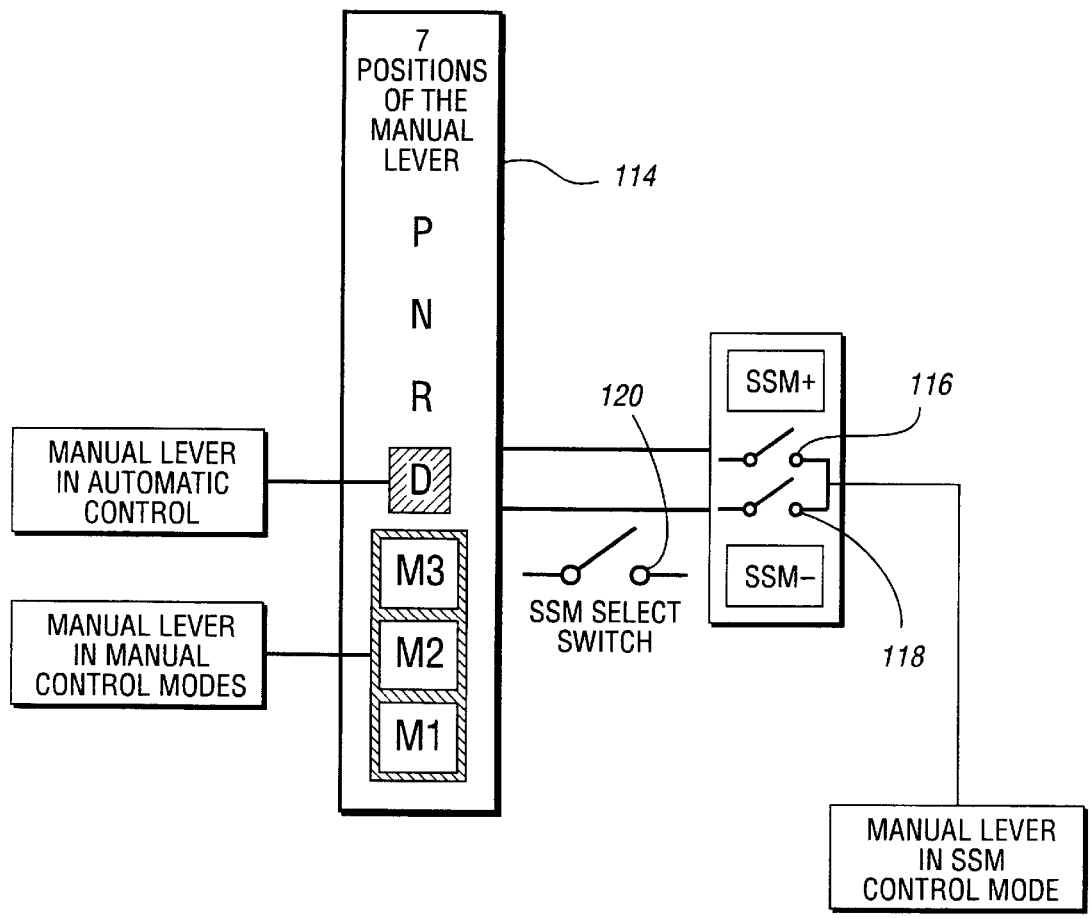
FIG. 4 is a schematic diagram showing the seven positions of the manual lever used with the improved control system of the present invention as the driver selects the automatic drive mode, the manual control modes and the select-shift manual modes.

The manual lever for the present transmission has seven positions as indicated in FIG. 4 at 114. These are identified in FIG. 4 as the park position, neutral position, reverse position, manual lever automatic control position D, and three manual lever positions for manual control modes M3, M2 and M1. The available gears and the overdrive cancel switch state for each lever position are shown in the following table.

| Manual Lever Positions (7 Positions) | State of Overdrive Cancel Switch | Available Gears | Used Abbreviation |
|---|---|---|---|
| PARK | — | — | P |
| REVERSE | — | Reverse Gear | R |
| NEUTRAL | — | — | N |
| DRIVE | OFF | All Forward Gears | D |
| DRIVE | ON | 1st, 2nd, 3rd, 4th | D (ODC = ON) |
| MANUAL 3 | — | 3rd or up- and downshift control up to third gear | M3 |
| MANUAL 2 | — | 2nd or up- and downshift control up to 2nd gear | M2 |
| MANUAL 1 | — | 1st | M1 |

The overdrive cancel switch is used to cancel the overdrive gear when the manual lever is in the drive position. In the M3 and M2 positions, the control system is capable of locking the gear state or allowing upshift and downshift control up to the third ratio or the second ratio if this feature is desired.

The automatic shift control mode is basically the normal automatic upshift and downshift control when the manual lever is in the D position or the D position with overdrive canceled by the overdrive cancel switch. No engine braking is commanded with an automatic shift control mode selected by the manual lever. The transmission can be locked in a particular manual gear ratio or it can be allowed to upshift and downshift to any of the top manual gear ratios. In this case, engine braking is provided in any gear. The abbreviation "M" is used hereafter to refer to the manual lever positions.

The select-shift manual control mode allows the driver to select each individual gear by enabling a pair of switches. One switch, which is referred to as SSM+ switch, is for upshift control. The second switch triggers the downshift control. This is referred to as SSM– control, as shown at 118.

In FIG. 4, the manual lever is in the D position. In order to select the SSM mode, a third switch is required, which is referred to as a select-shift manual switch SSM shown in FIG. 4 at 120. The overdrive can be canceled or not canceled by the overdrive cancel switch. The switches are actuated by the driver as inputs to the microprocessor shown in FIG. 3.

When the transmission is in the SSM operating mode, engine braking in each gear is available. This includes a select-shift manual control mode for the automatic control mode D. The abbreviation "SSM" is used to indicate this control mode in the following description.

The seven positions of the manual lever, as well as the select-shift manual switches, are shown in FIG. 4. This figure identifies the current mode selected by the driver.

Figure 5A:
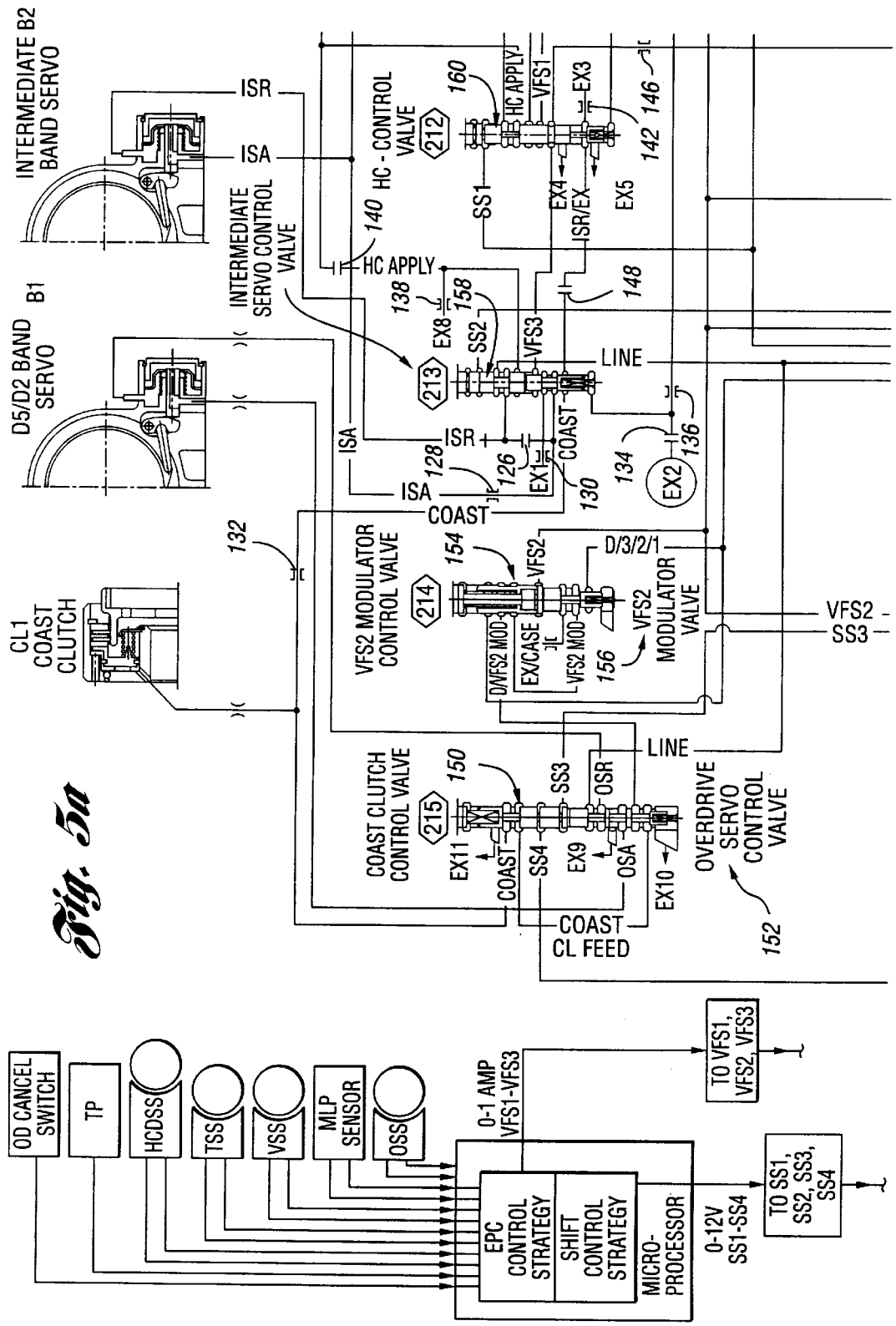
Figure 5B:
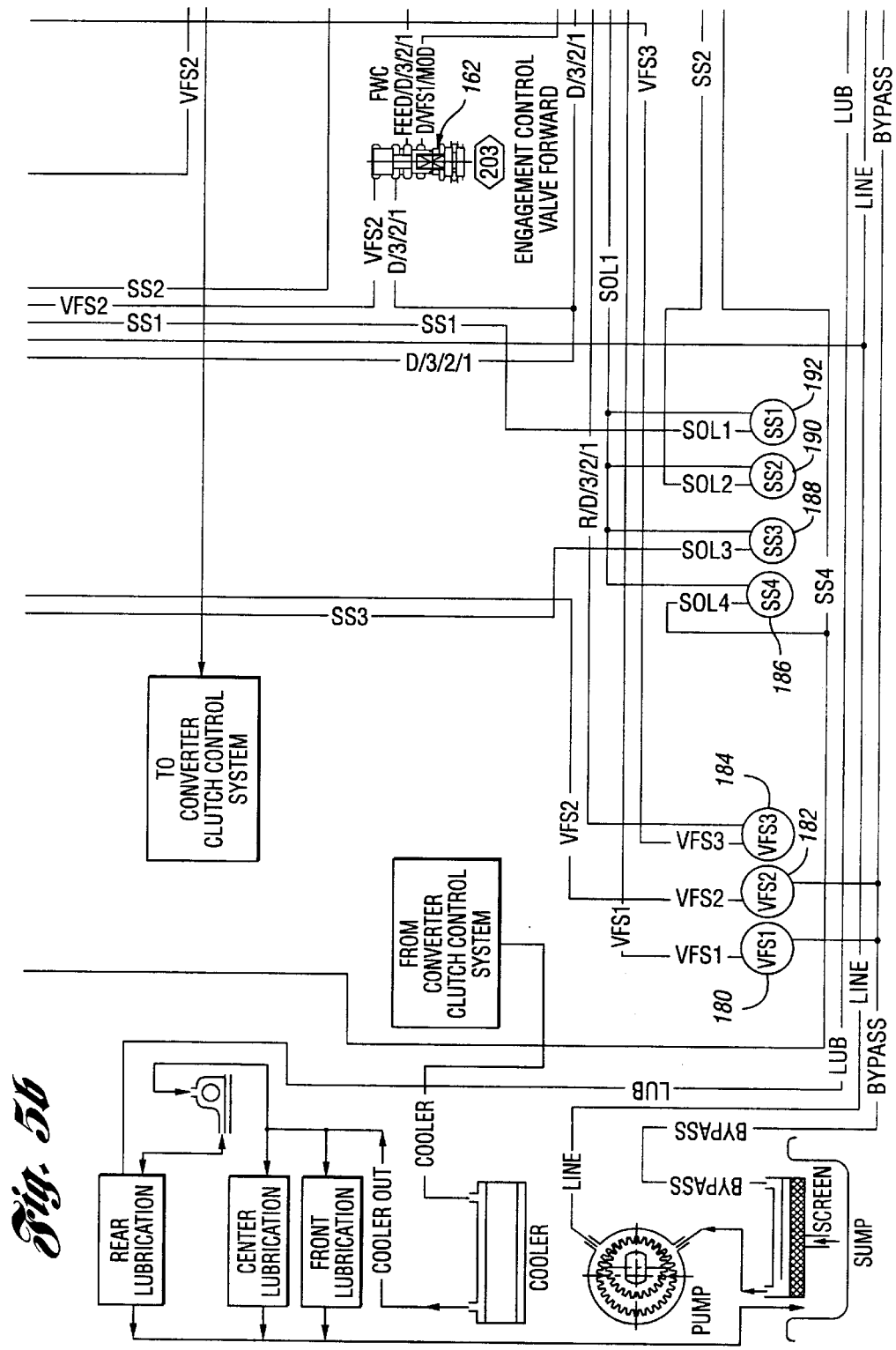

The present disclosure describes two distinct five-speed transmissions. These are the transmissions separately illustrated in schematic form in FIGS. 1 and 2. Each transmission has an automatic shift control mode, a manual shift control mode where engine braking is available, and a select-shift manual control mode where engine braking is available. Each transmission has a distinct control valve assembly. The control valve system for the transmission of FIG. 1 is shown in FIGS. 5a, 5b, 5c, and 5d. The control valve system for the transmission of FIG. 2 is shown in FIGS. 6a and 6b.

The hardware for control valve system can be adapted for either transmission by either opening or closing orifices that are identified in the drawings of FIGS. 5a–5d and FIGS. 6a and 6b as well as in the following table. The orifices are identified by reference numerals 122–148.

| Control Orifice | Comments | Trans. of Figure 2 | Trans. of Figure 1 |
|---|---|---|---|
| 122 | This orifice connects/disconnects VFS1-MOD pressure to/from the intermediate clutch (CL4) | C | O |
| 124 | This orifice connects/disconnects VFS1-MOD pressure to/from the intermediate band (B2) | O | C |
| 126 | This orifice connects/disconnects ISR circuit and exhaust EX1 at intermediate servo control valve 213 | O | C |
| 128 | This orifice disconnects/connects the ISA circuit and the coast clutch circuit | C | O |
| 130 | This orifice opens or closes exhaust port EX1 at intermedia servo control valve 213 | C | O |
| 132 | This orifice opens and closes the coast clutch circuit and the ISA circuit | C | O |
| 134 | This orifice opens or closes exhaust port EX2 at the back of valve 213 | O | C |

| Control Orifice | Comments | Trans. of Figure 2 | Trans. of Figure 1 |
|---|---|---|---|
| 136 | This orifice connects VFS3 pressure as an interlock pressure to the end of valve 213 | O | C |
| 138 | This orifice opens or closes the exhaust port EX8 | C | O |
| 140 | This orifice connects the HC-APPLY circuit with the intermediate servo control valve 213 | O | C |
| 142 | This orifice opens or closes the exhaust port EX3 at HC Cont. valve 212 | C | O |
| 144 | This orifice connects or disconnects VFS1 pressure to/from the HC Cont. valve 212 | O | C |
| 146 | This orifice connects or disconnects the VFS3 pressure to/from the HC Cont. valve 212 | C | O |
| 148 | This orifice connects or disconnects the coast clutch circuit to/from the ISR/EX circuit | O | C |

The control valve system includes a coast clutch control valve 150 and an overdrive servo control valve 152, which are located in bore 215. Throughout the drawings and throughout the description, reference will be made to valve bores by valve bore numbers. These numbers are found in the drawings within a hexagonal-shaped symbol adjacent the bore which it identifies. For example, the coast clutch control valve bore is identified by bore number 215.

The valve system further includes a modulator control valve for variable force solenoid 2 (VFS2) and a VFS2 modulator valve. These are identified by reference numerals 154 and 156 and are located in valve bore 214.

An intermediate servo control valve distributes actuating pressure to the intermediate servo release pressure chamber and to the intermediate servo apply pressure chamber. These pressure chambers are on opposed sides of an intermediate band servo piston. The intermediate band servo is identified by reference symbol B2.

Figure 5C:
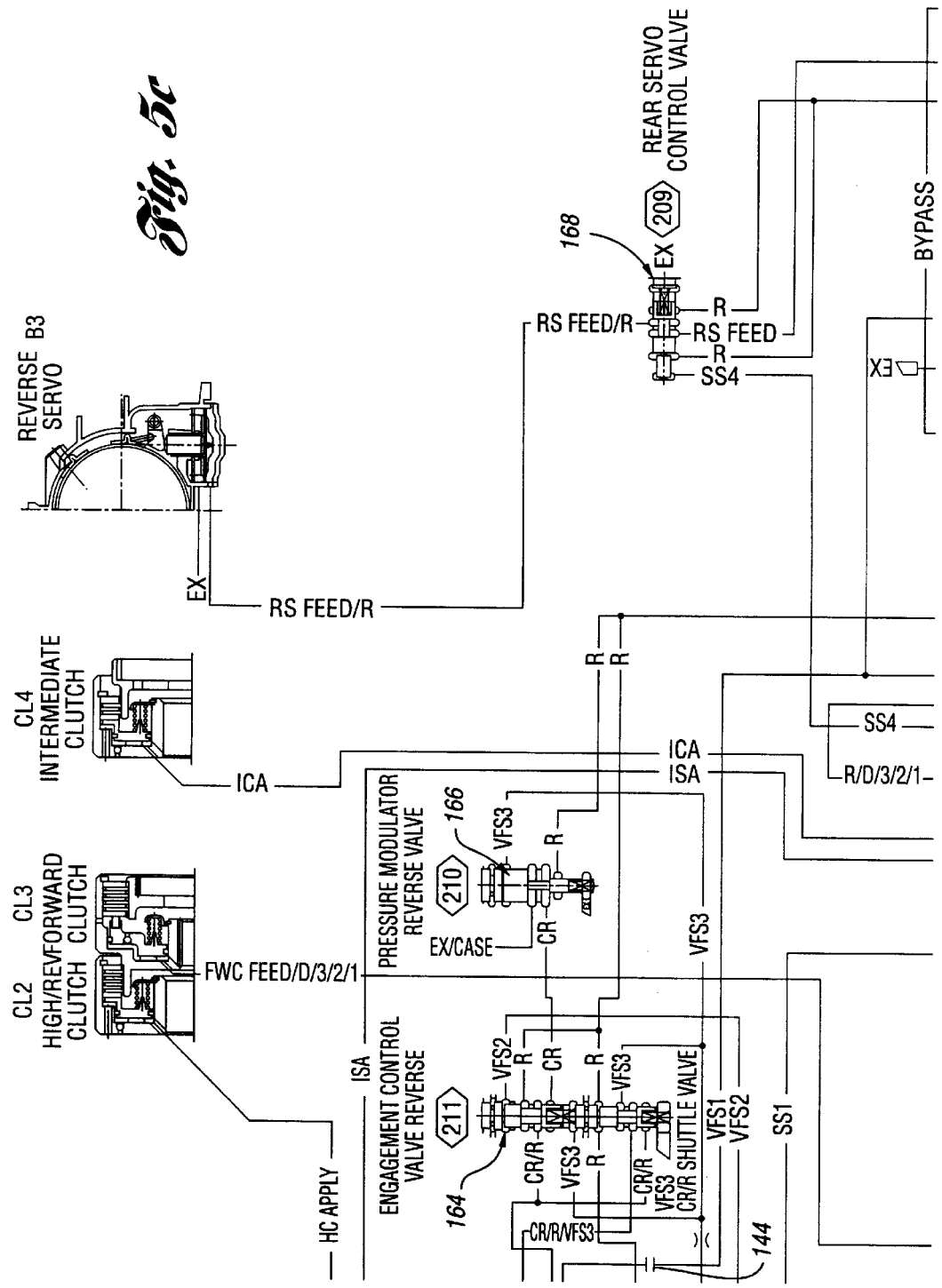
Figure 5B:
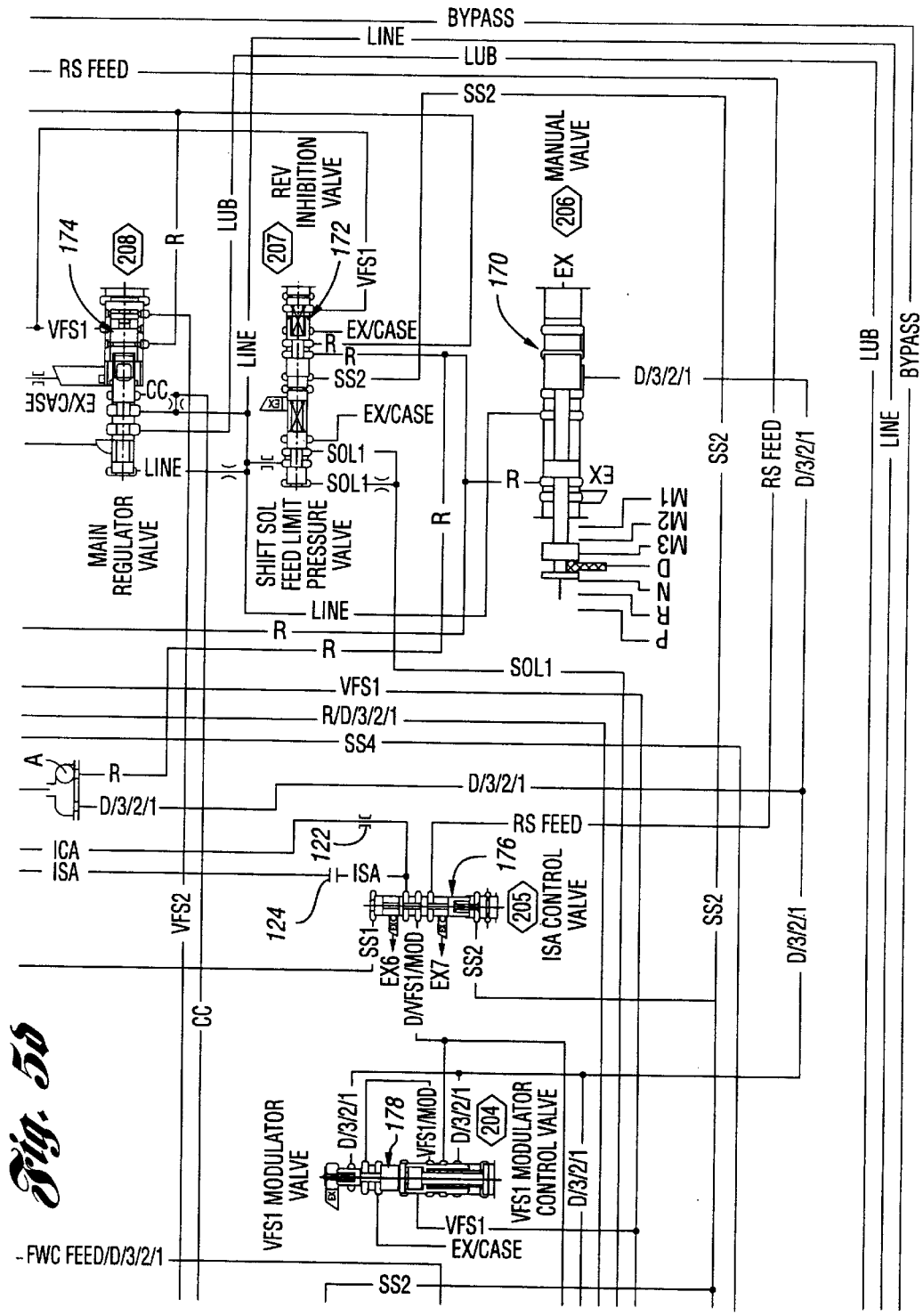
Figure 6B:
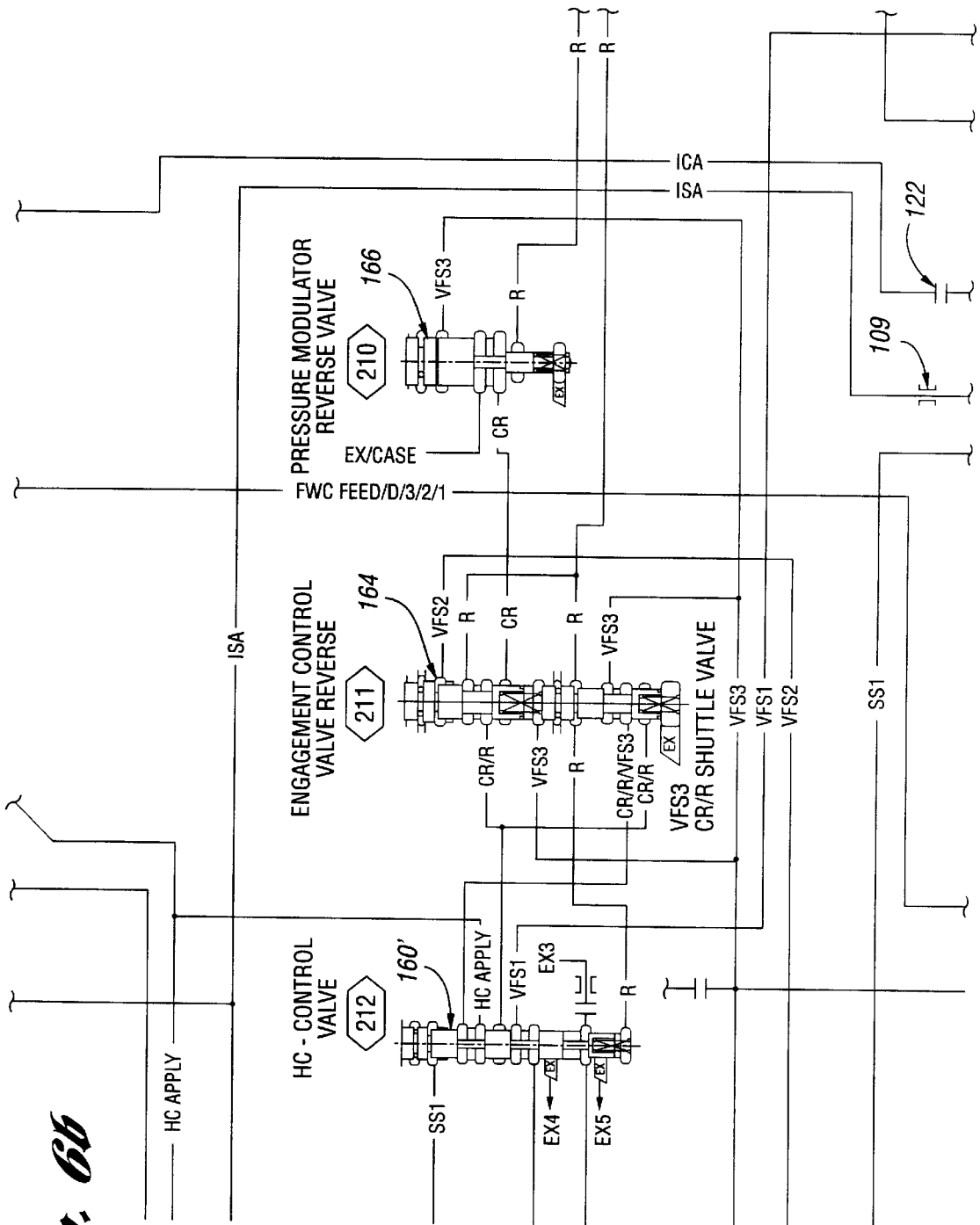
Figure 7A:
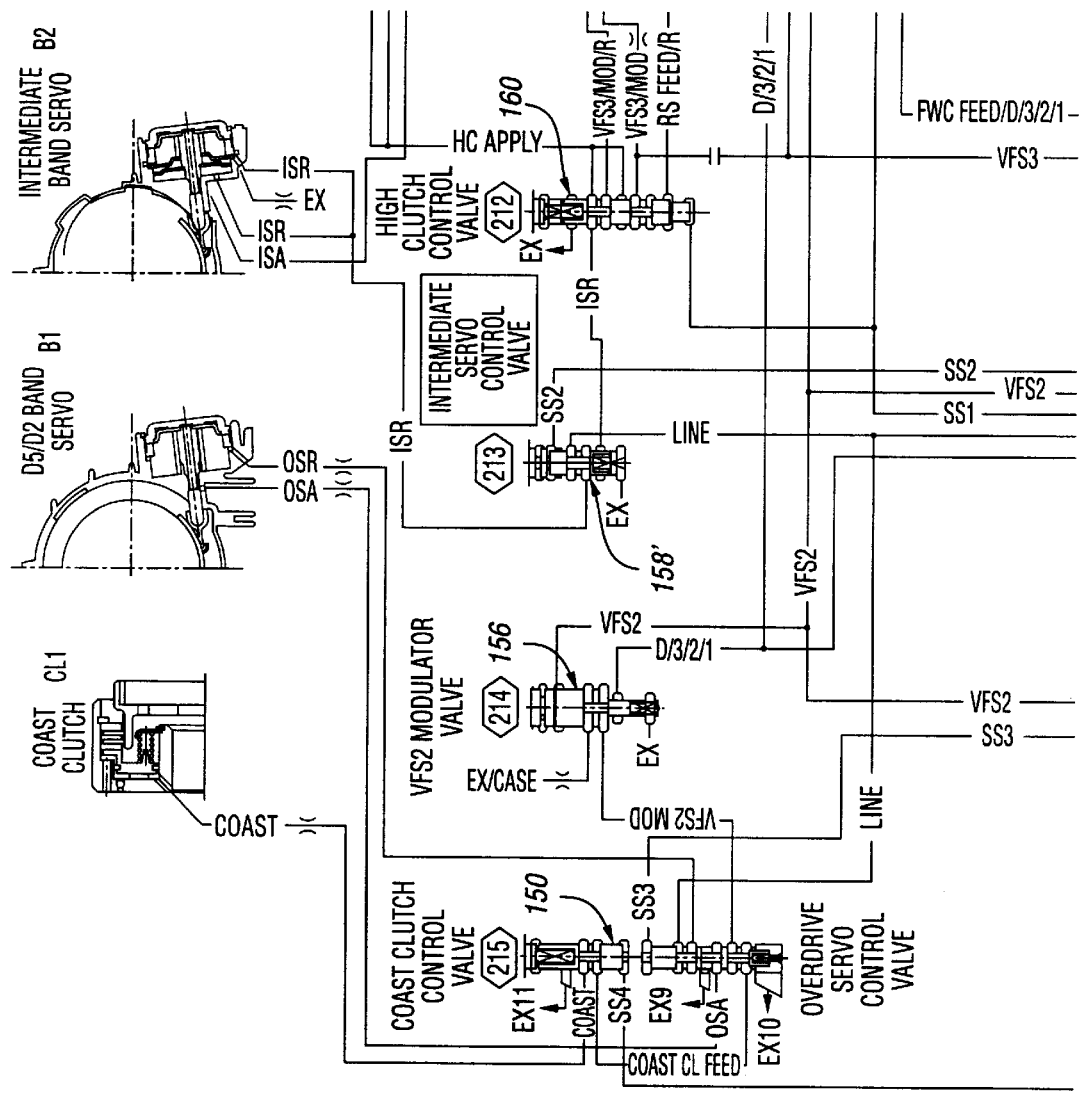
Figure 7B:
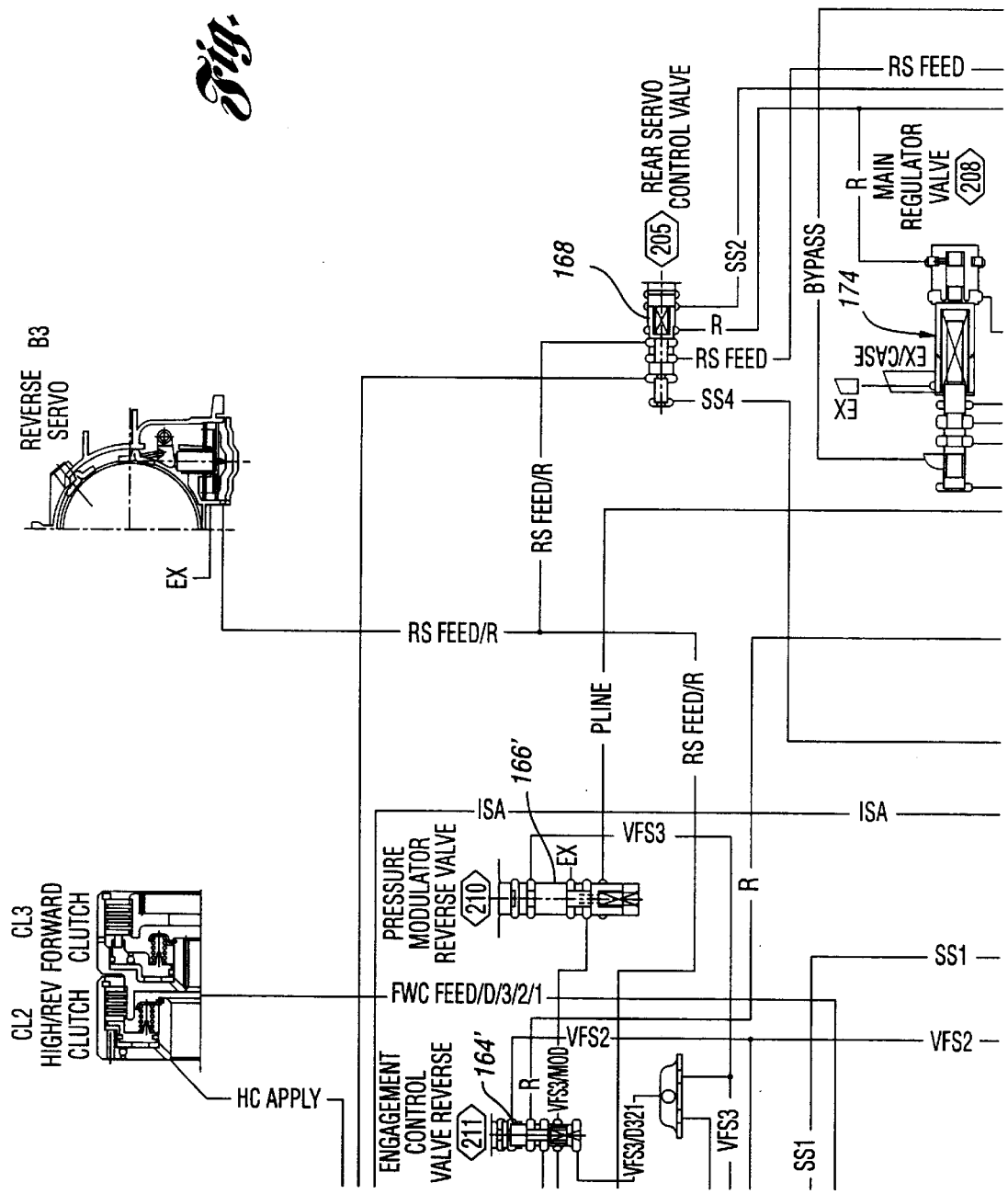
Figure 7C:
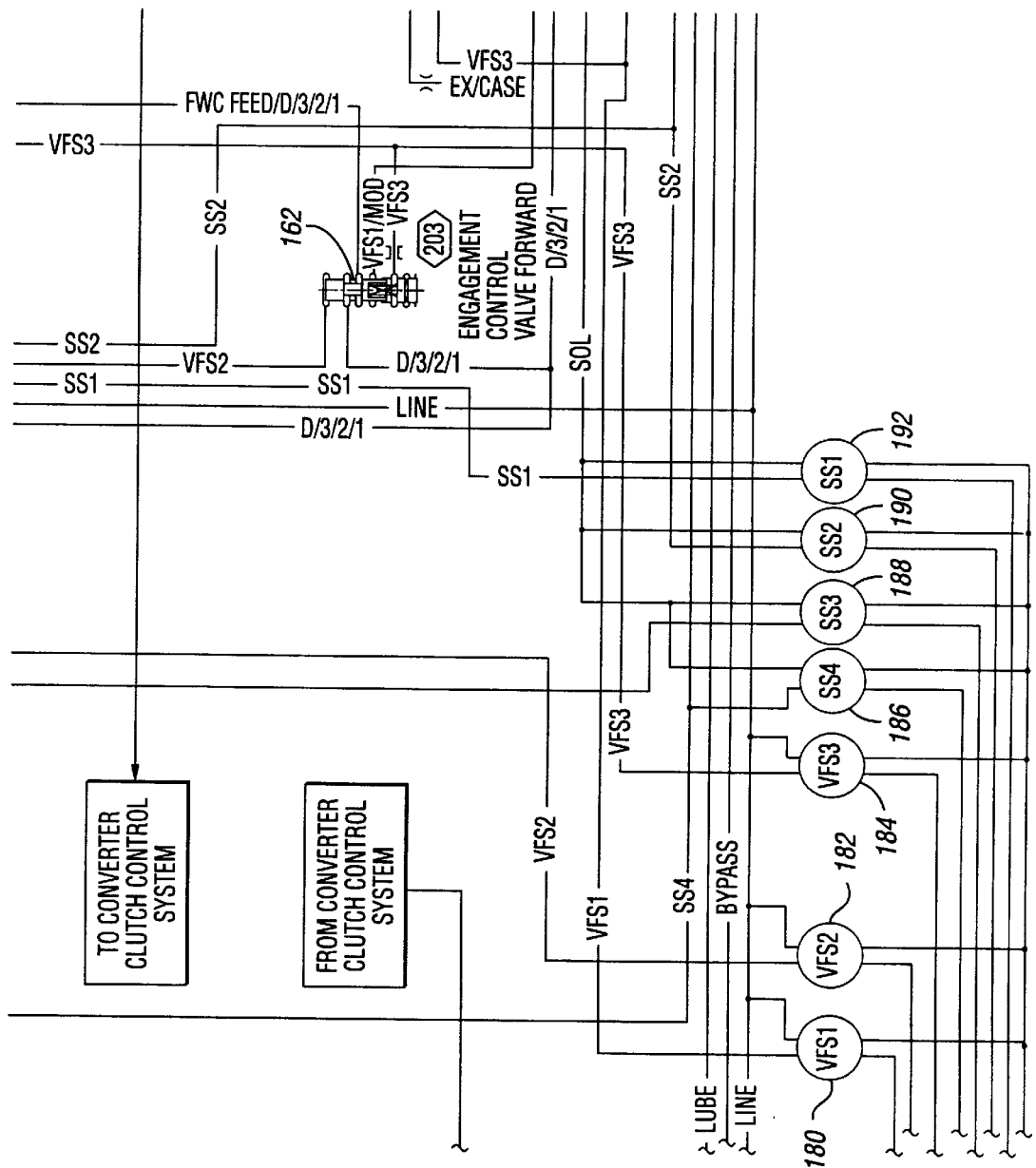
Figure 7B:
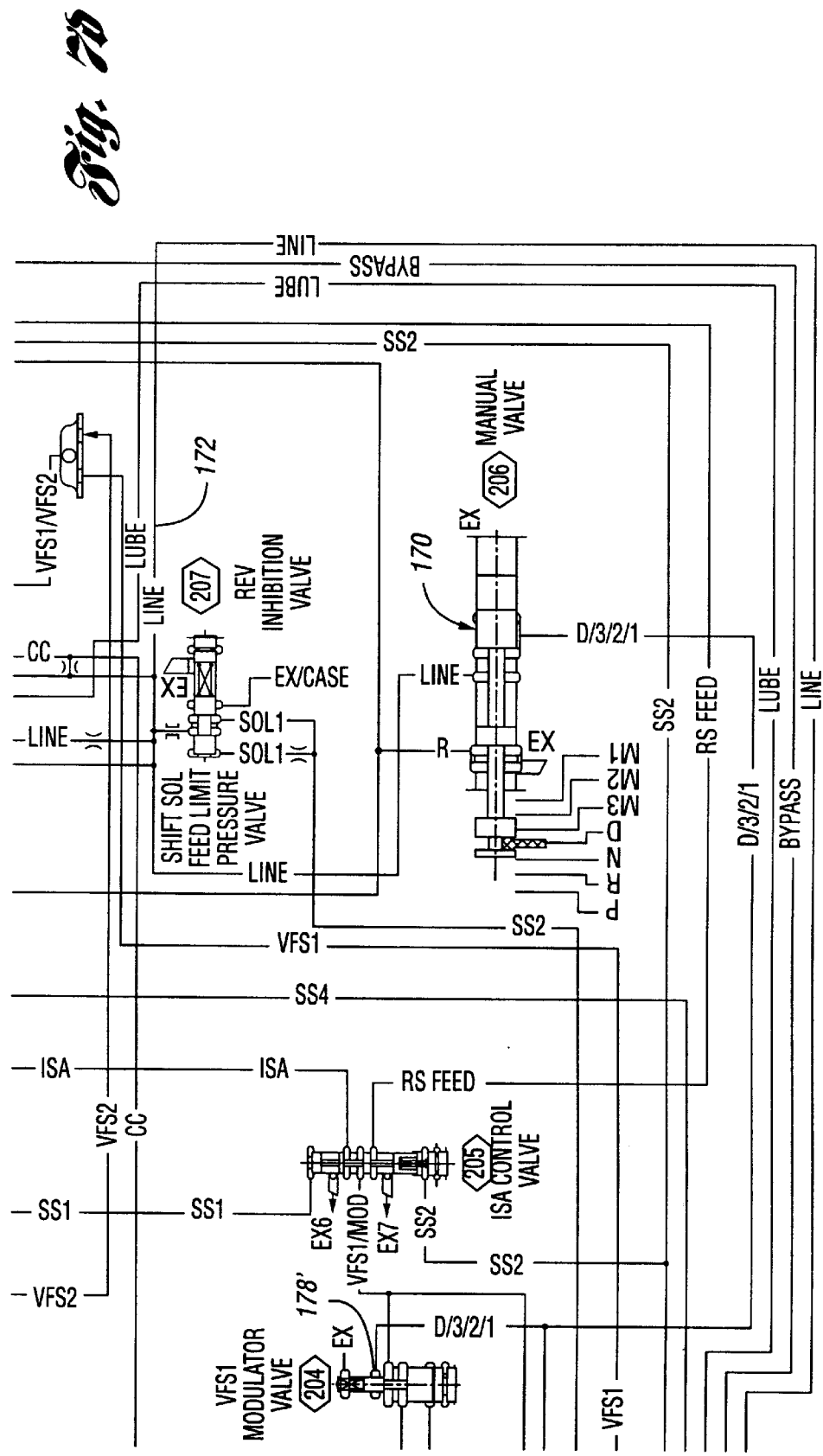

A high clutch control valve 160 controls distribution of pressure to the apply side of the high and reverse clutch CL2 shown in FIG. 5c. It is located in valve bore 212.

There are three variable force solenoids for developing discrete variable force solenoid pressures VFS1, VFS2 and VFS3. These are shown at 180, 182 and 184 in FIG. 5b.

There are four on/off solenoids for controlling the intermediate and overdrive servo control valve, the high clutch control valve, and the coast clutch control valve. These valves are shown, respectively, at 158, 152, 160 and 150 in FIG. 5a. The on/off solenoids are identified by reference numerals 186, 188, 190 and 192 in FIG. 5b. These develop pressures that are designated as SOL4, SOL3, SOL2 and SOL1, respectively.

An engagement control valve for reverse is shown at 164 in FIG. 5c. It is located in a common bore 211 with the VFS3, CR/R shuttle valve which is shifted in downward direction against the force of a valve spring by reverse pressure from the manual valve, shown in FIG. 5d at 170.

Pressure modulator reverse valve shown at 166 in FIG. 5c modulates reverse pressure from the manual valve as a function of VFS3 pressure to produce CR pressure, which is distributed to the engagement control valve for reverse shown at 164.

Reverse servo control valve shown at 168 in FIG. 5c distributes an RS feed pressure or reverse pressure to the reverse servo shown at B3 depending upon the absence or the presence of a signal SS4 from shift solenoid 186 in FIG. 5b.

A variable force solenoid modulator valve (VFS1 modulator valve) and a VFS1 modulator control valve are identified by a common reference numeral 178, which is located in valve bore 204. An intermediate servo apply control valve 176 located in valve bore 205 distributes pressure to the intermediate servo apply pressure chamber shown at B2 in the case of the transmission of FIG. 2 or to the intermediate clutch apply pressure chamber shown at CL4 in the case of the transmission of FIG. 1, as indicated previously. This is accomplished depending upon whether orifice 124 is open or closed and whether orifice 122 is open or closed.

The main regulator valve for the valve system is shown at 174 in FIG. 5d.

A principal difference between the control valve system of FIGS. 5a–5d for the transmission of FIG. 1 and the control valve system of FIGS. 6a and 6b for the transmission of FIG. 2 resides in the intermediate servo control valve 158 in FIG. 5a and the high clutch control valve 160 in FIG. 5a. The corresponding valves for the transmission of FIG. 2 are shown at 158' in FIG. 6a and at 160' in FIG. 6b.

The valve system shown schematically in FIGS. 7a–7d is similar to the valve system of FIGS. 6a and 6b except that the number of shift valves is reduced. In other respects, the valve systems are similar and the functions of the valves themselves are similar.

Figure 8A:
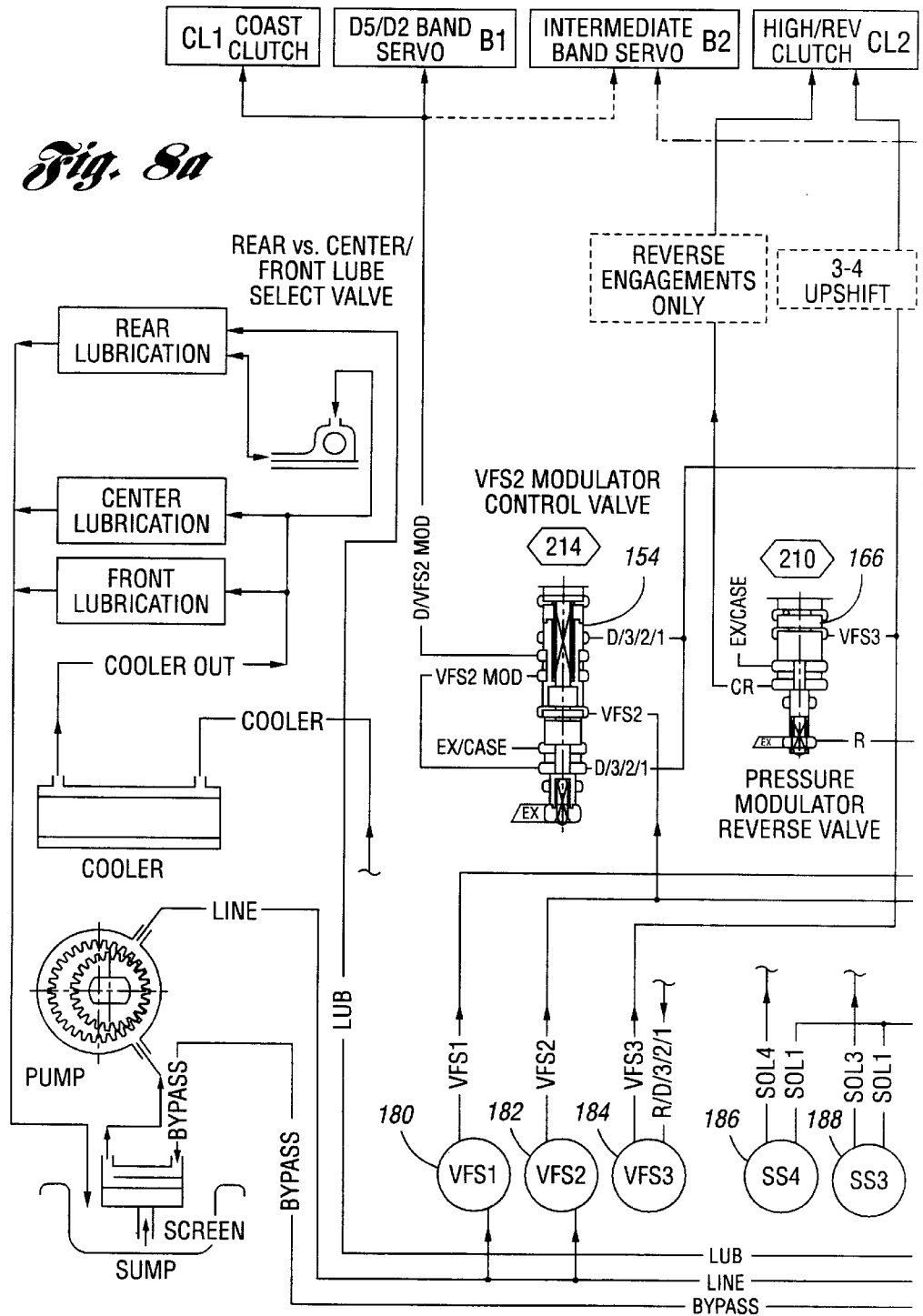
FIGS. 8a and 8b show the pressure build-up control valve system for the transmission gearing schematically illustrated in FIGS. 1 and 2.
Figure 8B:
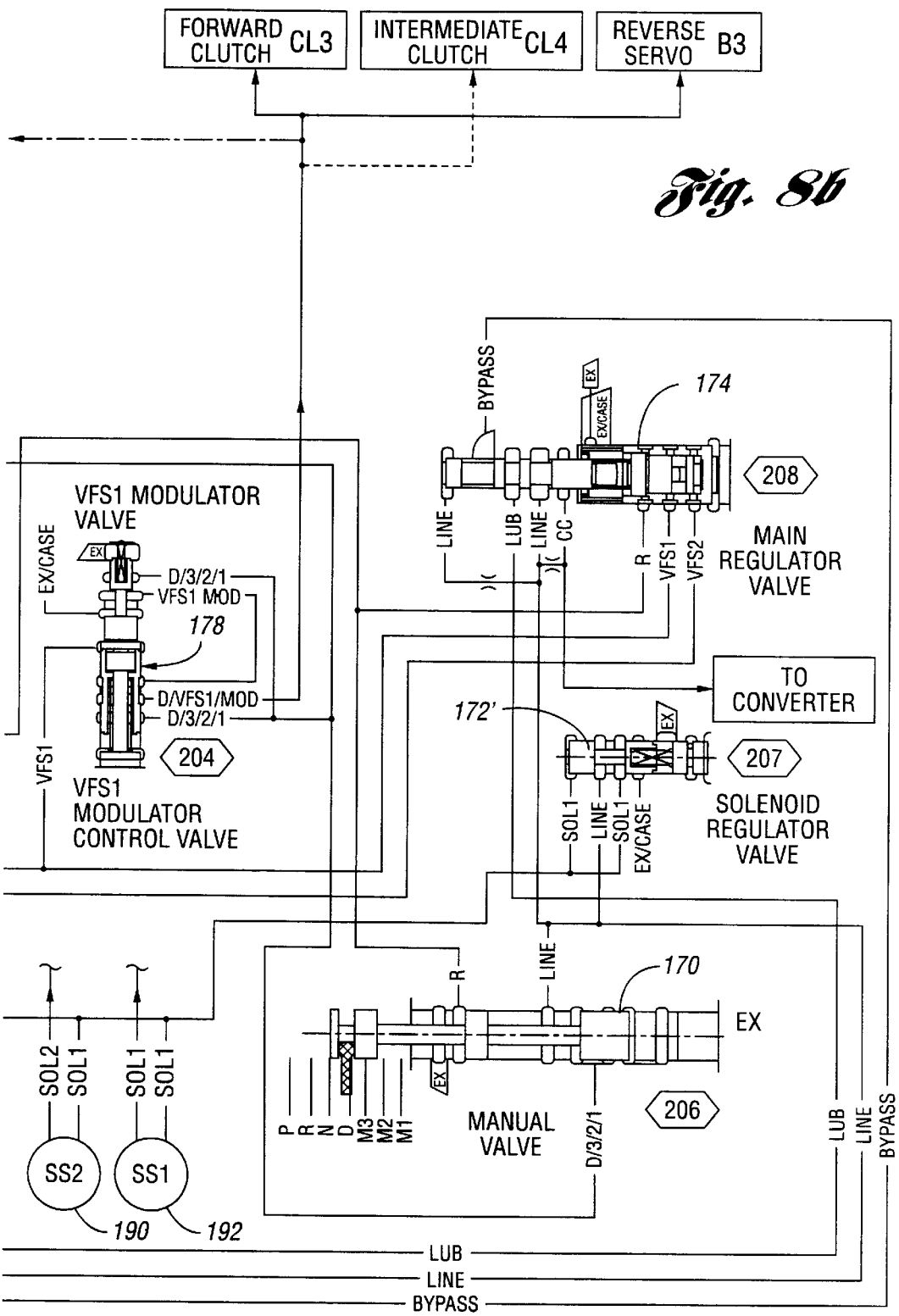
Figure 16:
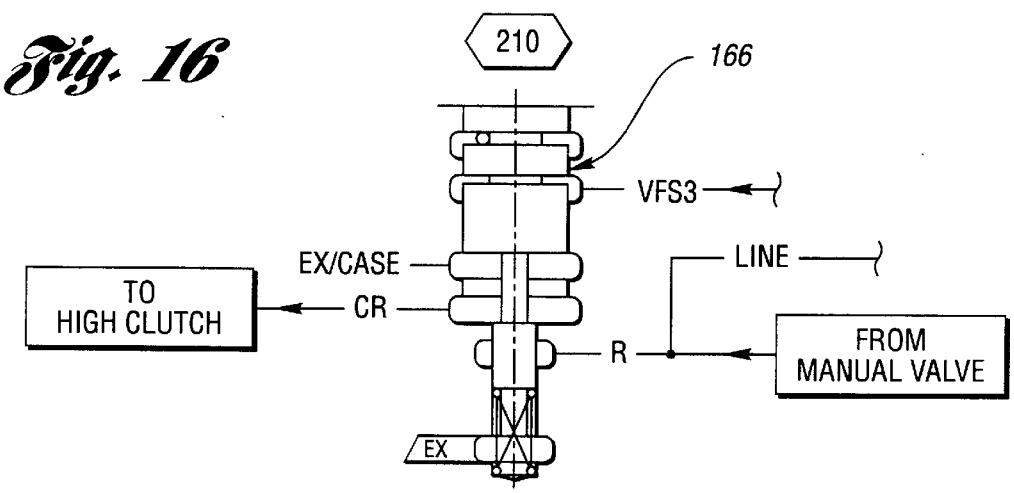
FIG. 16 is a detailed view of the pressure modulator reverse valve for the non-synchronous transmission gearing.

FIGS. 8a and 8b show the pressure build-up system for the transmissions of FIGS. 1 and 2. It is a sub-assembly view of the schematic valve diagrams of FIGS. 6a and 6b and FIGS. 7a–7d. The pressure control system consists of three variable force solenoids 180, 182 and 184, variable force solenoid modulator valves 154 and 178, the regulating characteristics of which are shown in FIGS. 14, 15 and 15a, a pressure modulator-valve for reverse 166 as seen in FIGS. 5c and 16, a main regulator valve system shown in FIGS. 10 and 11 at 174 as well as in FIG. 5d, and a solenoid regulator valve 172' seen in FIG. 18.

Figure 9:
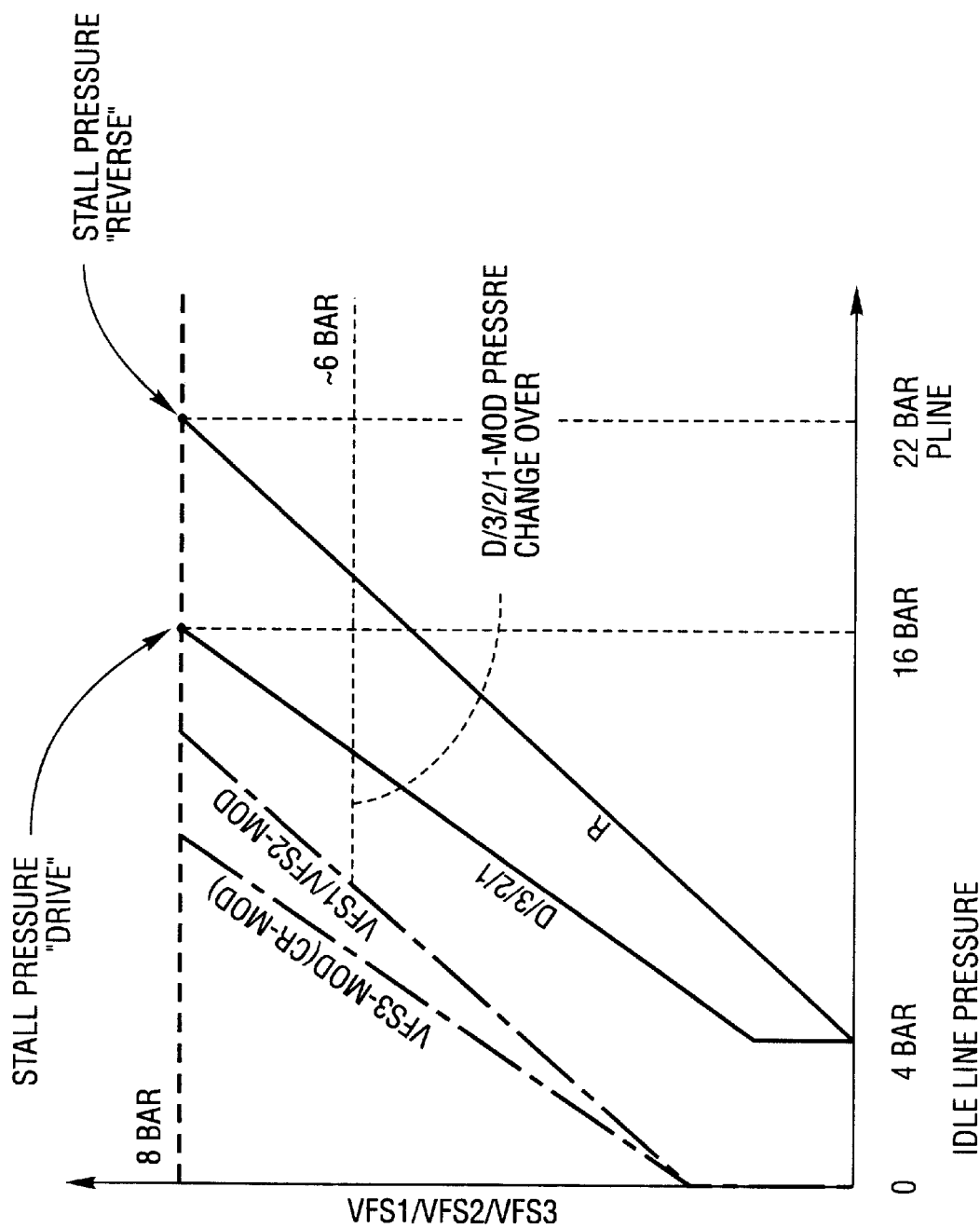
FIG. 9 shows a pressure build-up characteristic plot for the transmission of FIGS. 1 and 2.

The three variable force solenoids VFS1, VFS2 and VFS3 are typical proportional control devices which convert a current value, for example, of 1 to 0 into a pressure value of 0 to 8 bar. The transfer function for this conversion is shown in FIG. 9. This transfer function is used for the purpose of adjusting the capacity of the various clutches and brake bands.

VFS1 and VFS2 communicate with the main regulator valve system 174. The main regulator valve amplifies the pressure of the fluid supplied by the pump to the booster valve lands in the regulator valve assembly to achieve a line pressure. The feed pressure for VFS1 and VFS2 also is line pressure. Each of these variable force solenoid valves communicate with the modulator valves VFS2 and VFS1 seen in FIGS. 5a and 5d, respectively, and with the VFS modulator control valve. A VFS2-MOD pressure and a VFS1-MOD pressure is produced as a function of the VFS1 and VFS2 signal pressures. These modulator pressures are applied to the various clutches and brake bands.

VFS3 pressure is connected to the pressure modulator valve 166. This is necessary to provide an adequate control for the high clutch during reverse engagement. VFS3 pressure also is used to control the high clutch directly without pressure modulation during 3–4 upshifts and 4–3 downshifts as well as 5–3 downshifts.

Each variable force solenoid in conjunction with the modulator pressure valves has a multiplex function with respect to the various clutches and brake bands to provide capacity control. This is explained in the following charts where the shaded areas represent the clutches and brakes that are controlled by the individual variable force solenoids.

FIG. 1 Transmission

|  | Overdrive Planetary Gear Set | | Simpson Planetary Gear Set | | | | |
| --- | --- | --- | --- | --- | --- | --- | --- |
|  | B1 | CL1 | CL2 | CL3 | B3 | B2 | CL4 |
| VFS1 |  |  |  | ■ | ■ |  | ■ |
| VFS2 | ■ |  |  | ■ |  | ■ |  |
| VFS3 |  |  | ■ |  |  |  |  |

FIG. 2 Transmission

|  | Overdrive Planetary Gear Set | | Simpson Planetary Gear Set | | | | |
| --- | --- | --- | --- | --- | --- | --- | --- |
|  | B1 | CL1 | CL2 | CL3 | B3 | B2 |
| VFS1 |  |  |  | ■ | ■ | ■ |
| VFS2 | ■ |  |  | ■ |  |  |
| VFS3 |  |  | ■ |  |  |  |

Controlled by = Shaded areas.

To effect select-shift manual control as well as automatic and manual shift control, it is necessary to provide independent capacity control for the clutch and brake elements of the overdrive planetary gear set and the multiple ratio Simpson planetary gear set. Variable force solenoid VFS2 is dedicated to the clutch and brake elements of the overdrive planetary gear set and variable force solenoid VFS1 is dedicated to the control of the Simpson planetary gear set. Forward clutch capacity is controlled generally by VFS1 and VFS2. This is required in order to protect forward clutch capacity when one of the variable force solenoids is used for upshift and downshift control. VFS3 is dedicated only to the high and reverse clutch CL2. This is required in order to accomplish synchronous 3–4 upshifts, 4–3 downshifts, and 5–3 downshifts.

The variable force solenoid modulator valves for VFS1 and VFS2, shown at 178 and 156 in FIGS. 5a and 5d as well as in FIG. 14, are actuated by variable force solenoids VFS1 and VFS2. The pilot pressure produced by the variable force solenoids is converted to a clutch pressure transfer function as shown in FIGS. 15 and 15a. Each modulator valve modulates D/3/2/1 pressure to the particular VFS-MOD pressure. D/3/2/1 pressure is line pressure distributed from the main regulator valve 174 and by the manual valve to the VFS1/VFS2 modulator valve 178 and 156. The modulator valves then are supplied with input pressure in the forward manual positions D/3/2/1. No input pressure is supplied during operation reverse, neutral and park, thereby effecting fail/safe modes. Engagements of the clutches and brakes will not occur during reverse, neutral and park.

The modulator valves consist of two areas which are identified in FIG. 14 and in FIG. 15a as areas A1 and A2. When the modulator valves are in the modulating position, the pilot pressure VFS1 or VFS2 is in equilibrium with a spring load, and modulated pressure acts on the differential area of valve land areas A1 and A2. The surplus oil is distributed to the exhaust port EX/CASE shown in FIG. 14. This produces the transfer function shown in FIG. 15. This transfer function indicates that a complete capacity range from zero capacity to maximum available capacity can be used. This eliminates the need for hardware accumulators for the pressure modulator valves. The multiplexing functions of the variable force solenoid modulator valves are the same as the multiplexing capacity control functions of the variable force solenoids shown in the preceding table since the modulator valves cause a pressure amplification of the piloting pressures produced by the variable force solenoids.

The VFS1/2 modulator control valve of FIG. 14 functions to distribute either VFS-MOD pressure or D/3/2/1 pressure to the various clutches and brakes at a VFS1/VFS2 threshold value of 6 bar, for example. If the VFS1 pressure or the VFS2 pressure is lower than the threshold value, VFS1/2-MOD pressure is distributed to the various clutches and brakes. If VFS1 or VFS2 pressure is higher than the threshold, D/3/2/1 pressure is applied to the affected capacity elements as indicated in FIG. 9. This is required in order to swap or interchange the two distinct pressure slopes. The first pressure slope, which is VFS1/2-MOD pressure, is used for upshift and downshift control and the second pressure slope, which is line pressure, is required to provide stall capacity for clutches and brakes during start up in each gear. It is possible for the driver, during operation in the select-shift manual control mode, to start up in each of the five gear ratios.

As seen in FIG. 14, only the differential area between A3 and A4 develops a pressure load that opposes the force of the spring. The required spring load to produce a pressure threshold of 6 bar, for example, can be adjusted by changing the differential area or by changing the spring rate.

As indicated in the foregoing table for the FIG. 1 transmission and the FIG. 2 transmission, two distinct control valve systems are required for controlling the capacity of the elements controlled by VFS1 pressure and the elements controlled by VFS2 pressure. Only the elements that are required to provide stall capacity during driveaway are provided with D/3/2/1 pressure. These are the overdrive planetary gear set brake B1, CL2, CL4, CL3 and B2 for the multiple ratio Simpson planetary gear set. For coasting elements CL1, B3 and B2 in the case of the transmission of FIG. 1, VFS1/2-MOD pressure is sufficient to supply the capacity at VFS1/VFS2 pressure thresholds lower than 6 bar, for example.

Figure 16A:
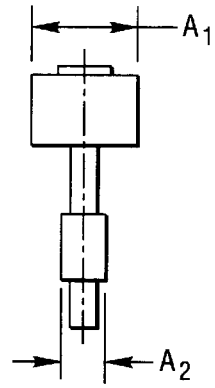
FIG. 16a is a detailed view of the valve shown in FIG. 16.

The pressure modulator reverse valve is shown in FIGS. 16 and 16a. The reverse pressure modulator valve is used only for reverse engagement control of the direct clutch CL2. This function is similar to the function of the VFS1 and VFS2 modulator valves. The reverse pressure modulator is actuated by VFS3 pressure. R pressure (reverse pressure), which is line pressure distributed by the manual valve 170, is the feed pressure to the modulator valve 166. The characteristic for valve 166 is similar to the characteristic previously described for the VFS1/VFS2 modulator valve. The transfer function depends on the size of the differential areas A1 and A2, as shown in FIG. 16a. The pressure characteristic shown in FIG. 9 is referred to as CR-pressure or VFS3-MOD pressure.

The main regulator valve of FIGS. 10 and 11 consist of the valve spool itself, the inner spring, the outer spring, the booster valve, the VFS1/VFS2 valve lands and valve lands at the exhaust port end of the valve assembly. It is the main function of the main regulator valve to distribute incoming pump oil flow between the users of line pressure such as the modulator valves or the clutches or the bypass for lubrication or converter charge passages. This distribution function is controlled by the piloting pressures produced by VFS1, VFS2 and R pressure. The piloting pressures are in equilibrium with the line pressure, thereby producing-the pressure build-up characteristics shown in FIG. 13.

The D/3/2/1 pressure schedule is the line pressure build-up in all forward gears. The R pressure schedule is the pressure build-up in reverse position. In this case, R pressure is applied to the booster valve, thereby amplifying line pressure. When no pilot pressures are applied, the inner and outer spring on the main regulator valve assembly of FIG. 10 produces a minimum line pressure, which is referred to as "idle line pressure". Oil flows continuously to the converter clutch circuit CC through the converter clutch bypass orifice. This is required in order to supply sufficient converter charge pressure in case the main regulator valve is locked hydraulically.

Figure 17:
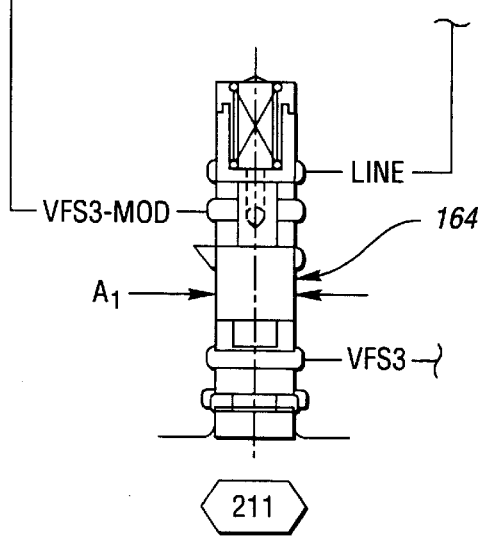
FIG. 17 is a pressure modulator valve for reverse drive in accordance with an optional design that may be used instead of the valve shown in FIG. 16.

A feature of the main regulator valve is the VFS1/VFS2 valve lands. These introduce a "LOGICAL OR" function for the piloting pressures VFS1 and VFS2. VFS1 pressure is applied on one valve land and VFS2 is applied on the other valve land. The valve lands are hydraulically or mechanically connected to the booster valve if VFS1 is higher than VFS2. These valve lands are grounded against the sleeve and VFS1 is active as a piloting pressure for the booster valve. If VFS2 pressure is higher than VFS1, the valve land is grounded against the booster valve and VFS2 pressure acts on the booster valve. VFS1 is deactivated since the pressures in the VFS1 chamber are equalized. An "optional design" is shown in FIG. 17, where the "logical OR" function is realized by the shuttle valve system. This OR function for the VFS1 and VFS2 pressures is essential for the upshift and downshift control during manual, automatic and select-shift manual control modes. Line pressure must be kept high enough at all times when one of the two variable force solenoids is used for upshift or downshift control in order to protect the forward clutch CL3 with sufficient capacity and to keep line pressure high enough to supply the modulator valves and the variable force solenoids with input pressures that are higher than the pressures of the variable force solenoid transfer functions and the pressures which the modulator valves are requesting.

Another feature of the main regulator valve system is the additional lubrication passage that is provided. The surplus oil from the pump is distributed in addition to the lube passage. This lube passage is connected to the rear lubrication system to provide additional lube oil to increase the reliability of the transmission lubrication system.

The solenoid regulator valve of FIG. 18 is a pressure limiting valve which reduces line pressure to a certain pressure regulating threshold. The pressure regulating threshold is determined by the spring load divided by the effective valve area. The reduced pressure, which is the solenoid regulator valve output pressure, is used as an input pressure for the shift solenoids SS1 and SS4 as indicated in FIG. 18.

The pressure build-up system for the modified or the supplemental transmission corresponding to the transmission of FIG. 2 is simplified compared to the transmission control system for the transmission of FIG. 2. It is functionally the same as the pressure build-up system for the control system for the transmission of FIG. 2 previously described.

Figure 20A:
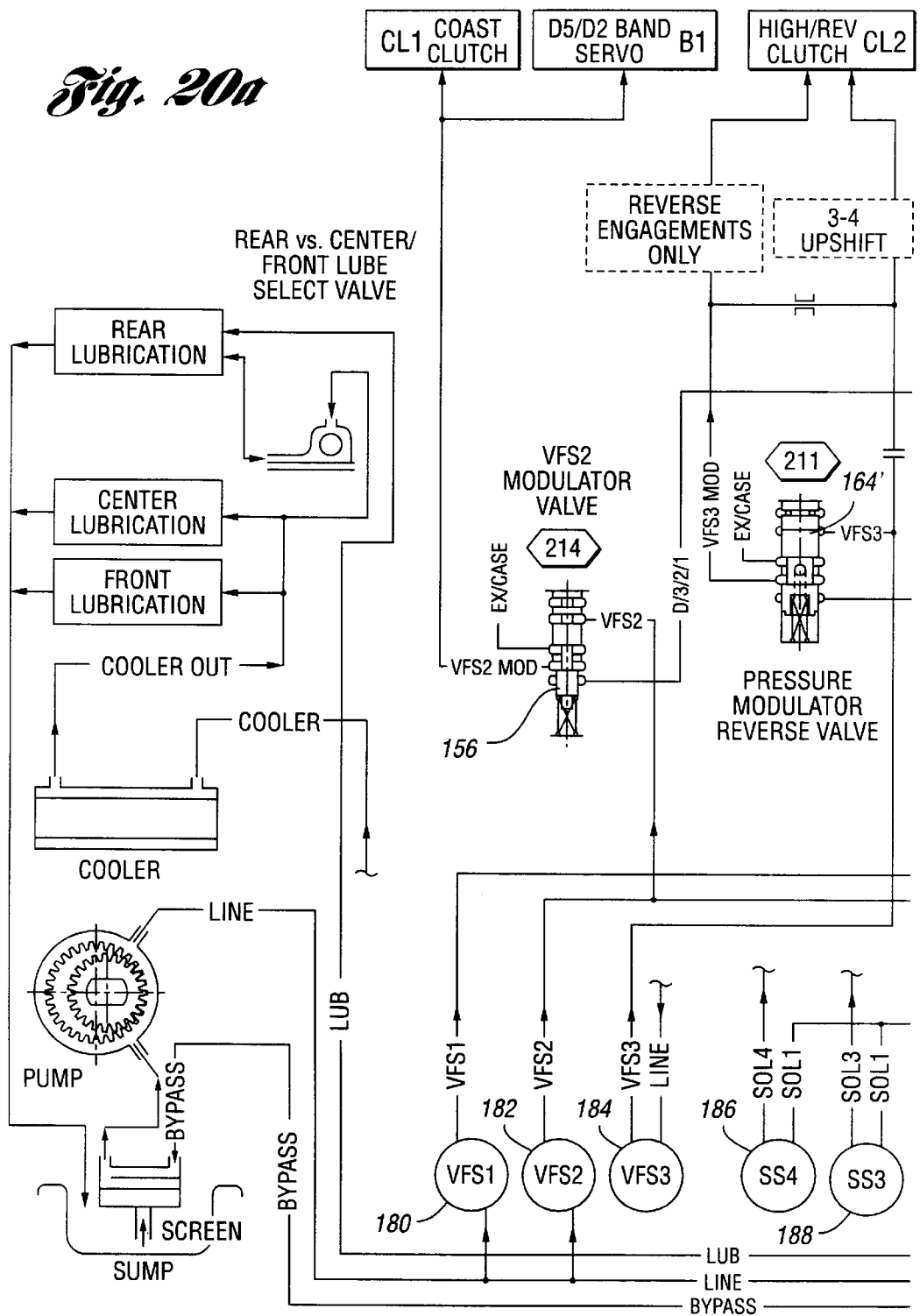
FIGS. 20a and 20b show a pressure build-up system for the synchronous transmission illustrated schematically in FIG. 2.
Figure 20B:
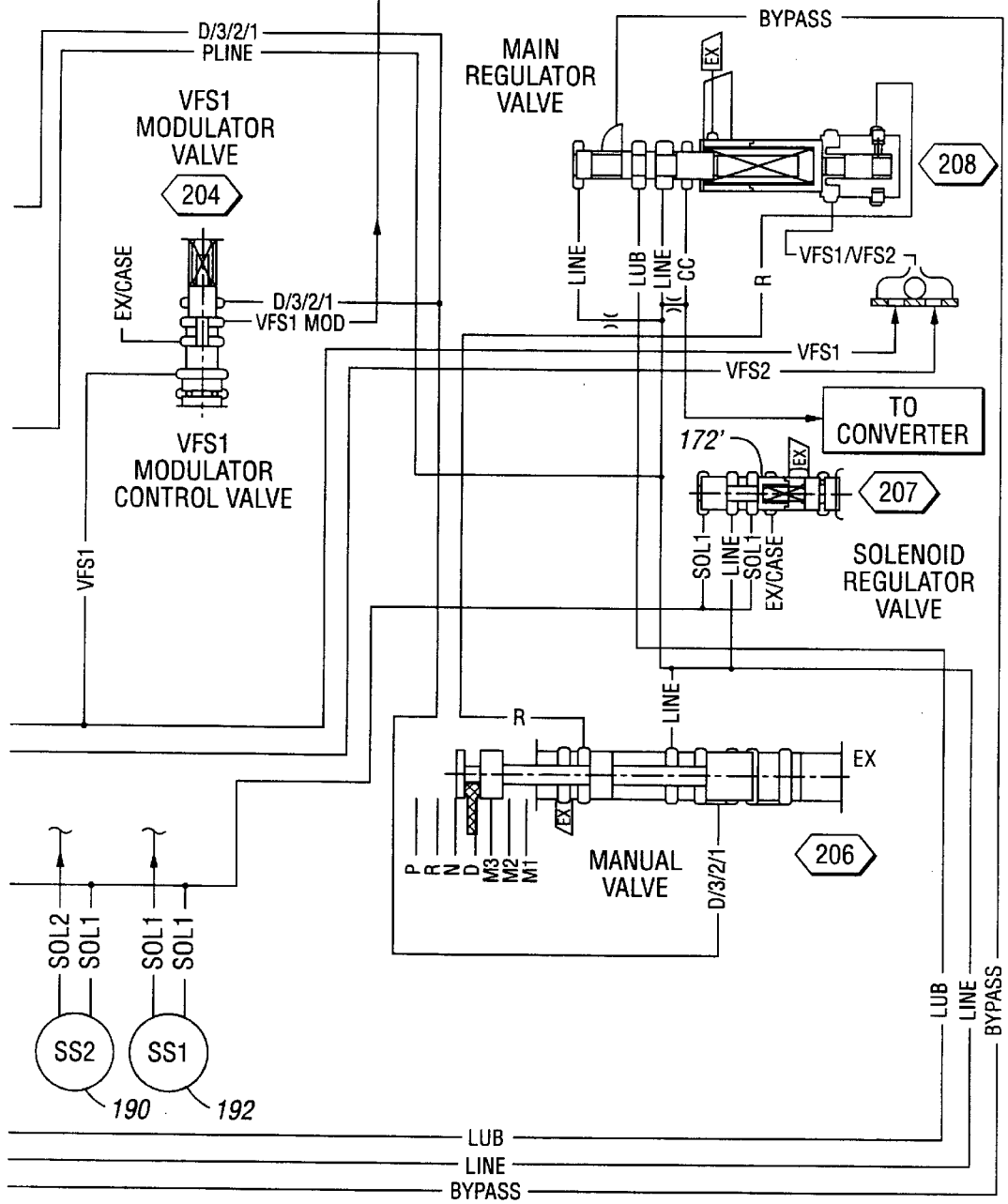

The multiplexing functions of the three variable force solenoids VFS1, VFS2 and VFS3 shown in FIG. 20a are the same as the multiplexing functions for the control system of the transmission of FIG. 2 previously explained. The difference between the transmission control system of FIGS. 20a and 20b and the control system for the transmission of FIG. 2 is that the VFS1/2 modulator control valve system is deleted. Thus, VFS1-MOD pressure or VFS2-MOD pressure is applied to the various clutches and brakes. The deletion of the VFS1/VFS2 control valve system is feasible only if the pressure characteristics of the VFS1/VFS2-MOD valves are dropped at point A, shown in FIG. 21, which is the stall pressure during driving. Since both pressure schedules VFS1/VFS2-MOD and D/3/2/1 pressure end up with the same maximum pressure, the selection of one or the other of these pressures to satisfy the stall capacity is not required. Therefore, the VFS1/2 modulator control valve system is not required. The corresponding point for reverse is point B in FIG. 21.

The pressure modulator valve for reverse is shown in FIG. 17. The reverse pressure modulator valve is used for reverse engagement control of the direct clutch CL2 and for 3–4 upshift control. This function is basically the same as the function of the VFS1 and VFS2 modulator valves except that no differential area is present.

The reverse pressure modulator valve is actuated by VFS3 pressure. The feed pressure for this modulator valve is line pressure. This allows the use of the modulator valve for reverse engagements as well as for 3–4/4–3 and 5–3 shift control. Line pressure is applied to the back side (spring side) of the valve shown in FIG. 17. That line pressure is in equilibrium with the spring load and with VFS3 pressure load applied at the other end of the valve. This achieves a 1:1 transfer function for VFS3 pressures versus VFS3-MOD pressure plus an offset. FIG. 9 shows the pressure characteristic for the engagement control valve for reverse illustrated in FIG. 17.

Figure 13:
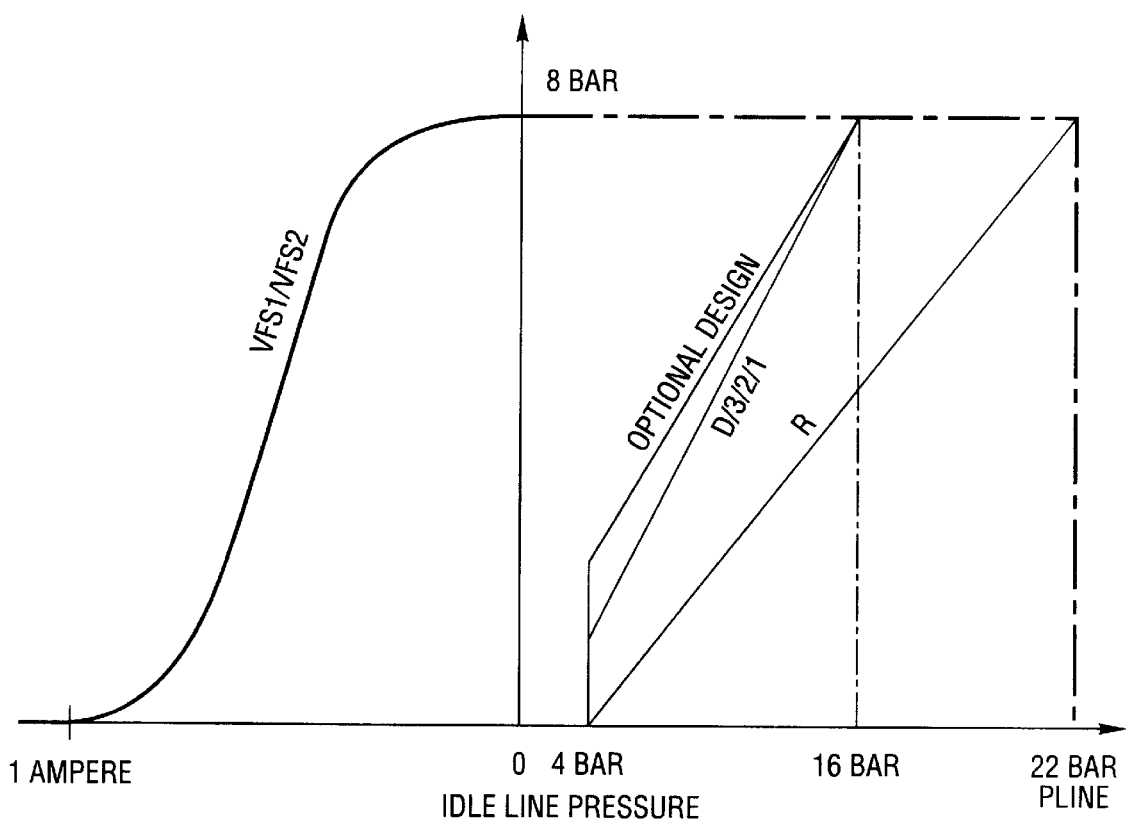
FIG. 13 is a chart showing the variable force solenoid pressures for the two solenoid valves that affect the main regulator valves of FIGS. 10 and 11.
Figures 12A, 12B:
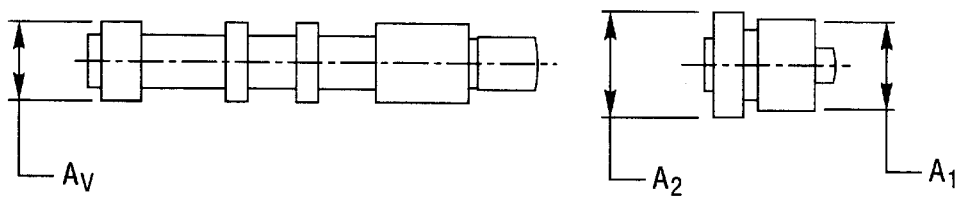
FIGS. 12a and 12b show the details of the regulator valve of FIG. 11 including the main valve spool and the booster valve spool.

The main regulator valve of FIG. 11 is similar to the main regulator valve of FIG. 10 except that the VFS1/VFS2 valve lands are deleted and replaced by a shuttle valve which multiplexes VFS1 pressure and VFS2 pressure for the booster valve. Another distinction between these two regulator valves is that the outer valve spring and its retainer is deleted in the construction of FIG. 11. By adjusting the other remaining valve spring and the booster land area, an optional pressure characteristic as shown in FIG. 13 can be obtained. This optional pressure characteristic can be used to improve pump flow efficiency. For the purpose of describing further the pressure build-up characteristics of the various pressure modulator and pressure build-up systems, reference will be made again to FIG. 9 for the transmissions of FIGS. 1 and 2 and to FIG. 21 for the modified transmission or the supplemental transmission corresponding to the transmission of FIG. 2. As indicated previously, the pressure slopes for the VFS1 and VFS2 pressures are multiplexed with respect to the various clutches and brake bands. The following table shows which pressures are applied on each element during pressure build-up of the transmission of FIG. 1.

| | Transmission of FIG. 1 | | | | | | |
|---|---|---|---|---|---|---|---|
| | Overdrive Planetary Gear Set | | Simpson Planetary Gear Set | | | | |
| | B1 | CL1 | CL2 | CL3 | B3 | B2 | CL4 |
| VFS1 | | | | D/3/2/1 Pressure | VFS1-MOD or D/3/2/1 Pressure | | VFS1-MOD or D/3/2/1 Pressure |
| VFS2 | VFS2-MOD or D/3/2/1 Pressure | VFS2-MOD or D/3/2/1 Pressure | | D/3/2/1 Pressure | | VFS2-MOD or D/3/2/1 Pressure | |
| VFS3 | | | VFS3-Pressure in Forward OR CL-R-Pressure in Reverse | | | | |

Controlled By = Shaded Areas

VFS2-MOD pressure is used to control the overdrive brake band B1 and the coast clutch CL1 capacity. The pressure characteristic is shown in FIG. 9. VFS2-MOD pressure as well as VFS1-MOD pressure build-up schedules are lower than the line pressure schedule. This is required in order to maintain at all times sufficient line pressure as the feed pressure to the modulator valves. The VFS2-MOD pressure also controls the intermediate brake band B2, which is used as a braking element in third ratio. The VFS1-MOD pressure schedule is used to control the capacity of the intermediate clutch CL4 and the reverse brake band B3. The forward clutch is controlled by D/3/2/1 pressure, which is line pressure distributed from the manual valve 170 in manual positions D, M3, M2, and M1. VFS3 pressure is directly applied to the high clutch CL2 in all forward gears. No pressure amplification is required at this time since the high clutch only transmits a fraction of the input torque in the fourth gear and in the fifth gear. In reverse gear, CR pressure controls the high clutch during reverse engagements. R pressure is applied to the high clutch when reverse engagement is executed.

The following table shows which pressures are applied in the case of the transmission of FIG. 2.

| | Transmission of FIG. 2 | | | | | |
|---|---|---|---|---|---|---|
| | Overdrive Planetary Gear Set | | Simpson Planetary Gear Set | | | |
| | B1 | CL1 | CL2 | CL3 | B3 | B2 |
| VFS1 | | | | D/3/2/1 Pressure | VFS1-MOD or D/3/2/1 Pressure | VFS1-MOD or D/3/2/1 Pressure |
| VFS2 | VFS2-MOD or D/3/2/1 Pressure | VFS2-MOD or D/3/2/1 Pressure | | D/3/2/1 Pressure | | |
| VFS3 | | | VFS3-Pressure in Forward OR CR/R-Pressure in Reverse | | | |

Controlled By = Shaded Areas

Basically, the pressures indicated for the transmission of FIG. 2 are the same as those indicated for the transmission of FIG. 1 except that there is no intermediate clutch CL4 to be controlled and the intermediate brake band B2 capacity is controlled by VFS1-MOD pressure instead of VFS2-MOD pressure.

In the case of the modified or supplemental transmission corresponding to the transmission of FIG. 2, the pressures that are applied to the clutches and brakes are indicated in the following table.

| | Supplemental Transmission Corresponding to the Transmission on FIG. 2 | | | | | |
|---|---|---|---|---|---|---|
| | Overdrive Planetary Gear Set | | Simpson Planetary Gear Set | | | |
| | B1 | CL1 | CL2 | CL3 | B3 | B2 |
| VFS1 | | | | D/3/2/1 Pressure | VFS1-MOD Pressure | VFS1-MOD Pressure |
| VFS2 | VFS2-MOD Pressure | VFS2-MOD Pressure | | D/3/2/1 Pressure | | |
| VFS3 | | | VFS3-MOD Pressure in Forward AND Reverse | | | |

Controlled By = Shaded Areas

The only difference, as indicated in the foregoing table, is that the direct clutch CL2 is applied with the VFS3-MOD pressure in forward and reverse drive.

Figure 21:
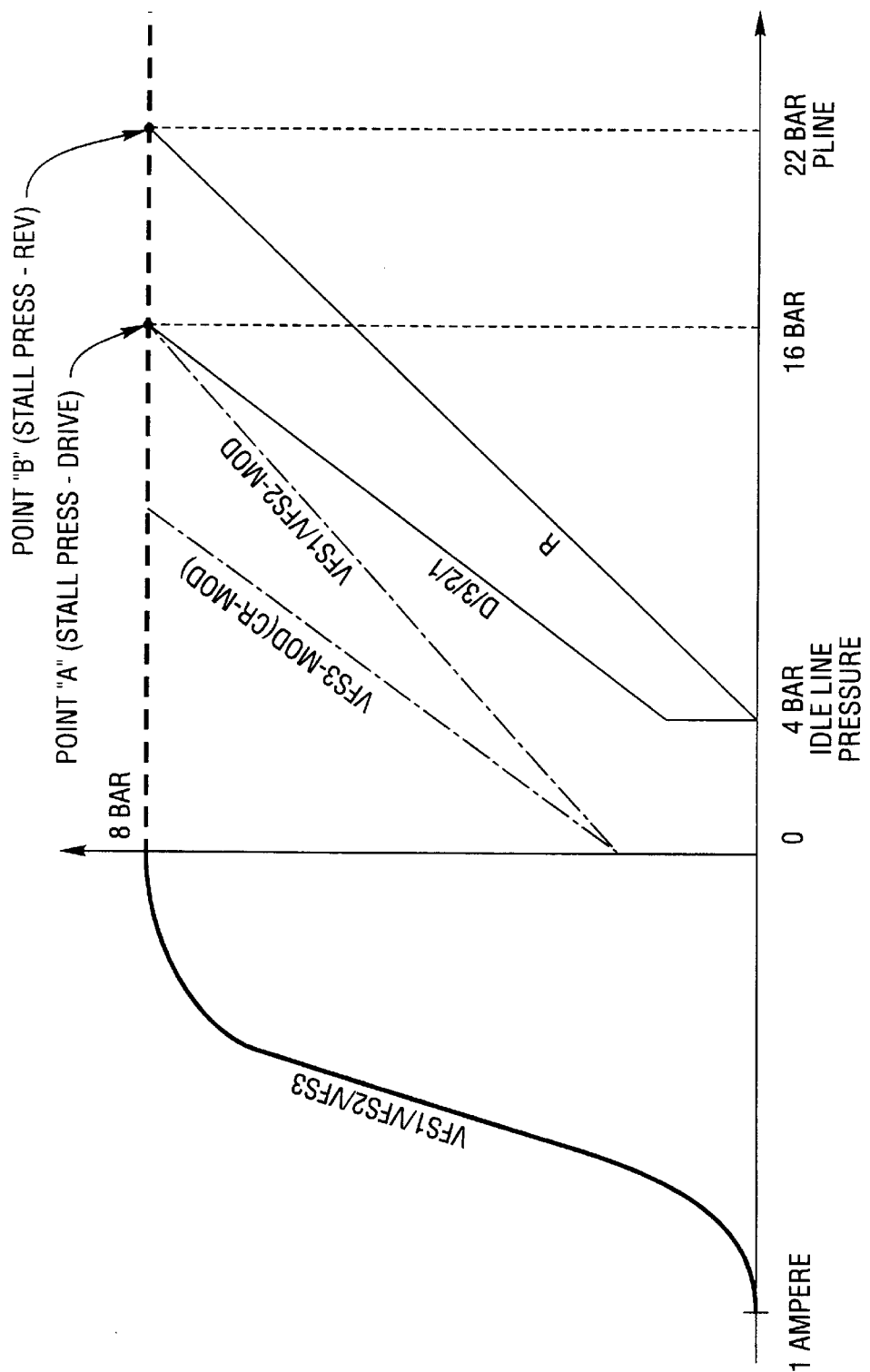
FIG. 21 is a chart showing the pressure build-up characteristic for a modified synchronous transmission that may be used with the transmission schematically illustrated in FIG. 2.

The stall pressure control for the select-shift manual (SSM) control mode allows the driver to start-up in each gear when the SSM drive mode is selected. This causes the control system to provide stall capacity for each shifting element except the coasting elements (CL1 and B3 for the transmission of FIG. 2; CL1, B2 and B3 for the transmission of FIG. 1). As shown in FIGS. 9 and 21, the stall pressure setting in drive is about 16 bar and the stall pressure setting for reverse is about 22 bar. The shifting elements are the overdrive brake band B1, the intermediate clutch CL4, and the high clutch CL2 for the transmission of FIG. 1. In the case of the transmission of FIG. 2, the shifting elements are the brakes B2 and B1 and the clutch CL2. Forward clutch CL3 also needs stall capacity to effect driveaway in first gear. Reverse brake band B2 and the high clutch CL2 in reverse also need high stall capacity.

Individual stall capacity for all of the shifting elements is achieved by the VFS1/2 modulator valve control system as shown in FIG. 14. This valve system multiplexes stall pressure and VFS-MOD pressure for the shifting elements. VFS3 pressure provides stall capacity for the direct clutch CL2. In the case of the modified transmission or the supplemental transmission corresponding to the transmission of FIG. 2, the modulator control valve system is not present. The stall capacity for each shifting element is provided directly by the higher pressure gain VFS1/2-MOD pressure characteristic. The stall capacity for the direct clutch is provided by the VFS3-MOD valve system. Again, it is important that the stall pressure system provide adequate stall capacity because of the presence of the select-shift manual control options.

The main regulator valve system as previously described provides additional lubrication oil flow which is distributed to the rear lubrication system. The surplus oil from the main regulator valve thus can be used for lubrication purposes.

FIG. 19 shows a schematic of the center lubrication system and the front lubrication system. The same valve system is shown in the pressure build-up schematic diagrams of FIGS. 8a and 8b and FIGS. 20a and 20b. The shuttle valve in the lubrication oil circuit distributes lubrication oil provided by the cooler and the lubrication oil provided by the main regulator valve to the rear, the center, and the front lubrication systems. The select valve identified in the drawings as the rear, center and front lube select-valve is located between the rear lubrication system and the center/front lubrication system. The flow rate provided by the main regulator valve lubricates the rear lubrication system and acts on one side of the select valve, which is a ball valve. A different flow rate that is provided by the cooler acts on the other side of the ball valve element of the select valve. If the first flow rate is higher than the second flow rate, the rear lubrication system sees the higher flow rate. The second flow rate then is available for the center and the front lubrication system only, which enhances the reliability of the components lubricated with these systems. If the first flow rate is lower than the second flow rate, then the excess lubrication oil is distributed to the transmission which distributes the cooler oil to the rear, the center, and the front lubrication exits.

Functional Description of the Automatic, the Manual and the Select-Shift Manual Control Systems for the Transmissions of FIGS. 1 and 2

The shift control system for the transmission of FIG. 1 is shown in FIGS. 22a, 22b and 22c through FIGS. 26a–26b. These Figures respectively represent the valve positions for first gear through fifth gear.

The shift control system for the transmission of FIG. 2 is shown in FIGS. 27a and 27b through FIGS. 31a–31b. These Figures indicate the valve positions for first gear through fifth gear, respectively.

The shift control system for the modified or supplemental transmission corresponding to the transmission of FIG. 2 is indicated in FIGS. 32a and 32b through FIGS. 36a–36b. These Figures illustrate the valve positions for first gear through fifth gear, respectively.

The shift control system includes four on/off shift solenoids for the transmissions of FIGS. 1 and 2. The valves are identified as follows: intermediate servo control valve 158, high clutch control valve 160, reverse servo control valve 168, intermediate servo apply control valve 176, overdrive servo control valve and valve bore 215, coast clutch control valve 150, and reverse inhibitor valve 172 in valve bore 207.

In the case of the modified or supplemental transmission corresponding to the transmission of FIG. 2, there are six shift valves. These are: the intermediate servo release control valve 158 in valve bore 213, the high clutch control valve 160 in valve bore 212, the rear servo control valve 168, the intermediate servo apply control valve 176, the overdrive servo control valve in valve bore 202, and the coast clutch control valve 150.

The control systems for the transmissions of FIGS. 1 and 2 both have a reverse inhibitor valve 172. In the case of the modified or the supplemental transmission corresponding to the transmission of FIG. 2, the reverse inhibitor valve is deleted and is integrated into the rear servo control valve 168. Both the transmission of FIG. 2 and the modified or supplemental transmission corresponding to FIG. 2 have different intermediate servo control valves in valve bore 213 and different high clutch control valves in valve bore 212 compared to the control valve system for the transmission of FIG. 1. This is due to the fact that the transmission of FIG. 1 consists of a mechanically desynchronized 3–4 and 4–3 valve system, which is achieved by the intermediate clutch CL4 and the intermediate one-way clutch OWC3. The transmission of FIG. 2 does not have this feature. That is, it does not have an overrunning coupling corresponding to OWC3.

The four shift solenoids are shift solenoids SS1, SS2, SS3 and SS4. These actuate the shift valves mentioned in the preceding discussion. The shift valves then distribute VFS1/VFS2/VFS3-MOD pressures or line pressures to the various clutches. The shift valve configuration, in combination with the shift solenoids and the pressure build-up system, is capable of controlling upshifts and downshifts in the automatic control mode, the manual control mode, and the select-shift manual control mode.

The shift control functions for the four shift solenoids are set forth as follows. Shift solenoid SS4 controls the coast clutch CL4 and the reverse brake band B3. Both elements are braking elements. CL1 provides engine braking in the overdrive planetary gear set and B3 provides engine braking in the multiple ratio Simpson planetary gear set, as previously explained.

Shift solenoid 188 (SS3) controls the engagement and disengagement of the overdrive brake B1. It does this by controlling the movement of the overdrive servo control valve in bore 215. Additionally, SS3 pressure acts on the coast clutch control valve 150 to ensure that the effect of SS4 pressure on valve 150 is overridden. This prevents simultaneous engagement of the coast clutch CL1 and the overdrive brake B1.

The shift solenoid 190 (SS2) controls the intermediate brake band B2 for the transmission illustrated in FIG. 1. This brake is used as a reaction element for the multiple ratio Simpson planetary gear set. SS2 pressure is distributed to the upper end of the valve 158 to shift that valve against the opposing force of the spring at the lower end of the valve.

Four possible solenoid stages can be developed using the output pressure of shift solenoid 192 (SS1) and SS2 pressure. These solenoid pressures control the other clutch and brake elements of the multiple ratio Simpson planetary gear set. These elements are the high clutch CL2, the intermediate clutch CL4 in the transmission of FIG. 1 and the intermediate servo apply and release pressure chamber for intermediate band servo B2.

The following table illustrates the control logic for the four shift solenoids SS1, SS2, SS3 and SS4. In the D1 automatic control mode in first gear with the manual lever in the D position, the shift solenoid states are as indicated in the table.

| SS1 | SS2 | SS3 | SS4 |
|---|---|---|---|
| ON | OFF | OFF | ON |

On the other hand, when the transmission is in the select-shift manual control mode (SSM1) with the manual lever in the D position and the manual control mode M1 with the manual lever in the M1 position, the solenoid states are as indicated in the following table.

| SS1 | SS2 | SS3 | SS4 |
|---|---|---|---|
| ON | OFF | OFF | OFF |

Figure 22A:
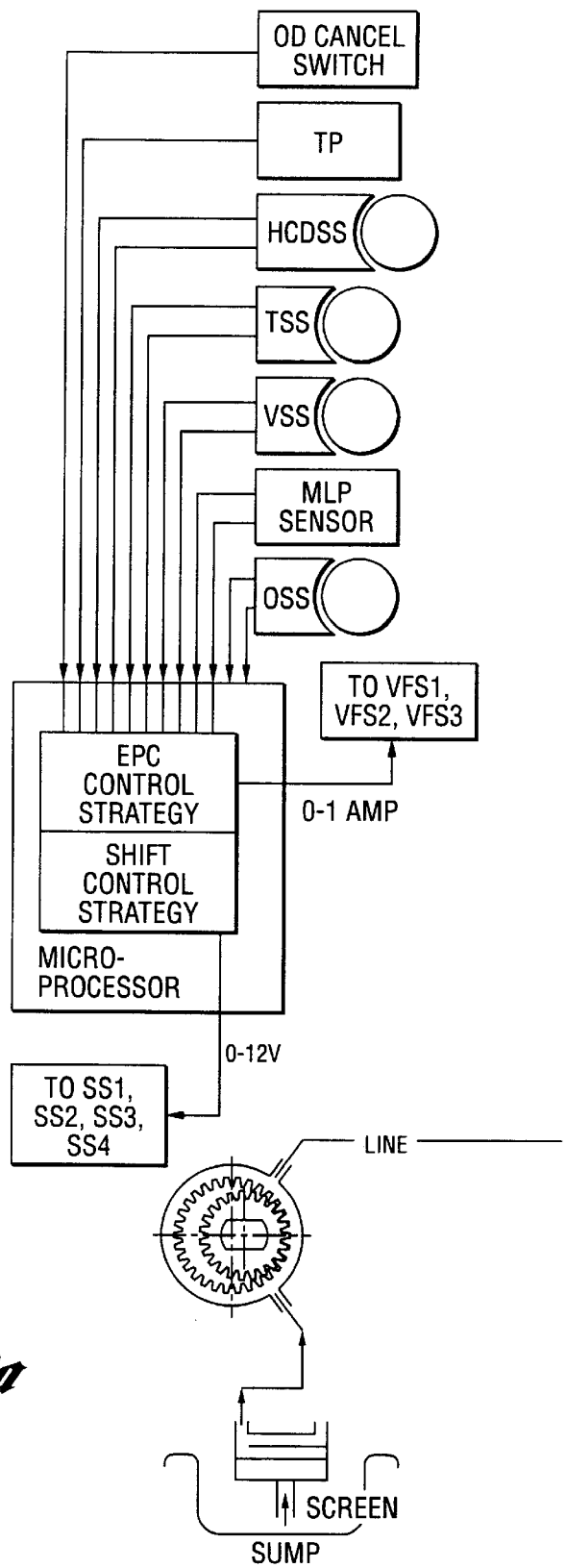
FIGS. 22a, 22b and 22c show a shift control valve system for the non-synchronous transmission schematically shown in FIG. 1 wherein the transmission elements are in the positions corresponding to the automatic drive mode in first gear (D1), select-shift manual mode (SSM1) and manual mode (M1)
Figure 22B:
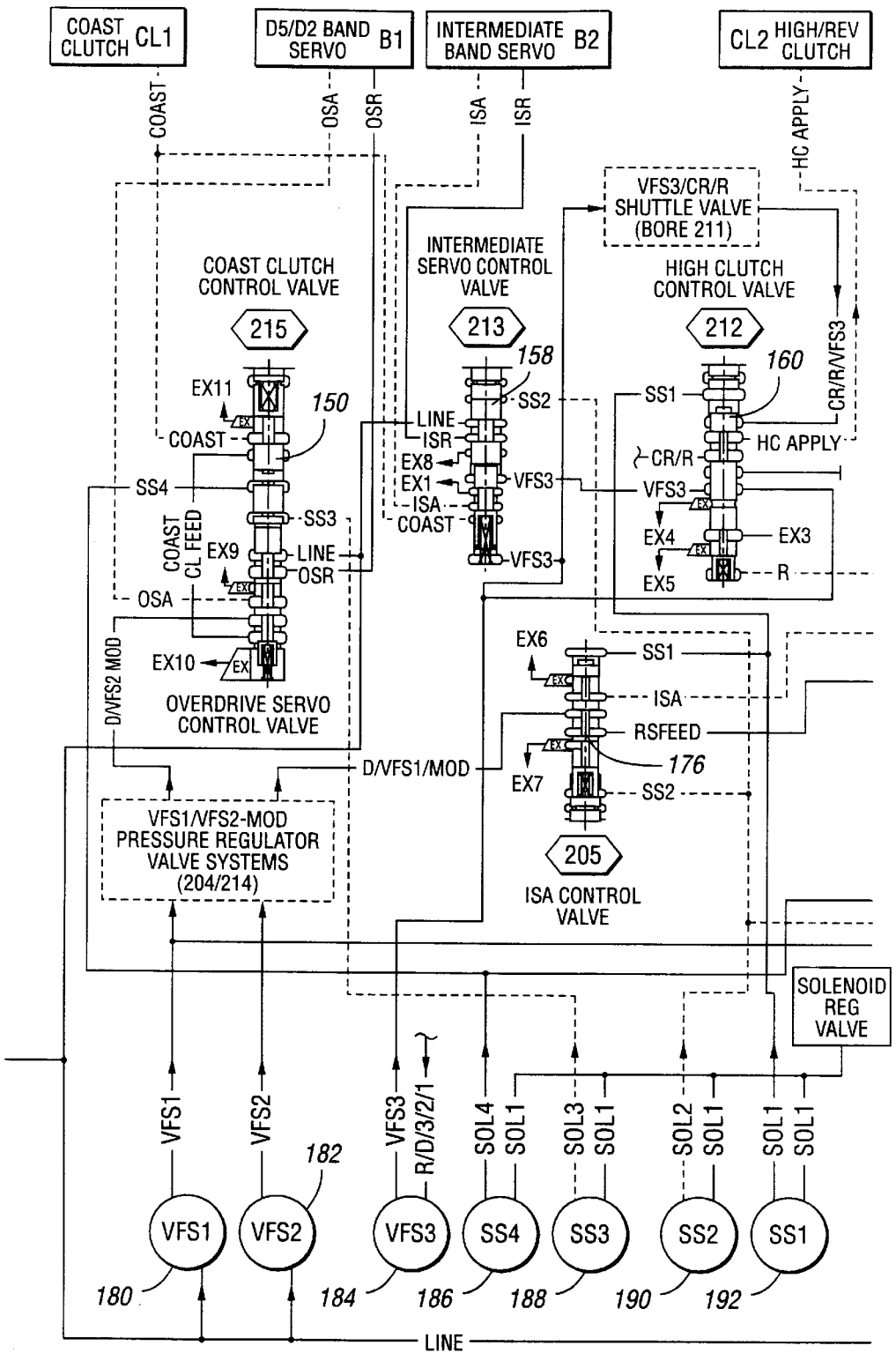
Figure 22C:
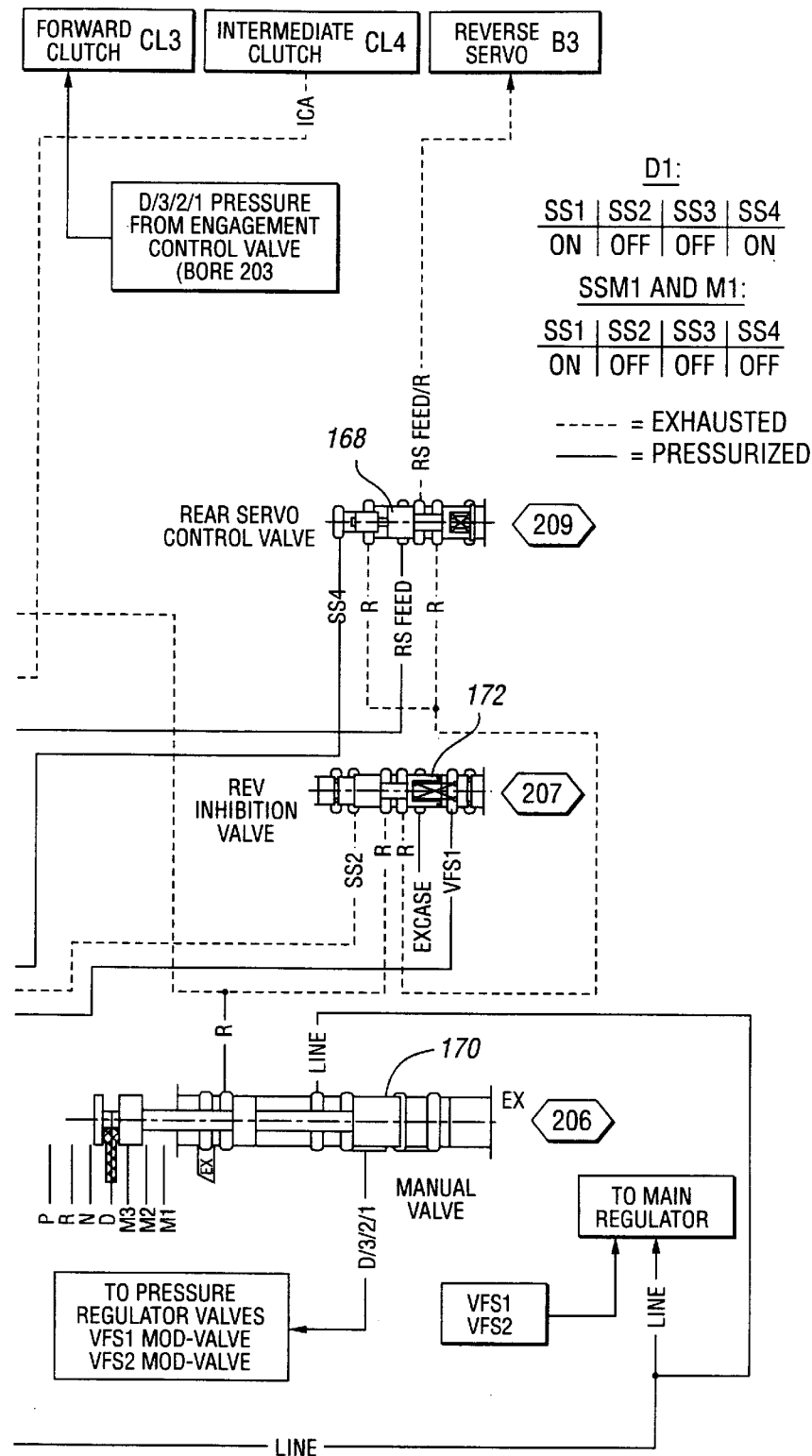

FIGS. 22a, 22b and 22c show the control system for the transmission of FIG. 1 when it is in the D1 mode. No engine braking is available. Thus, the coast clutch CL1 and the reverse brake band B3 are disengaged.

Shift solenoid 192 (SS1) is energized so that SS1 pressure is distributed to the top of the valve 160, which causes the high clutch control valve to upshift. This exhausts the high clutch into the CR/R exhaust port shown in FIG. 22b. The intermediate servo apply control valve 176 is also in the upshift position since it is subjected to SS1 pressure causing it to shift against the force of the spring acting on the other end of the valve. The upshifted valve 176 exhausts the intermediate clutch into the exhaust port EX6 for the valve 176, as seen in FIG. 22b. VFS1-MOD pressure is distributed to the RS feed circuit through the valve 176 thereby connecting VFS1-MOD pressure with the rear servo control valve at 168 in FIG. 22c.

Shift solenoid SS4 also is energized, thereby moving the rear servo control valve 168 to the upshift position and exhausting the reverse servo apply side of brake B3 into the R circuit. Similarly, SS4 pressure moves the coast clutch control valve 150 to the upshift position, which exhausts the coast clutch CL1 into the exhaust port EX11 shown in FIG. 22b.

Shift solenoid 188 (SS3) is deenergized which moves the overdrive servo control valve in bore 215 into the downshift position. This connects line pressure to the overdrive servo release side of brake B1 and prevents the overdrive servo from stroking. The overdrive servo apply side (OSA) of the brake B1 is exhausted at exhaust port EX9 shown in FIG. 22b.

Shift solenoid 190 (SS2) is deenergized. This allows the intermediate servo control valve 158 to move into the downshift position. The intermediate servo release side of brake B2 (ISR) then is connected with line pressure, thereby preventing the servo from stroking. The intermediate servo apply side is exhausted through port EX1 in valve 158 as shown in FIG. 22b. Forward clutch CL3 is applied with line pressure. Thus, the transmission is in first gear. No engine braking is available.

When the control system of FIGS. 22a, 22b and 22c is in the SSM1 mode or the M1 mode and when engine braking is available, shift solenoid 186 is deenergized. The coast clutch control valve 150 at that time is moved into the downshift position. This connects the coast clutch feed circuit with VFS2-MOD pressure and applies VFS2-MOD pressure to the coast clutch. The rear servo control valve 168 moves to the downshift position. This connects the reverse servo feed circuit to the reverse servo B3, which engages the reverse brake band. The application of the coast clutch CL1 and the application of reverse band B3 provides engine braking for the multiple ratio gear set and the simple planetary gear set.

Figure 27A:
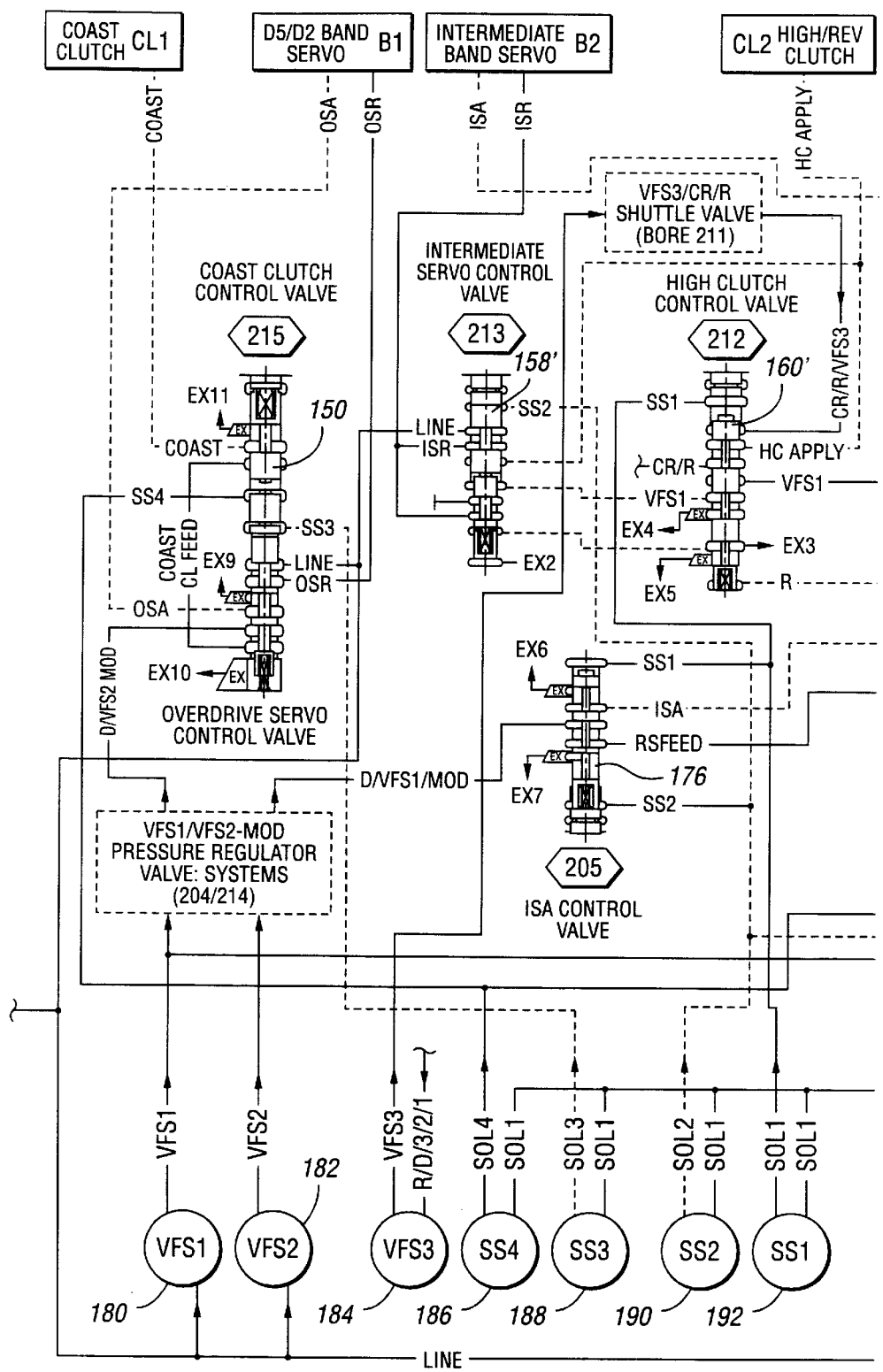
FIGS. 27a and 27b show a control valve system for the synchronous transmission of FIG. 2 wherein the gear elements are positioned for automatic drive mode first gear, select-shift manual mode (SSM1), and the manual mode 1 (M1)
Figure 27B:
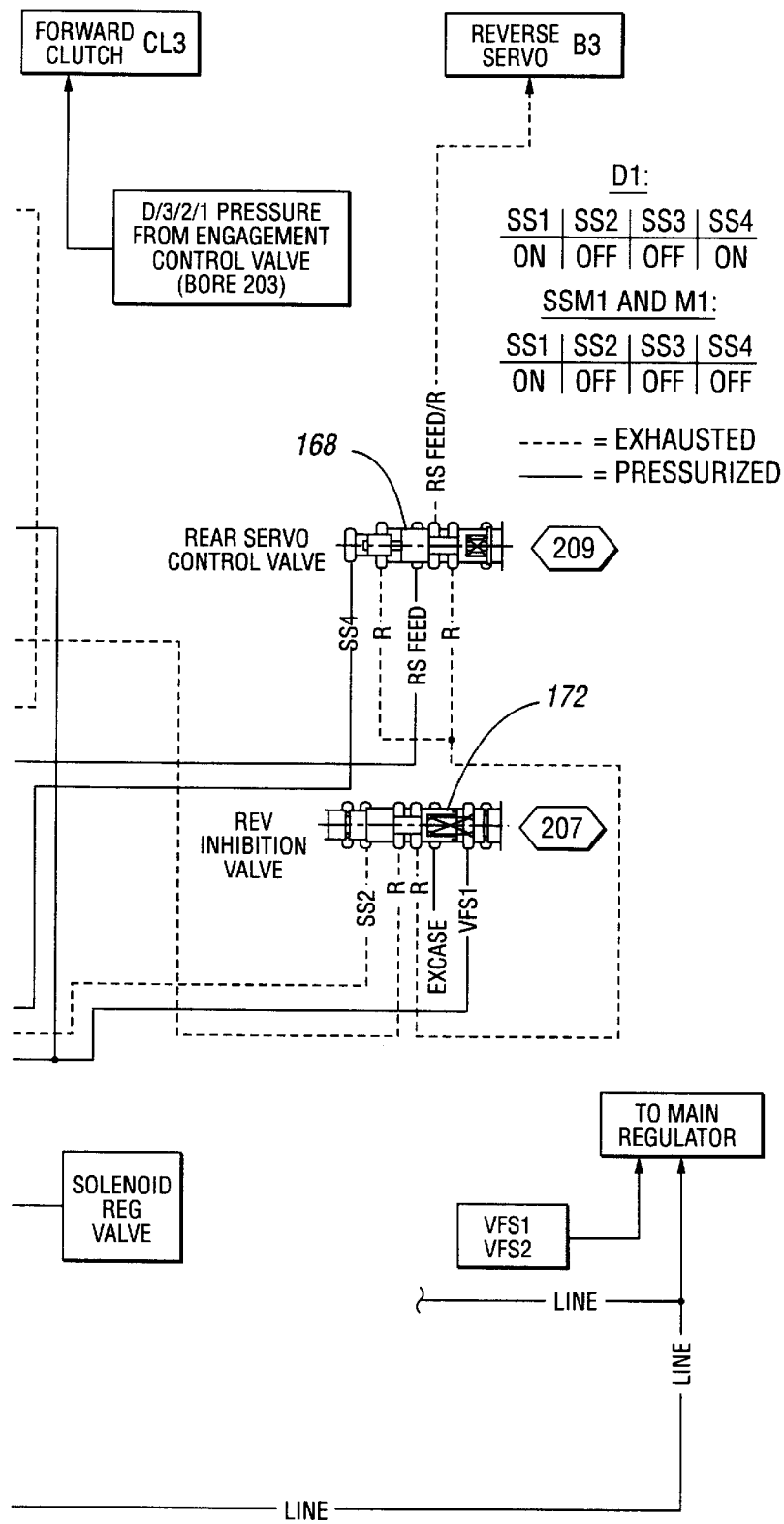

FIGS. 27a and 27b show the control valve system for the transmission of FIG. 2 when the transmission is in the D1 mode with no engine braking. The valves in FIGS. 27a and 27b are in the first gear positions. The shift control system is the same in this instance as the previously described control system for the transmission of FIG. 1 except that the intermediate servo control valve and the high clutch control valve 158' and 160', respectively, are different. Brake band B2 now is involved in the shift. No intermediate clutch CL4 is present as in the case of the transmission of FIG. 1.

The intermediate servo apply side for brake B2 is exhausted through the exhaust port EX6 at valve 176 in FIG. 27a. The upshifted high clutch control valve 160' disconnects VFS1 pressure from the differential area on the intermediate servo control valve 158'. All other shift control functions are the same as in the case of the control system of FIG. 1.

The control system for the transmission of FIG. 2, when the transmission is in the SSM1 mode or the M1 mode with engine braking, requires shift solenoid 186 (SS4) to remain deenergized. The rear servo control valve 168 in FIG. 27b at this time is in the downshift position causing the reverse servo to be engaged with VFS1-MOD pressure. Also, the coast clutch control valve 150 in FIG. 27a applies VFS2-MOD pressure to the coast clutch. Since the reverse servo and the coast clutch are applied, engine braking is effective in first gear.

Figure 32A:
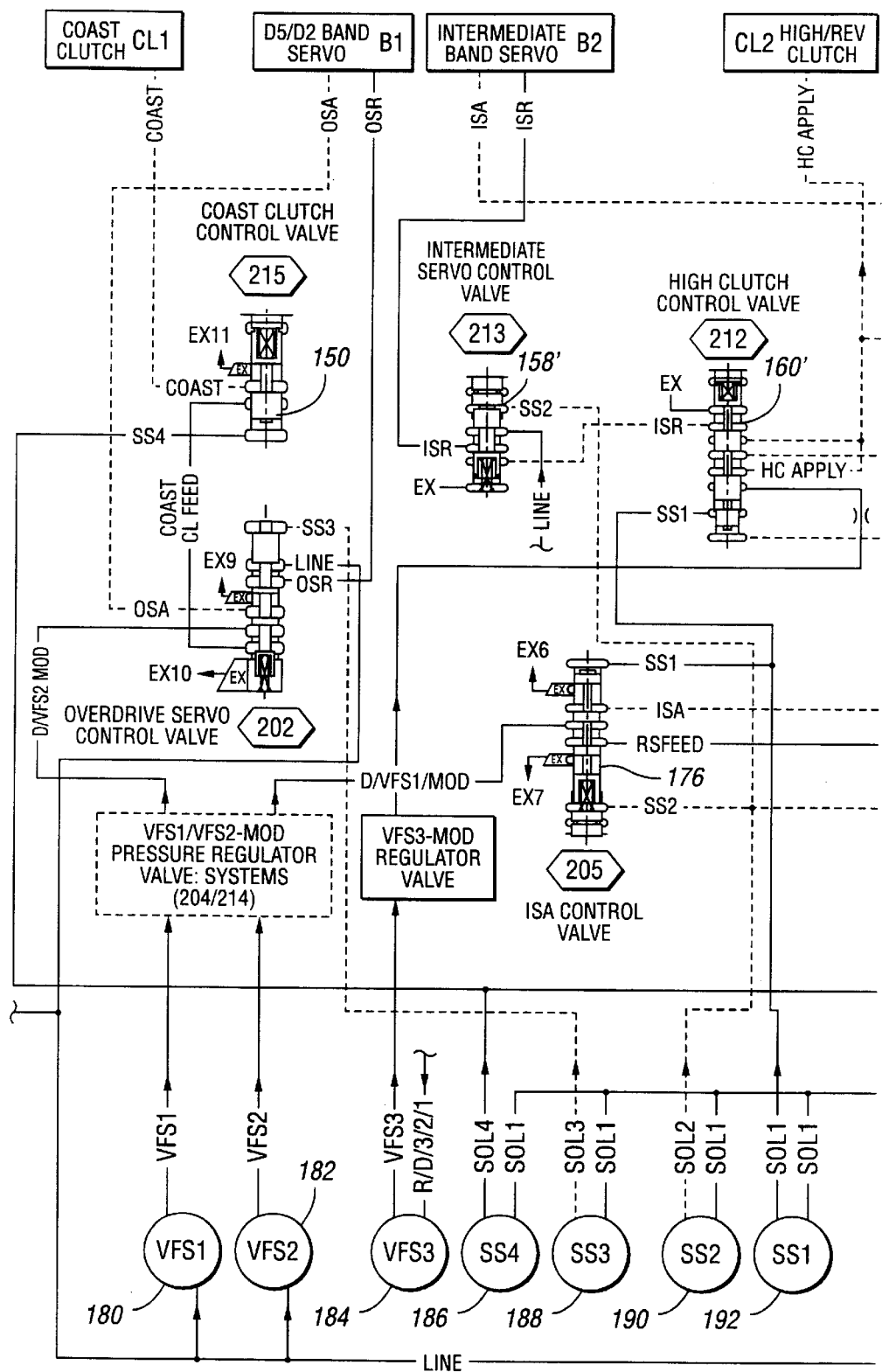
FIGS. 32a, 32b, 33a, 33b, 34a, 34b, 35a, 35b, 36a and 36b show a control valve system for a modified version of the synchronous transmission illustrated in FIG. 2, which correspond to FIGS. 27a through 31b, respectively.
Figure 32B:
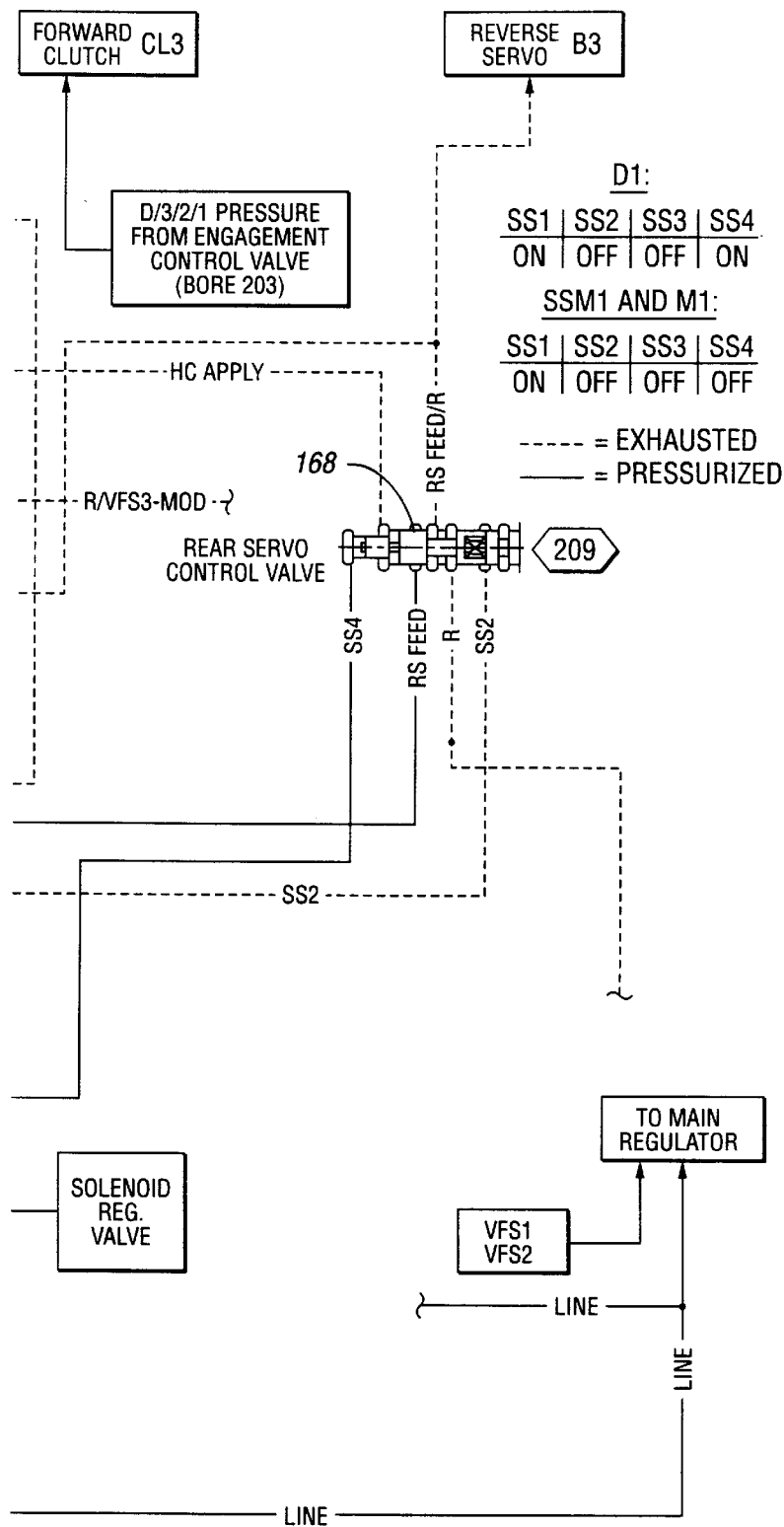

FIGS. 32a and 32b show the modified transmission corresponding to the transmission of FIG. 2 when the control system is in the D1 mode with no engine braking. The shift control system of FIGS. 32a and 32b, as explained previously, has a different high clutch control valve 160' in bore 212 and a different intermediate servo release control valve 158'. Both of these designs have the same function as the function of the control system for the transmission of FIG. 1 as previously described.

FIGS. 32a and 32b show the position of the valves for operation in the SSM1 mode or the M1 mode with engine braking. Shift solenoid 186 (SS4) is deenergized. This triggers the same valve functions explained previously with respect to the transmission of FIG. 2.

With the shift solenoid 186 deenergized, rear servo feed pressure is distributed to the reverse servo, thereby providing engine braking. At the same time, when the reverse servo is energized, the high clutch control valve 160' is overridden by the reverse servo pressure. This is required in order to prevent simultaneous engagement of the reverse servo B3 and the direct clutch CL2 in the event of a low ratio malfunction of shift solenoid 192 (SS1). Simultaneous engagement of the reverse servo and the direct clutch would trigger a lock-up of the Simpson planetary gear set.

The shift solenoid stages for all of the control systems described above are illustrated in the following table for operation in the D2 mode, which is the automatic control mode in second gear with the manual lever in the D position.

| SS1 | SS2 | SS3 | SS4 |
|-----|-----|-----|-----|
| ON  | OFF | ON  | ON  |

In the select-shift manual control mode (SSM2) with the manual lever in the D position and in the manual control mode (M2) with the manual lever in the M2 position, the shift solenoid stages are as follows:

| SS1 | SS2 | SS3 | SS4 |
|-----|-----|-----|-----|
| ON  | OFF | ON  | OFF |

Figure 23A:
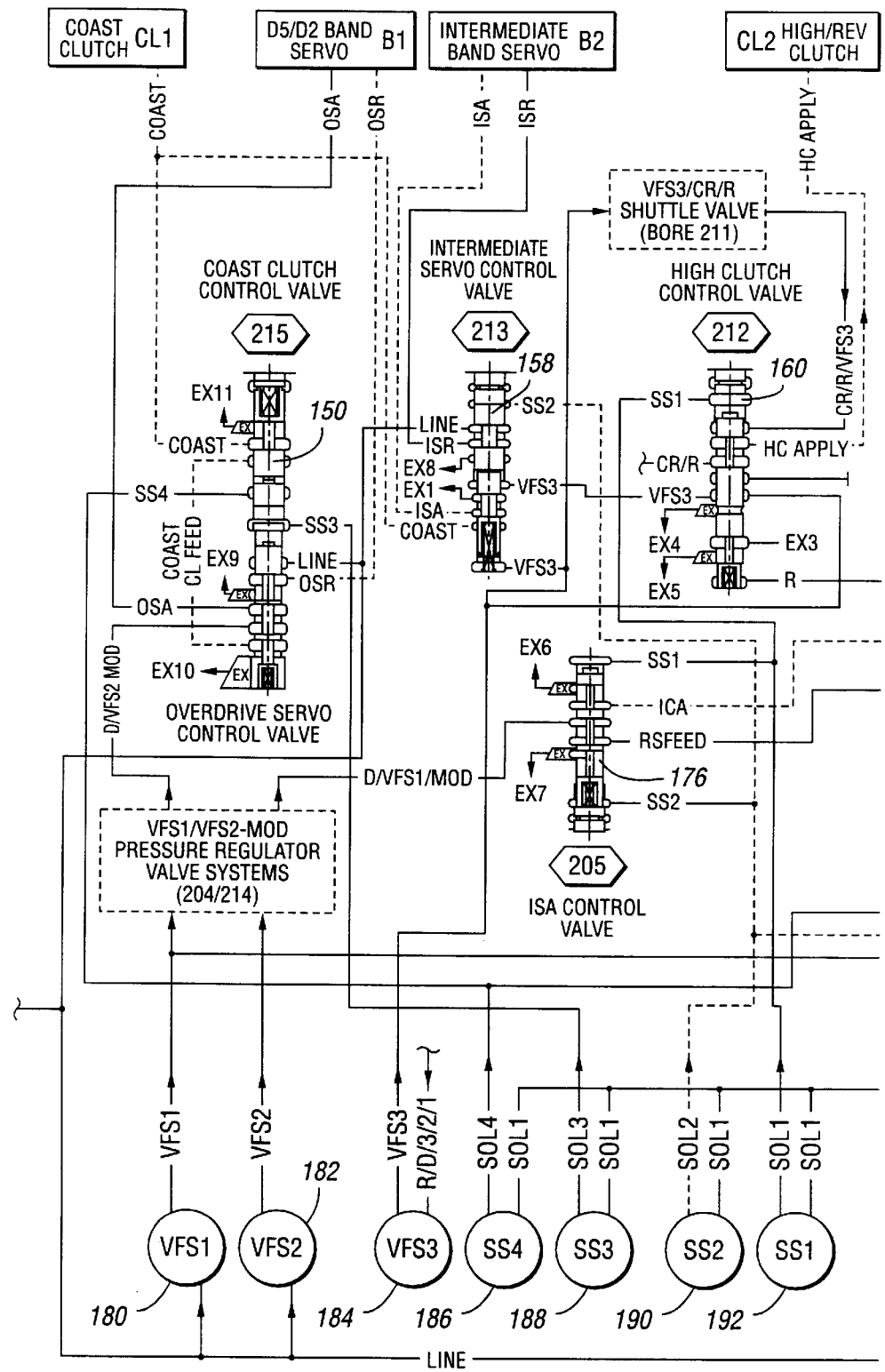
FIGS. 23a and 23b shows a portion of the shift control system of FIG. 21 wherein the transmission elements are in the positions corresponding to the automatic drive mode in second gear (D2), the select-shift manual mode 2 (SSM2), and the manual mode 2 (M2)
Figure 23B:
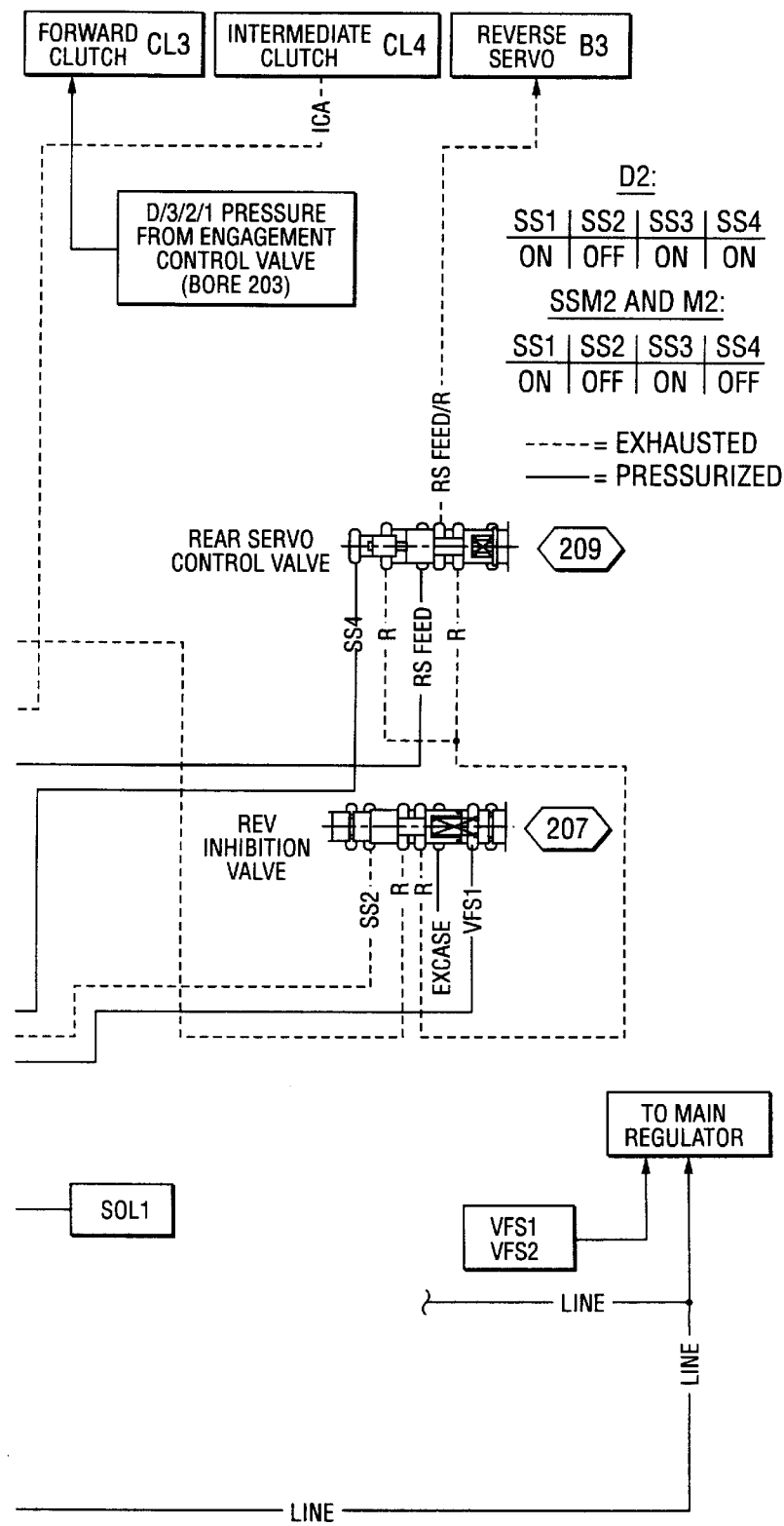

FIGS. 23a and 23b show the control system for the transmission of FIG. 2 when the transmission is in the D2 mode with no engine braking. At that time, reverse band B3 is disengaged.

Shift solenoid 192 (SS1) is energized at this time which causes the high clutch control valve 160 to move to the upshift position. This exhausts the high clutch into the CR/R exhaust port. The intermediate servo apply control valve 176 is also in the upshift position since it is subjected to SS1 pressure. The upshifted valve 176 exhausts the intermediate clutch through the exhaust port EX6 shown in FIG. 23a. The VFS1-MOD pressure enters the reverse servo feed circuit, which then distributes VFS1-MOD pressure to the rear servo control valve 168 shown in FIG. 23b.

Shift solenoid 186 (SS4) also is energized. This moves the rear servo control valve 168 shown in FIG. 23b into the upshift position, which exhausts the reverse servo apply side of the brake B3 into the R circuit. Similarly, SS4 pressure moves the coast clutch control valve 150 into the upshift position which exhausts the coast clutch CL1 through the exhaust port EX11 shown in FIG. 23a.

Shift solenoid 190 (SS2) is deenergized. This allows the intermediate servo control valve 158 to remain in the downshift position. The intermediate brake servo B2 (ISR) then is connected to line pressure, thereby preventing the servo from stroking. The intermediate servo apply side is exhausted through the exhaust port EX1 shown in FIG. 23a. The forward clutch is applied with line pressure and the transmission is conditioned for second gear operation without engine braking.

Shift solenoid 188 is energized in the D2 mode. The overdrive servo control valve 150 is in the upshift position. The overdrive servo release area for the brake B1 (OSR) is connected with the exhaust port EX9 shown in FIG. 23a. The overdrive servo apply area for brake band B1 (OSA) is subjected to VFS2-MOD pressure. The overdrive servo strokes and the overdrive brake band B1 builds up capacity. The sun gear of the overdrive planetary gear unit then is decelerated down to zero speed. At this time, a 1–2 upshift is complete. A 2–1 downshift can be executed by controlled release of VFS2-MOD pressure from the overdrive brake band B1. The capacity control of B1 can be terminated by deenergizing shift solenoid 188, which allows downshifting of the overdrive servo control valve in bore 215 as seen in FIG. 23a. The overdrive servo release side of brake B1 then is connected with line pressure and the overdrive servo apply side of brake B1 (OSA) is exhausted through the exhaust port EX9 seen in FIG. 23a. The transmission is then downshifted back into first gear.

The SS3 override control valve in bore 215 of FIG. 23a also is upshifted. This ensures that the coast clutch control valve 150 is upshifted in the event that SS4 pressure fails. This prevents a simultaneous engagement of the coast clutch and the overdrive brake band, which will trigger a tie-up of the simple planetary gear unit.

When the transmission of FIG. 1 is in the SSM2 mode or the M2 mode with engine braking, the valve elements of the control valve system are as shown in FIGS. 23a and 23b. In this instance, the shift solenoid 186 is deenergized. The rear servo control valve 168 is moved to the downshift position. This connects the reverse servo feed circuit with reverse servo B3, which engages the reverse brake band. Application of the reverse brake band provides engine braking for the multiple ratio Simpson gear set. Also, engagement of the overdrive brake band provides engine braking for the overdrive simple planetary gear set.

Figure 28A:
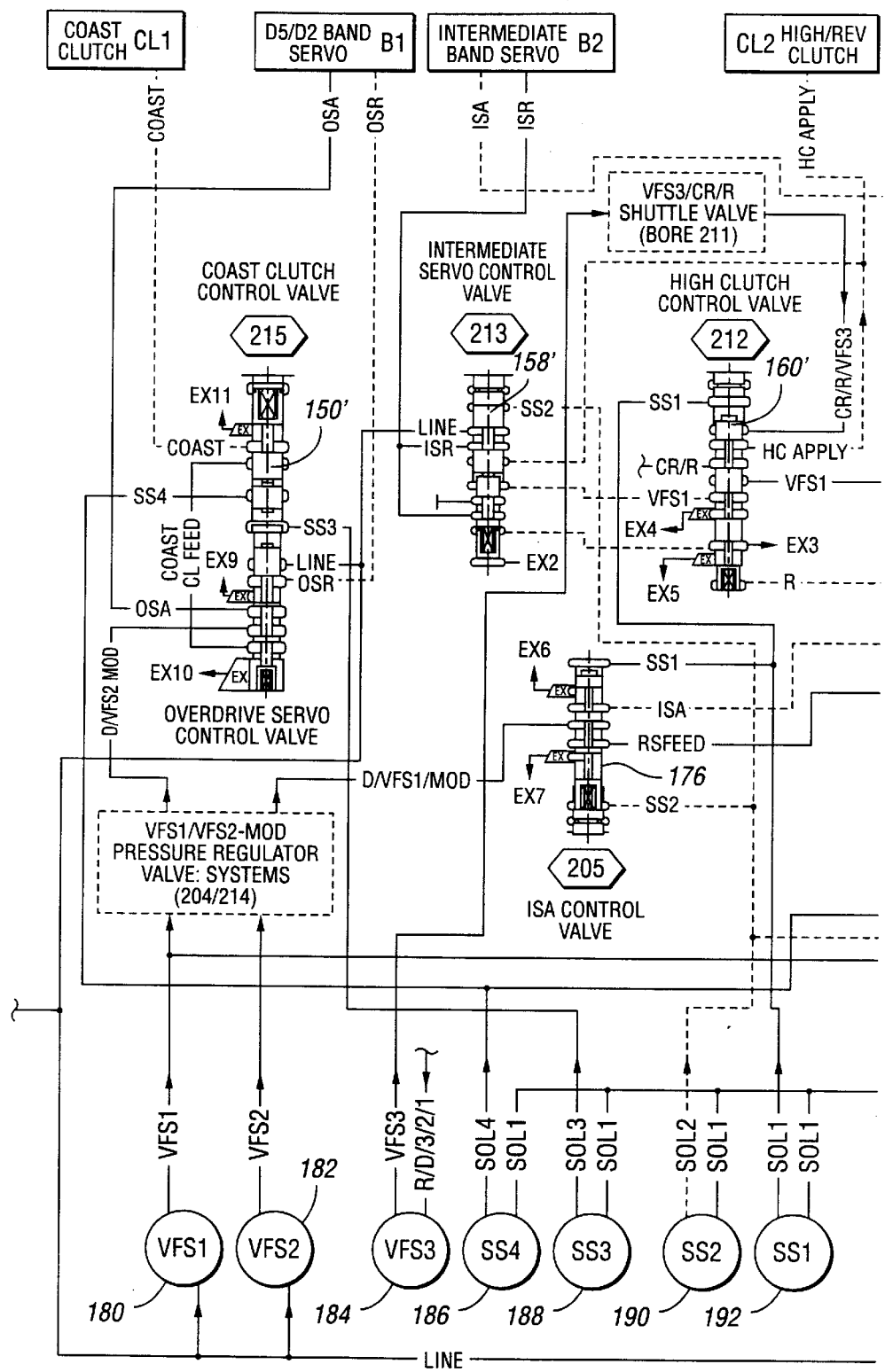
FIGS. 28a and 28b show the shift control valve system corresponding to FIGS. 27a and 27b wherein the valve elements are positioned for second gear ratio operation D2, select-shift manual mode 2, and manual mode 2.
Figure 28B:
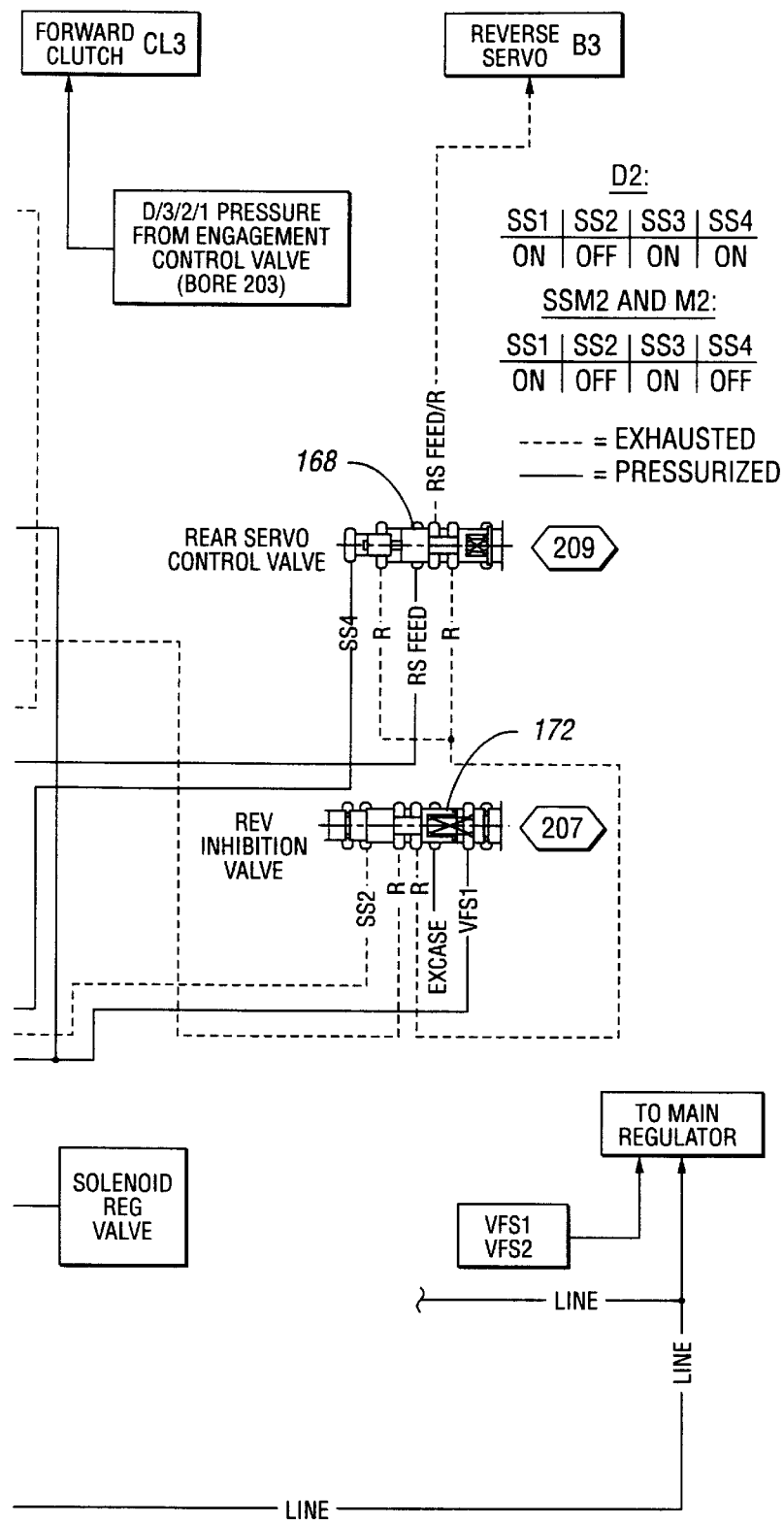

FIGS. 28a and 28b show the control valve system for the transmission of FIG. 2 when it is conditioned for operation in the D2 mode with no engine braking. The transmission operates in second gear. The shift control system is the same as that previously described for the control system for the transmission of FIG. 1 except that the high clutch control valve and intermediate servo control valve are different, as seen at 160' and 158' in FIG. 28a. The brake band B2 is used as a shifting element. There is no intermediate clutch CL4 as in the case of the transmission of FIG. 1. The intermediate servo apply side for the brake B2 is exhausted through exhaust port EX6 in valve 176 as seen in FIG. 28a. Upshifting of the high clutch control valve 160' causes VFS1 pressure to be disconnected from the differential area of the intermediate servo control valve 158'.

When the control system of FIGS. 28a and 28b operate in the SSM2 mode and the M2 mode with engine braking, again the shift solenoid 186 is deenergized. The rear servo control valve 168 in FIG. 28b is downshifted, thereby causing reverse servo B3 to be engaged with VFS1-MOD pressure. This provides engine braking in second gear since the overdrive brake B1 is engaged at this time.

Figure 33A:
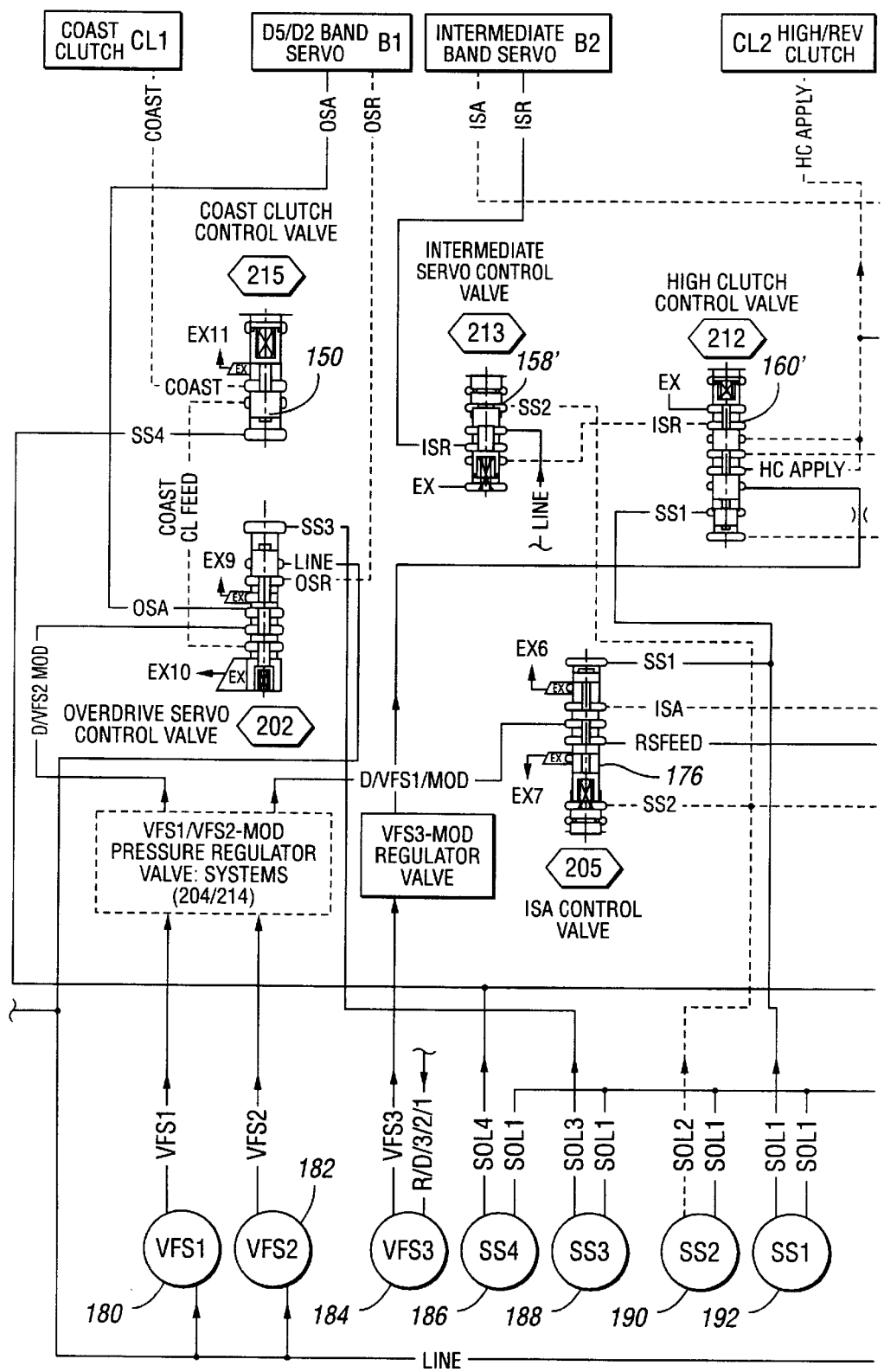
Figure 33B:
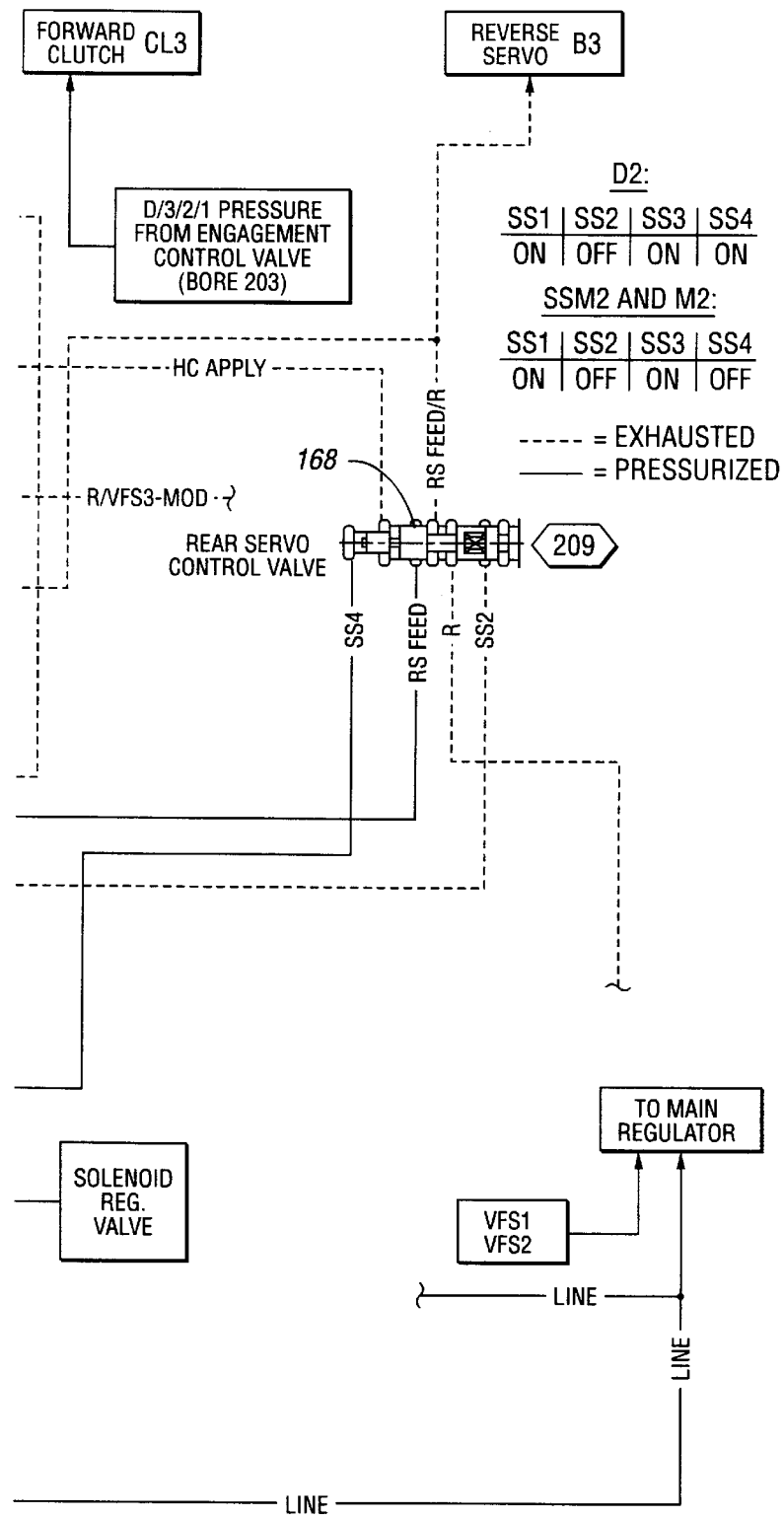

FIGS. 33a and 33b show the control system for the supplemental or modified transmission corresponding to the transmission of FIG. 2. The shift control system contains a different high clutch control valve 160' and a different intermediate servo release control valve 158'. The shift control functions that are triggered by solenoid 188 are the same functions previously described for the transmission of FIG. 2.

Figure 30A:
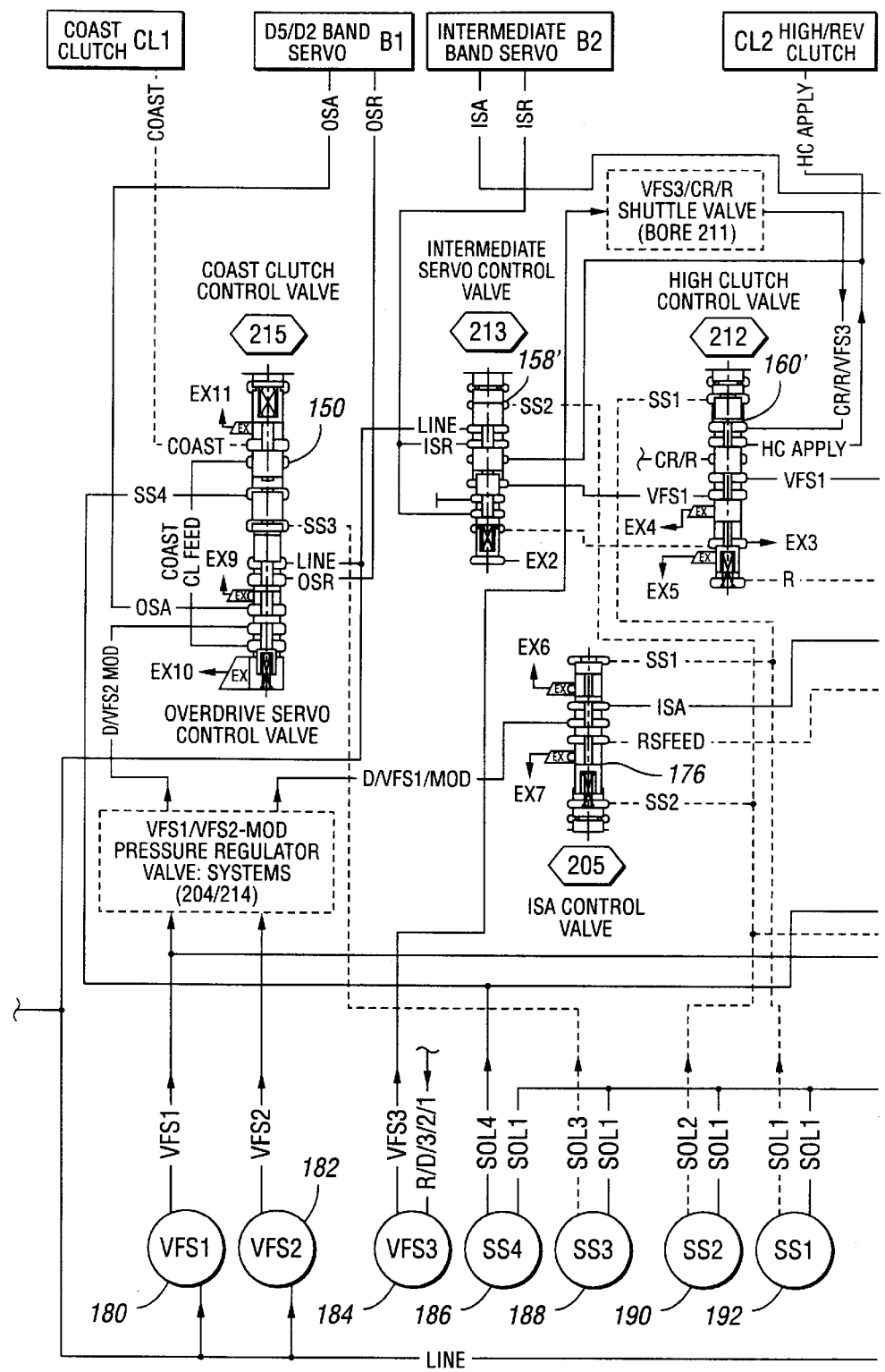
Figure 30B:
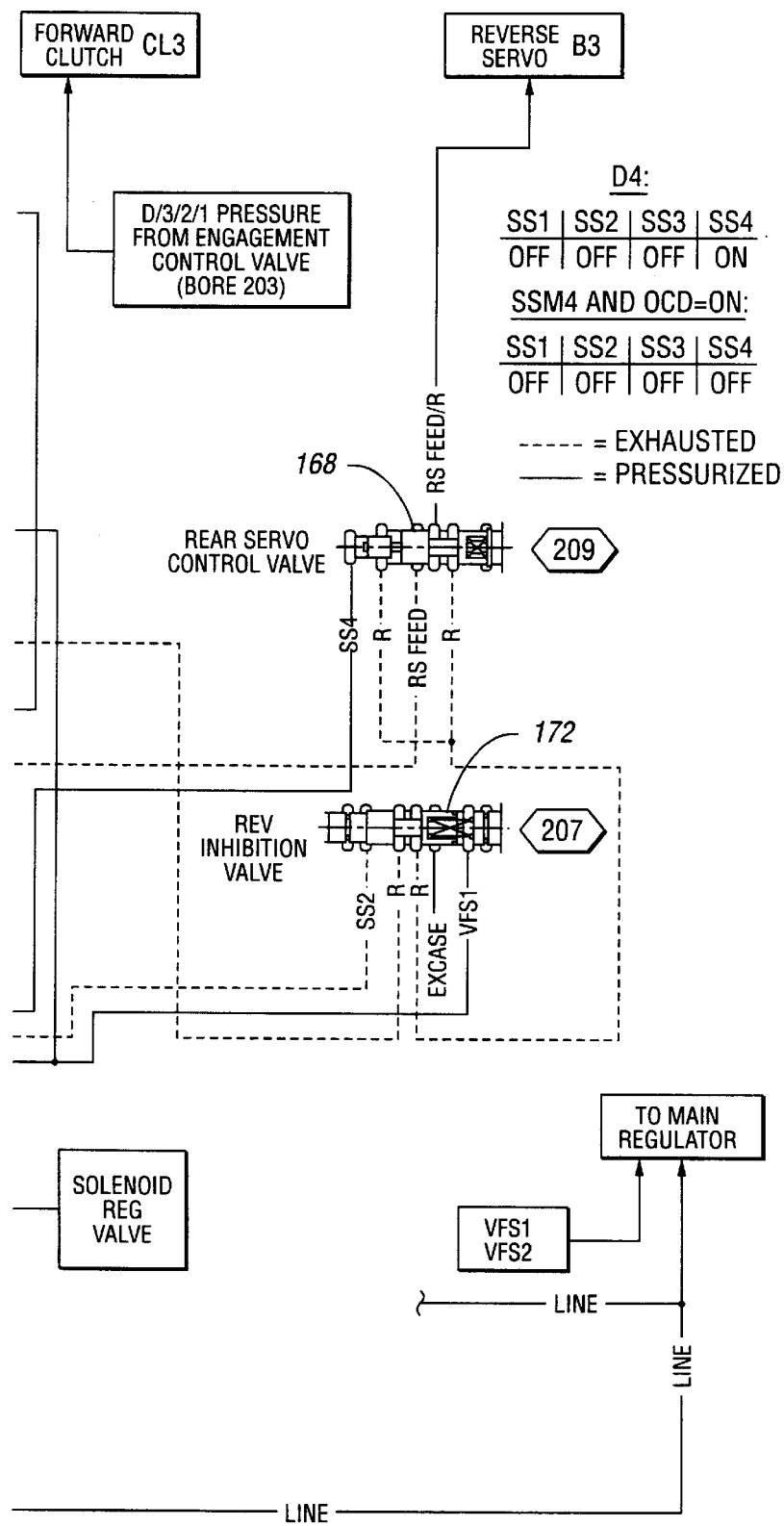
Figure 31A:
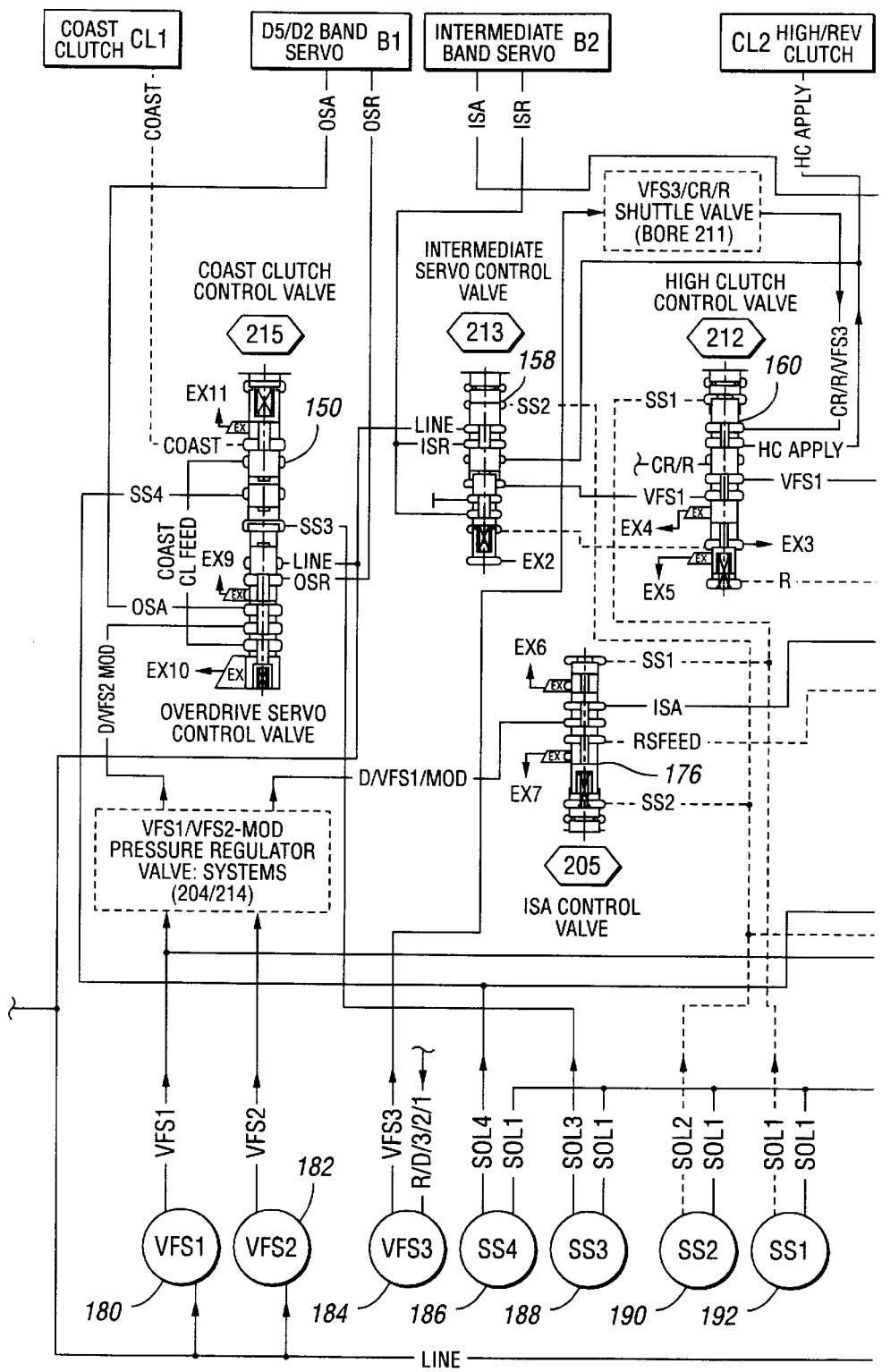
FIGS. 31a and 31b show a shift control valve system corresponding to the control valve system of FIGS. 27a through 30b wherein the gear elements are positioned for the automatic drive range fifth ratio.
Figure 31B:
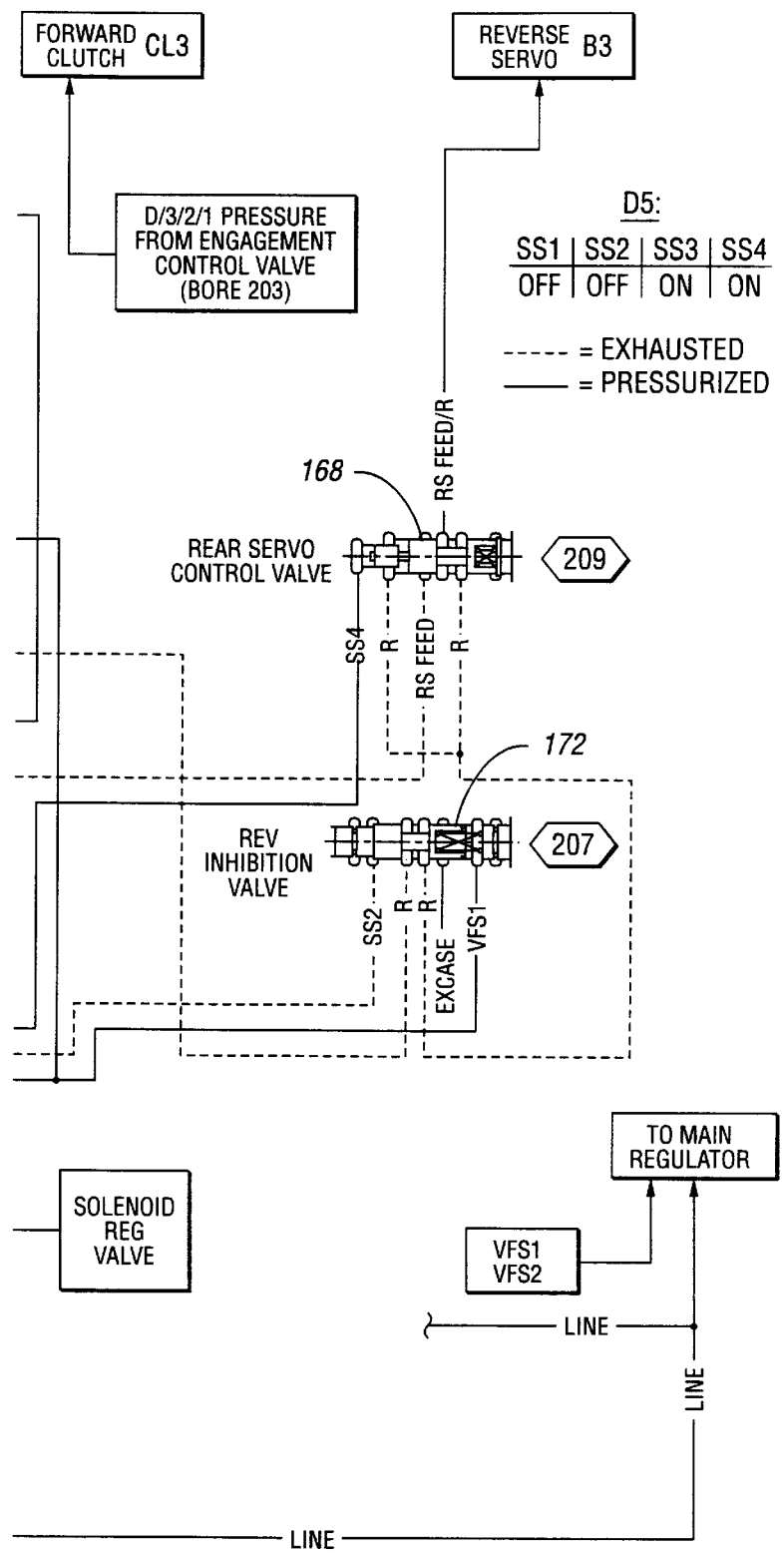

FIGS. 30a and 30b show the modified or supplemental transmission corresponding to the transmission of FIG. 2 when it is operating in second gear with engine braking. Shift solenoid 186 is deenergized which triggers the same control functions previously explained.

The shift solenoid stages for all of the transmission arrangements are summarized in the following table for operation in the D3 mode, which is the automatic control mode in third gear with the manual lever in the D position.

| SS1 | SS2 | SS3 | SS4 |
|---|---|---|---|
| ON | ON | OFF | ON |

When the transmission is in the select-shift manual control mode (SSM3) with the manual lever in the D position and the manual control mode M3 with the manual lever in the M3 position, the shift solenoid stages are summarized in the following table.

| SS1 | SS2 | SS3 | SS4 |
|---|---|---|---|
| ON | ON | OFF | OFF |

Figure 24A:
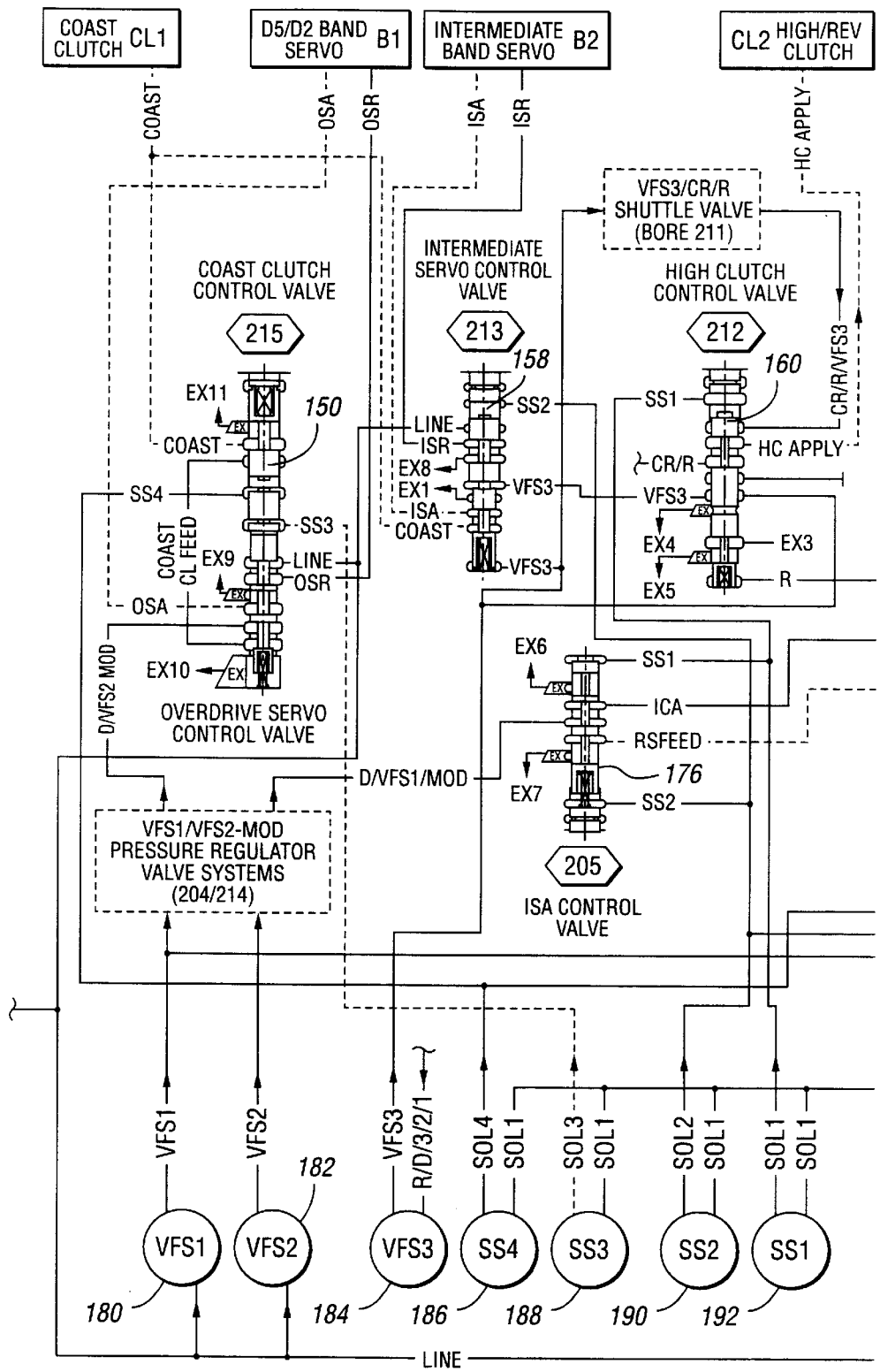
FIGS. 24a and 24b shows the shift control system of FIGS. 22a, 22b, 22c, 23a and 23b wherein the elements are conditioned for operation in the automatic drive mode in third gear (D3), the select-shift manual drive mode 3 (SSM3), and the manual mode 3 (M3)
Figure 24B:
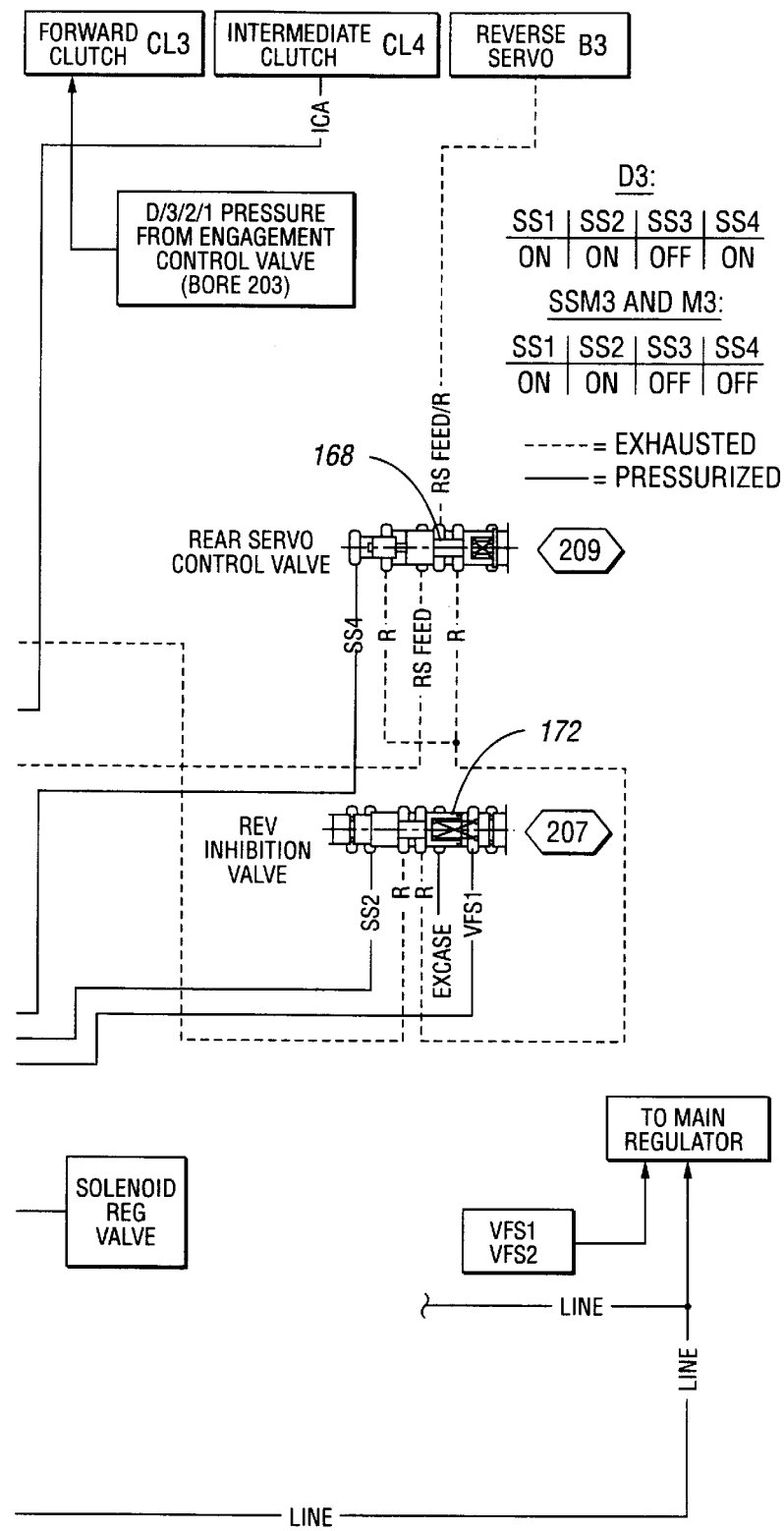

FIGS. 24a and 24b show the control system for the transmission of FIG. 1 when it is operating in third gear without engine braking. This is the D3 mode. At that time, shift solenoid 192 is energized which moves the high clutch control valve 160 into the upshift position. This exhausts the high clutch CL2 into the CR/R exhaust port shown in FIG. 24a.

Shift solenoid 186 also is energized. This moves the rear servo control valve 168 in FIG. 24b into the upshift position which exhausts the rear servo apply side for the brake B3 into the R circuit. In a similar fashion, shift solenoid 186 moves the coast clutch control valve 150 into the upshift position, which exhausts the coast clutch CL1 shown in FIG. 24a into the exhaust port EX11.

Shift solenoid 190 is energized. This moves the intermediate servo control valve 158 into the upshift position. The intermediate servo release side for brake B2 (ISR) then is connected with the exhaust port EX8 at the intermediate servo control valve 213. The intermediate servo apply side is exhausted through the coast clutch circuit, which is connected to the coast clutch control valve 150. Since shift solenoid 186 is energized, the coast clutch circuit is connected to the exhaust port EX11 shown in FIG. 24a, which also exhausts the intermediate servo apply side brake B2 (ISA). SS2 pressure is also applied on the end of the ISA control valve 176. This moves the ISA control valve into the downshift position. VFS1-MOD pressure then is disconnected from the reverse servo feed circuit and is connected to the intermediate clutch circuit. The intermediate clutch capacity is determined by VFS1-MOD pressure.

Shift solenoid 188 is deenergized. The overdrive servo control valve in bore 215, as seen in FIG. 24a, is in the downshift position. The overdrive servo release area for brake B1 (OSR) is subjected to line pressure. The overdrive servo apply area for brake B1 (OSA) is connected to the exhaust port EX9 seen in FIG. 24a. The overdrive servo releases the overdrive brake band capacity. The sun gear of the overdrive planetary gear set then is accelerated up to engine speed and the transmission is in third gear.

The transitions from second gear to third gear and from third gear to second gear are called "swap-shifts" as previously explained. These are synchronous shifts in which the overdrive planetary gear set is upshifted and the multiple ratio Simpson planetary gear set is downshifted simultaneously for a 3–2 downshift. Likewise, the Simpson planetary gear set is upshifted simultaneously with the downshifting of the overdrive planetary gear set to effect a 2–3 upshift.

An additional solenoid stage is required, which is called the "intermediate step 3". In the shift table previously set forth for the transmission of FIG. 1, the so-called "intermediate step 3" requires shift solenoids SS1, SS2 and SS3 to be energized simultaneously during a 2–3 or a 3–2 shift. During this intermediate step, simultaneous capacity control of the intermediate clutch using VFS1-MOD pressure and capacity control of the overdrive brake B1 using VFS2-MOD pressure occurs. This particular "swap-shift" is described in U.S. Pat. No. 5,642,283 previously mentioned.

When the transmission control system for the transmission of FIG. 1 is operating in the SSM3 mode or the M3 mode with engine braking, the valves are in the position shown in FIGS. 24a and 24b. In this instance, shift solenoid 186 is deenergized. The rear servo control valve 168 in FIG. 24b is in the downshift position. Thus, the reverse servo feed circuit is connected to the reverse servo B3. Since the ISA control valve 176 is in the downshift position, the reverse servo feed circuit is connected with the exhaust port EX7 shown in FIG. 24a, which keeps the reverse servo exhausted. The coast clutch control valve 150 moves into the downshift position. This connects the VFS2-MOD pressure with the coast clutch CL1, which provides coast clutch capacity. The feed circuit for the coast clutch also feeds the intermediate servo apply side for brake B2 through the downshift intermediate servo control valve 158. The intermediate brake band B2 builds up capacity to provide engine braking in the multiple ratio Simpson planetary gear set. Also, the engagement of the coast clutch CL1 provides engine braking for the overdrive simple planetary gear set.

Figure 29A:
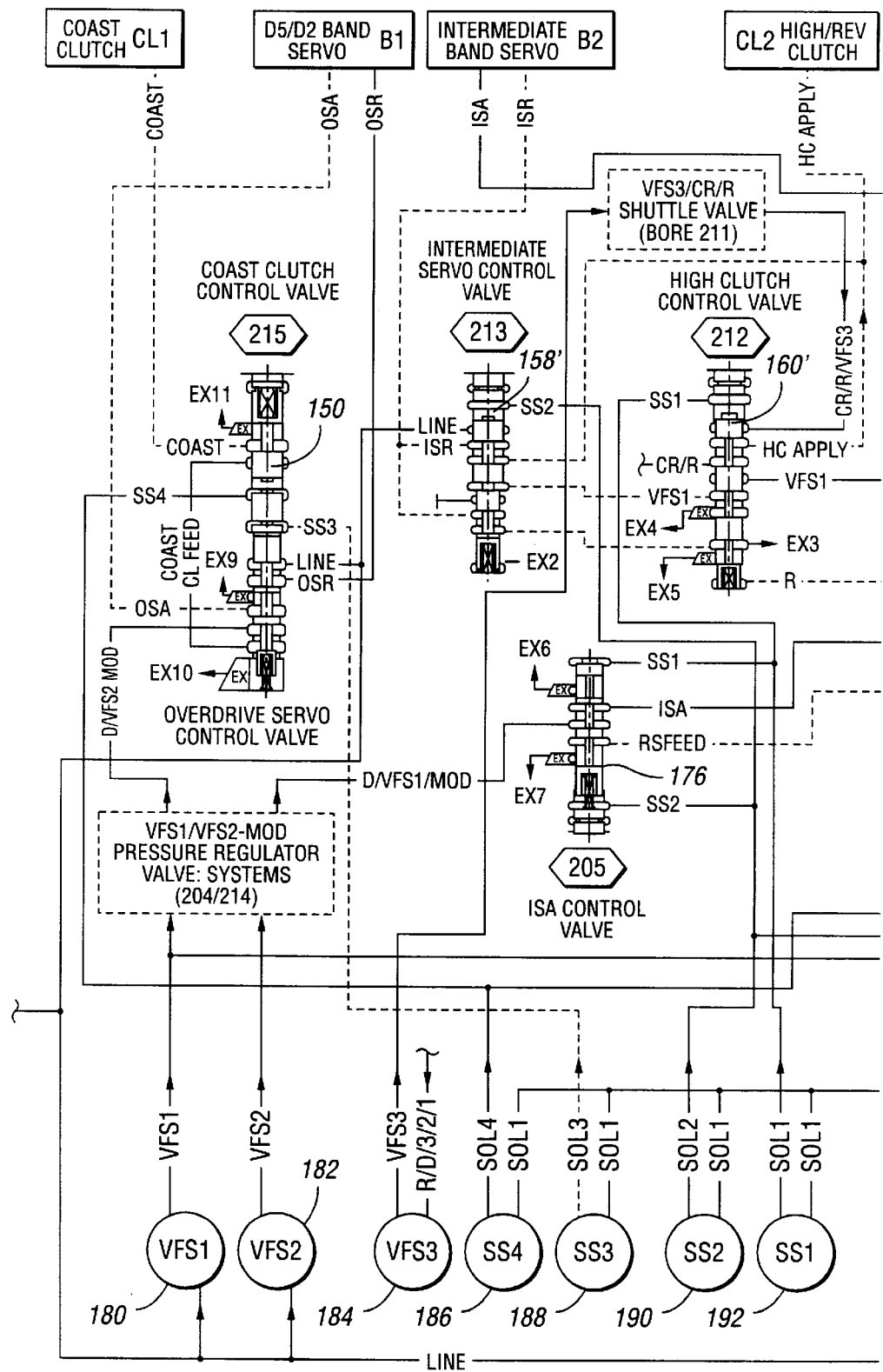
FIGS. 29a and 29b show a shift control valve system corresponding to FIGS. 27a through 28b wherein-the valve elements are positioned for third gear operation D3, select-shift manual mode 3 (SSM3) and manual mode 3 (M3)
Figure 29B:
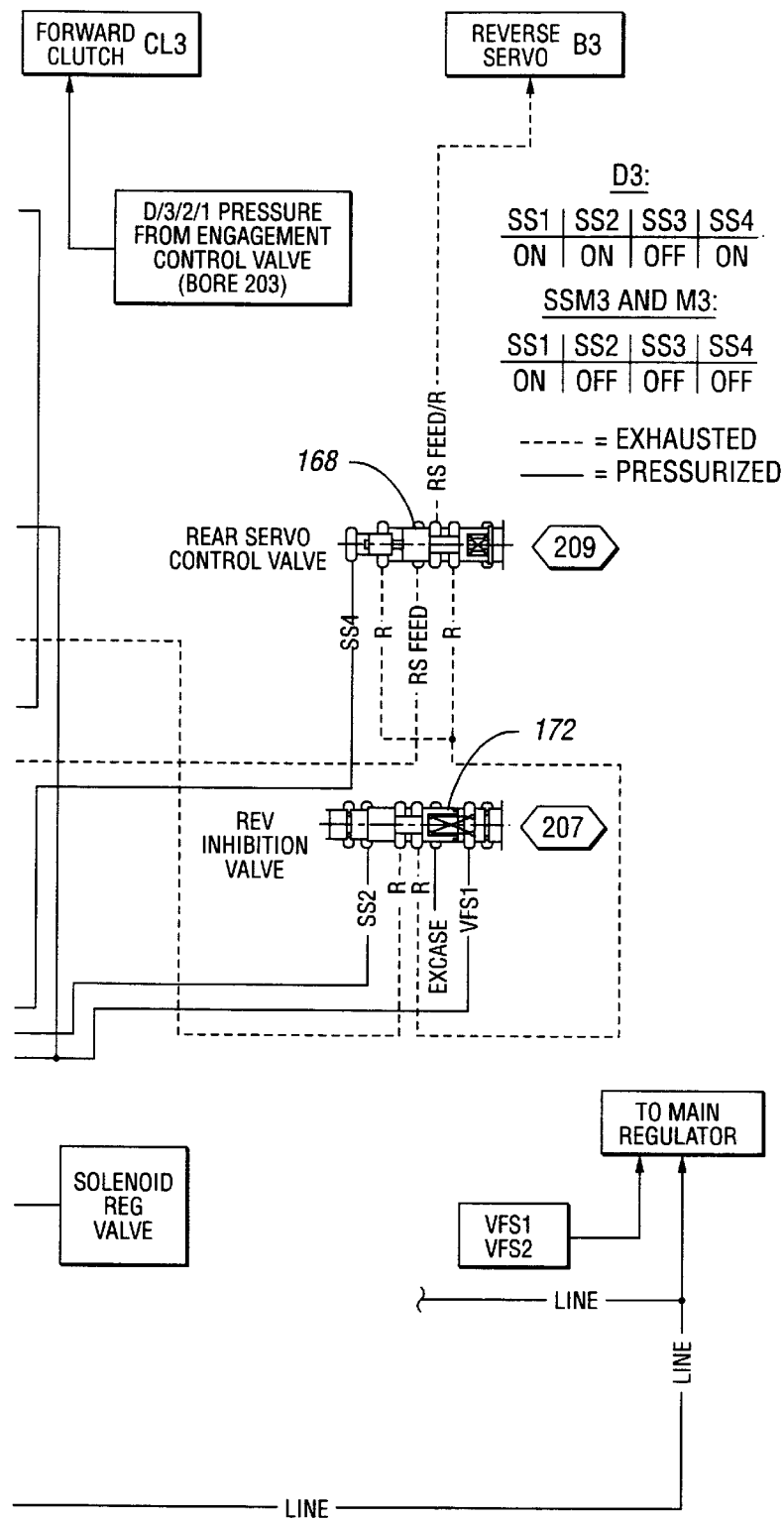

When the control system for the transmission of FIG. 2 is in the D3 mode with no engine braking, the valves for the control valve system are in the positions shown in FIGS. 29a and 29b. The transmission at that time is in third gear. The control valve system functions in the same way as that previously described for the control system of the transmission of FIG. 1 except that the intermediate servo control valve in the high clutch control valve 158' and 160' are different. The brake band B2 is a shifting element and the intermediate clutch CL4 is not present. The intermediate servo apply side of brake servo B2 is supplied with VFS1-MOD pressure distributed to it by the downshifted ISA control valve 176. SS1 pressure upshifts the high clutch control valve 160', thereby disconnecting the differential area of the intermediate servo control valve 158' from VFS1 pressure.

The upshifted intermediate servo control valve 158' connects the intermediate servo release side of brake B2 (ISR) to the high clutch apply circuit. This high clutch apply circuit is exhausted through the CR/R circuit through the high clutch control valve 160', which also exhausts the intermediate servo release pressure. All other shift solenoid functions are the same as for the transmission control system of the transmission of FIG. 1.

The transition from second to third and from third to second, which is a "swap-shift", also occurs with a so-called intermediate step 3 as indicated in the preceding shift table for the transmission of FIG. 1. This intermediate step allows simultaneous capacity control of the overdrive brake band B1 using VFS2-MOD pressure and of the intermediate brake band B2 using VFS2-MOD pressure during a 2–3 or 3–2 swap-shift.

The control system for the transmission of FIG. 2, when it is operating in the SSM3 mode and the M3 mode with engine braking, is also illustrated in FIGS. 29a and 29b. Shift solenoid 186 is deenergized. The rear servo control valve 168 in FIG. 29b is shifted to the downshift position. This connects the reverse servo feed circuit with reverse servo B3. Because the ISA control valve 176 is in the downshift position, the reverse servo feed circuit is connected with the exhaust portion EX7 shown in FIG. 29a, which keeps the reverse servo exhausted. The coast clutch control valve 150 moves to the downshift position. This connects the VFS2-MOD pressure with the coast clutch, which provides coast clutch capacity for engine braking. Since the coast clutch CL1 is applied as well as the intermediate brake band B2, engine braking is provided.

Figure 34A:
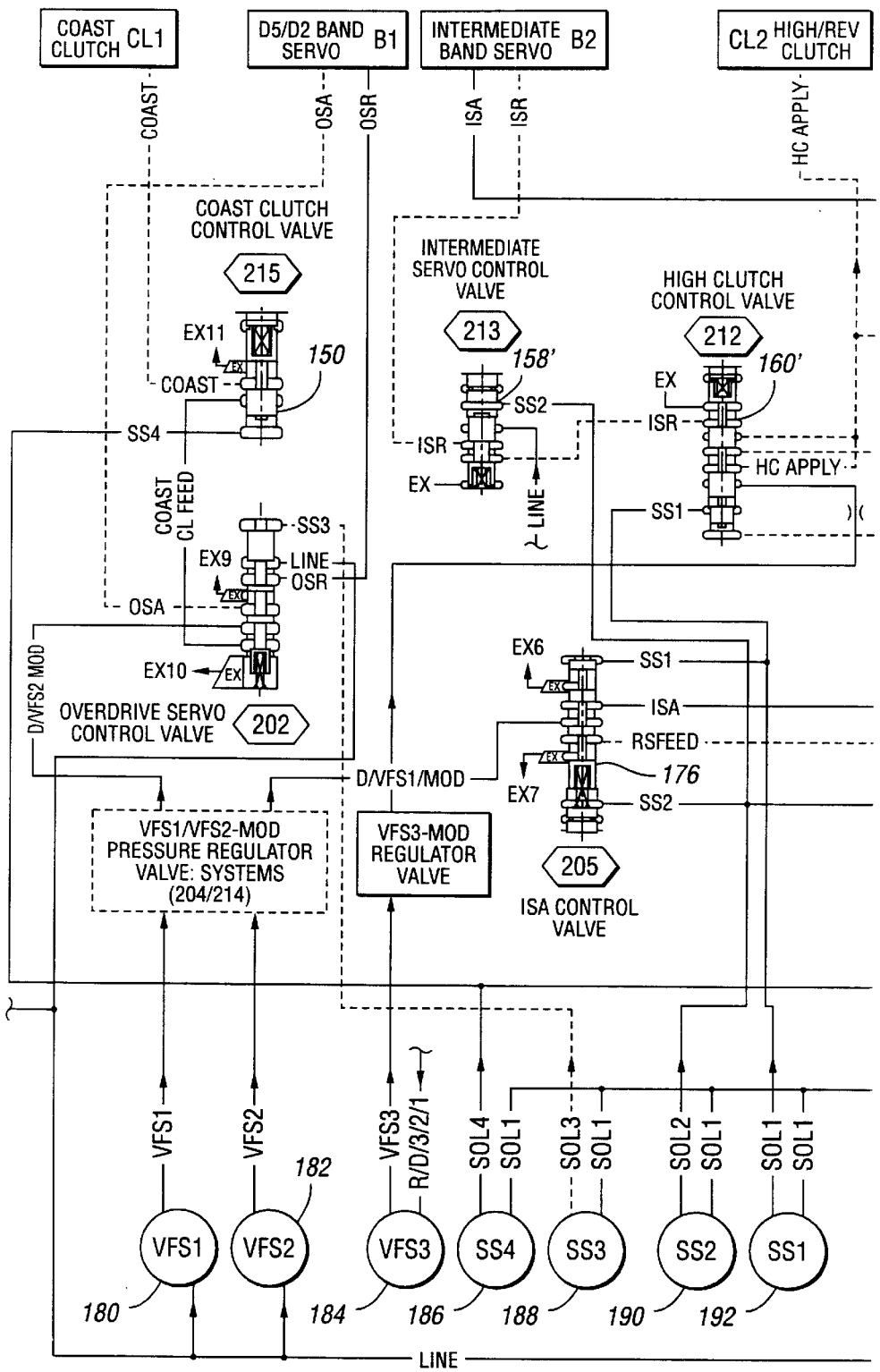
Figure 34B:
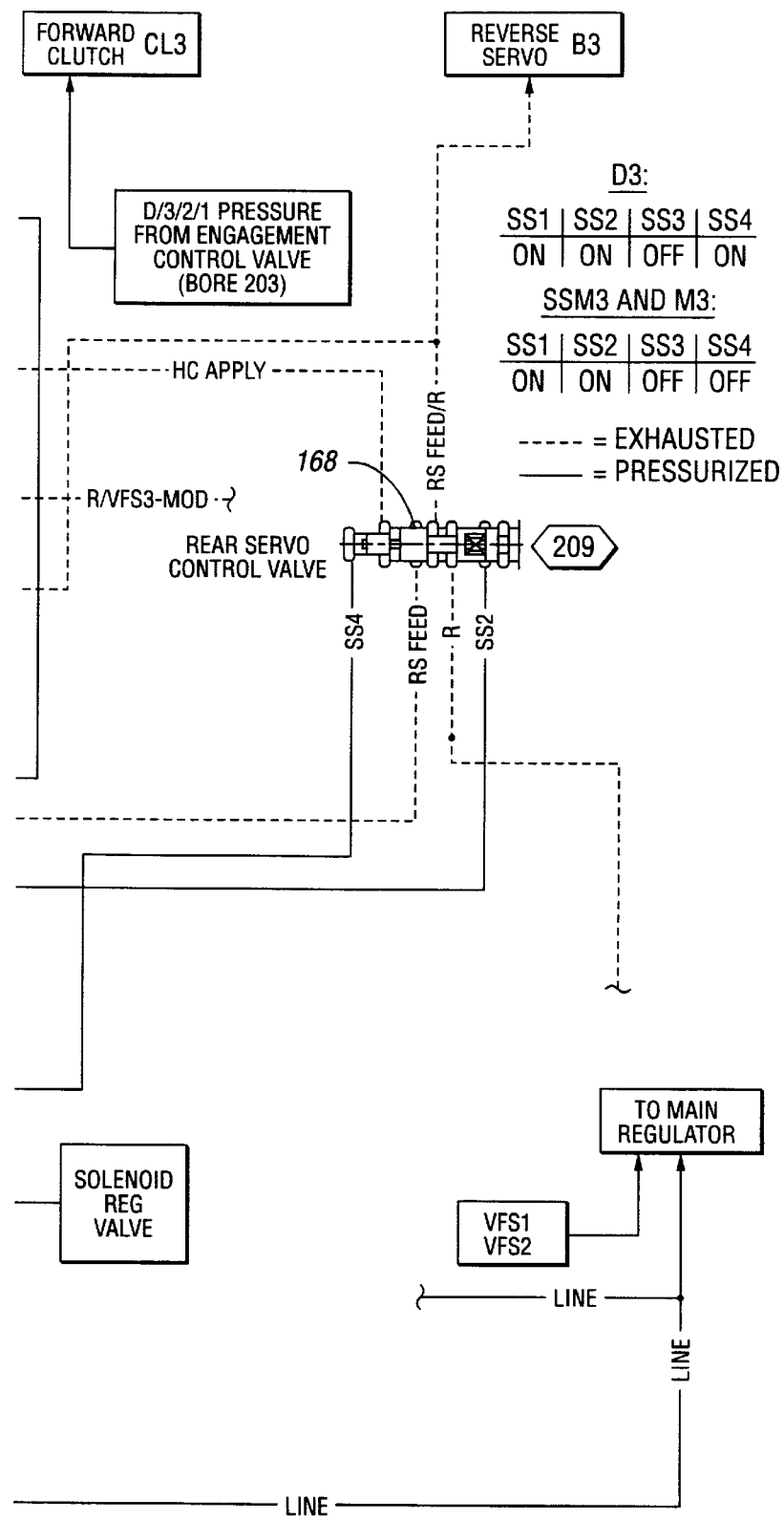

FIGS. 34a and 34b show the control valve system for the modified or supplemental transmission corresponding to the transmission of FIG. 2 when the transmission is in the D3 mode with no engine braking. The shift control system includes a different high clutch control valve 160' and a different intermediate servo control valve 158', both of which are shown in FIG. 34a. The shift functions that are triggered by shift solenoid 190 and shift solenoid 188 are the same as those previously described with respect to the control system for the transmission of FIG. 2. In this instance, however, the intermediate servo release circuit ISR is connected through the intermediate servo control valve 158' to the exhaust port for the high clutch control valve 160'. This provides a separate exhaust flow path for the intermediate servo release side of brake B2, which is not connected to the high clutch as in the case of the control system for the transmission of FIG. 2 during the stroke phase of the intermediate servo. This prevents a possible high clutch "drift-on" during a 2–3 swap-shift or a 3–2 swap-shift.

The control system for the modified or the supplemental transmission corresponding to the transmission of FIG. 2, when the transmission is in the SSM3 mode or the M3 mode with engine braking, also is shown in FIGS. 34a and 34b. At that time, shift solenoid 186 is deenergized, which triggers the same shift control functions previously explained with respect to the transmission of FIG. 2.

During operation of the transmissions of FIGS. 1 and 2 in the D4 mode, which is the automatic control mode in fourth gear with the manual lever in the D position, the solenoid stages are shown in the following table.

| SS1 | SS2 | SS3 | SS4 |
|-----|-----|-----|-----|
| OFF | OFF | OFF | ON  |

When the transmission is in the select-shift manual control mode (SSM4) with the manual lever in the D position and the manual control mode with the overdrive cancel switch on, the solenoid states are shown in the following table.

| SS1 | SS2 | SS3 | SS4 |
|-----|-----|-----|-----|
| ON  | OFF | OFF | OFF |

Figure 25A:
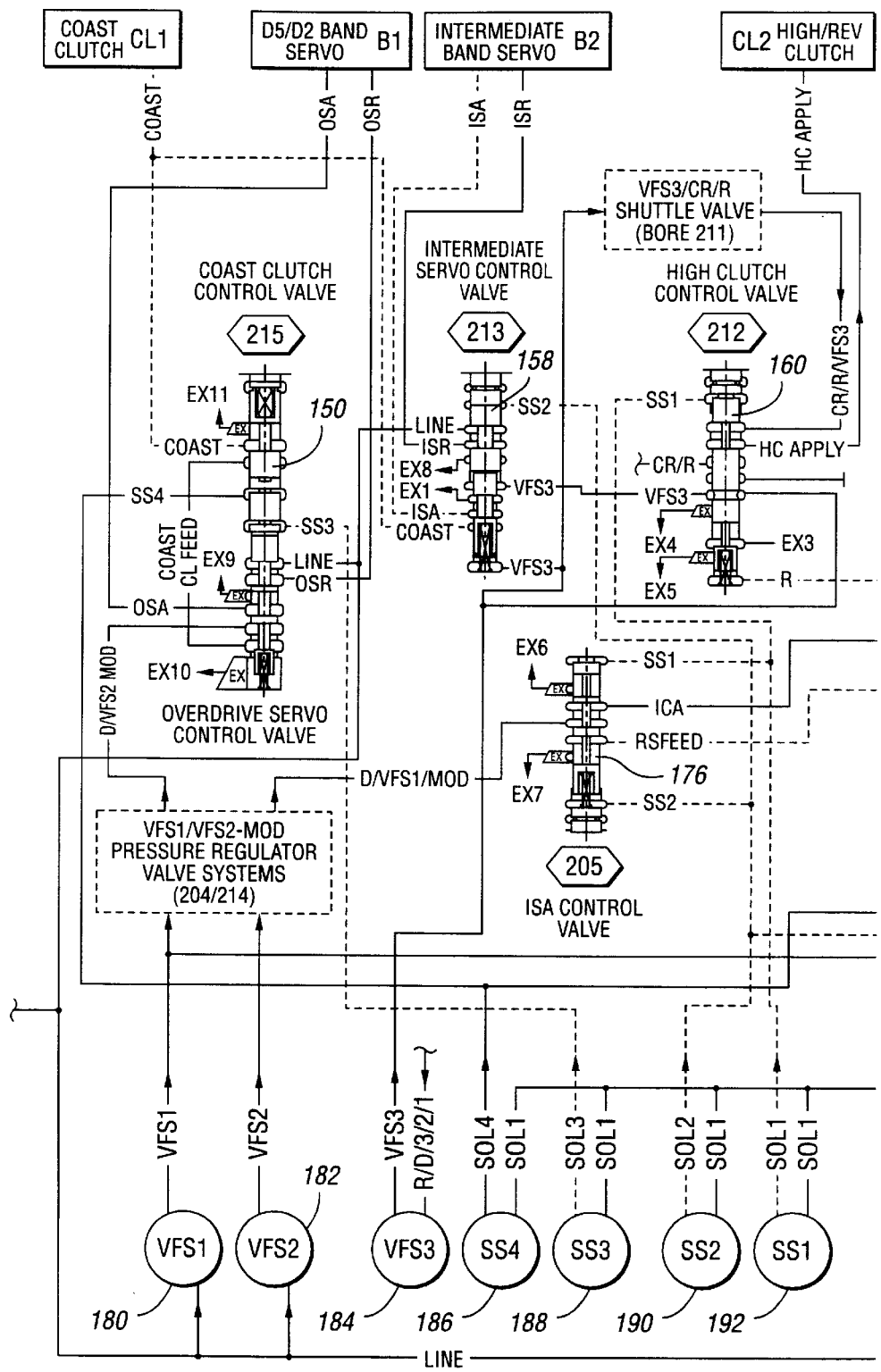
Figure 25B:
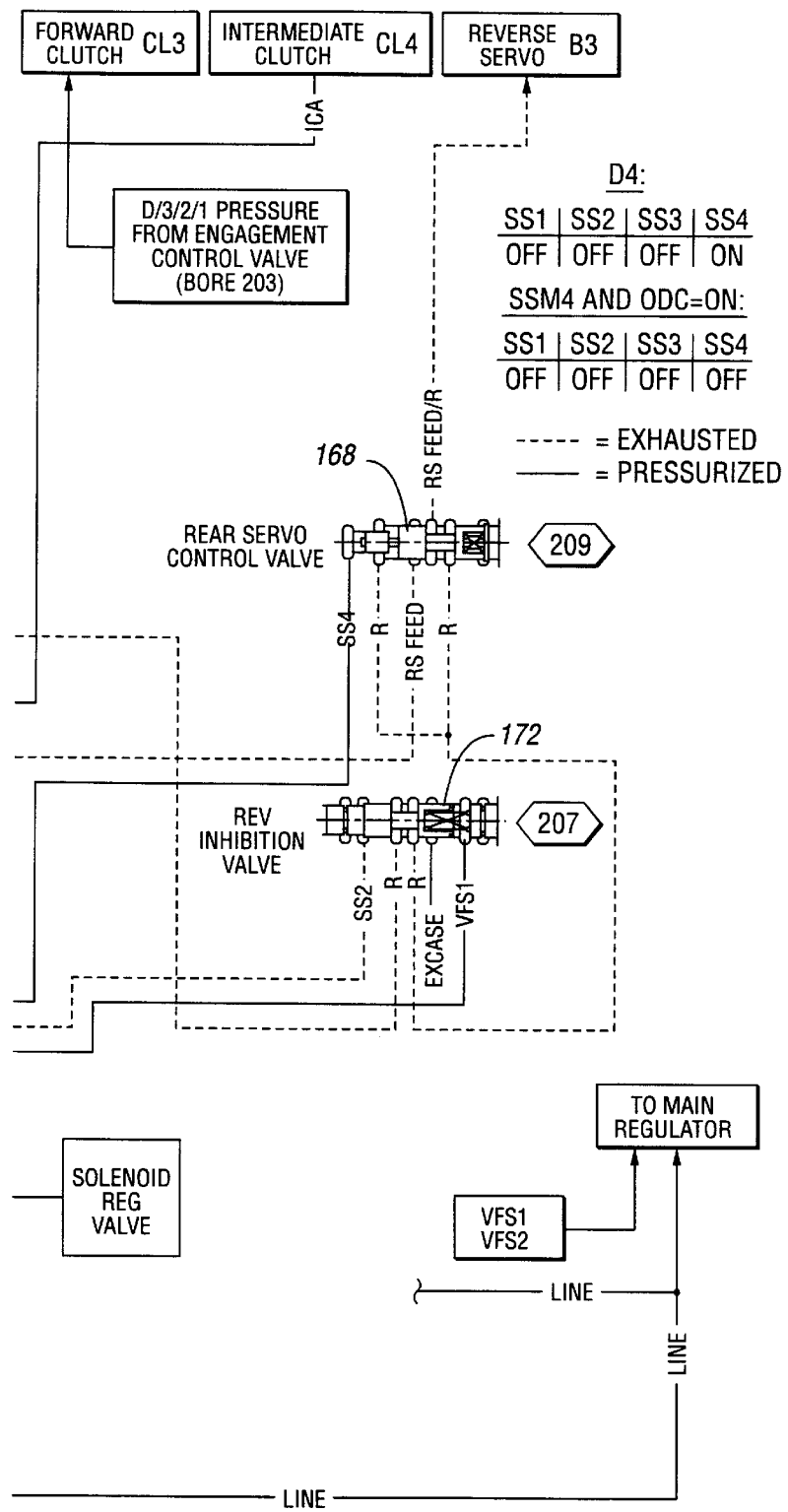

FIGS. 25a and 25b show the valves of the control valve system for the transmission of FIG. 1 when the transmission is in the D4 mode with no engine braking. Shift solenoid 192 is deenergized at that time. This moves the high clutch control valve 160 into the downshift position. This applies the high clutch CL2 using VFS3 pressure. Shift solenoid 186 is energized at this time. This moves the rear servo control valve 168 into the downshift position and exhausts the reverse servo apply side of brake B3 through the R circuit. Similarly, shift solenoid 186 moves the coast clutch control valve 150 into the downshift position, which exhausts the coast clutch CL1 through exhaust port EX11 shown in FIG. 25a.

Shift solenoid 2 (SS2) also is deenergized at this time. This moves the intermediate servo control valve 158 into the downshift position. The intermediate servo release side ISR then is connected to line pressure, which prevents the intermediate servo from re-stroking in case of a solenoid failure. The VFS3 pressure applied on the end of the intermediate servo control valve 158 interlocks that valve and prevents a simultaneous engagement of the high clutch CL2 and the intermediate servo B2 when the shift solenoid 190 fails in its "high" position, which would trigger a tie-up of the gearing of the multiple ratio gear set. The intermediate servo apply side for brake B2 is exhausted through exhaust port EX1 shown in FIG. 25a. With both shift solenoids 192 and 190 deenergized, the ISA control valve stays in the downshift position. The VFS1-MOD pressure then is disconnected from the reverse servo feed circuit and is connected instead to the intermediate clutch ICA circuit. Intermediate clutch capacity is provided by the VFS1-MOD pressure. However, since the high clutch is engaged with VFS3 pressure, the overrunning clutch OWC3 overruns and the intermediate clutch CL4 does not carry torque.

Shift solenoid 188 also is deenergized. The overdrive servo control valve in bore 215 shown in FIG. 25a is in the downshift position. The overdrive servo release area of brake band B1 (OSR) is connected to line pressure. The overdrive servo apply area (OSA) for brake B1 is connected to the exhaust port EX9 shown in FIG. 25a. The transmission then is in fourth gear.

The control system for the transmission of FIG. 1, when the transmission is in the SSM4 mode and the overdrive cancel switch is "on" with engine braking, also is shown in FIGS. 25a and 25b. In this instance, the shift solenoid 186 is deenergized. The rear servo control valve 168 is moved to the downshift position. This connects the reverse servo feed circuit with the reverse servo B3. Since the ISA control valve 176 is in the downshift position, the reverse servo feed circuit is connected with the exhaust port EX7 shown in FIG. 25a. This keeps the reverse servo exhausted. The coast clutch control valve 150 moves to the downshift position, which connects the VFS2-MOD pressure, thereby providing coast clutch capacity. The intermediate brake band B2 is disengaged since shift solenoid 190 is deenergized, which keeps the intermediate servo control valve 158 in the downshift position. This connects the intermediate servo apply side to the exhaust port EX1 shown in FIG. 25a, thereby exhausting brake B2. The Simpson gear set and the simple planetary gear set then are capable of providing engine braking.

The control system for the transmission of FIG. 2, when the transmission is in the D4 mode with no engine braking, is shown in FIGS. 30a and 30b. The control system is the same as that previously described for the transmission of FIG. 1 except that intermediate servo control valve 158' and the high clutch control valve 160' are different. The brake band B2 is a shifting element since there is no intermediate clutch CL4. The intermediate servo apply side of the brake B2 is fed with VFS1-MOD pressure provided by the ISA control valve 176. Because the high clutch control valve 160' is downshifted, VFS1 pressure is distributed to the differential area of the intermediate servo control valve 158'. This inhibits a downshift of the intermediate servo control valve 158' in the event of a failure of the solenoid 190 (SS2) in its high pressure state. If shift solenoid SS2 fails "high", the intermediate brake band B2 and the high clutch CL2 would be engaged simultaneously, which would trigger a tie-up of the gearing.

The transitions from third to fourth and from fourth to third are a synchronous clutch-to-band shift or a band-to-clutch shift. The intermediate clutch CL4 and the intermediate one-way clutch OWC3 are deleted in the transmission of FIG. 2. The synchronization between the high clutch and the intermediate brake band in this instance is electronically controlled. The shift is synchronous. In order to provide appropriate control functions, initial intermediate steps IS1 and IS2 are provided between third and fourth ratios as shown in the table in the beginning of this description.

During operation of the control system for the transmission of FIG. 2 when the transmission is in the SSM4 mode and the overdrive cancel switch is on with engine braking, the valve elements are as illustrated in FIGS. 30a and 30b and the shift solenoid 186 is deenergized. The rear servo control valve 168 in FIG. 30b moves to the downshift position. This connects the reverse servo feed circuit with the reverse servo B3. Since the ISA control valve 176 is in the downshift position, the reverse servo feed circuit is connected with the exhaust port EX7 shown in FIG. 30a. This keeps the reverse servo exhausted. The coast clutch control valve 150 is moved at this time to the downshift position. This connects the VFS2-MOD pressure with the coast clutch, thereby providing coast clutch capacity. Since the coast clutch is engaged and the Simpson planetary gear set is in direct drive, engine braking is provided.

Figure 35A:
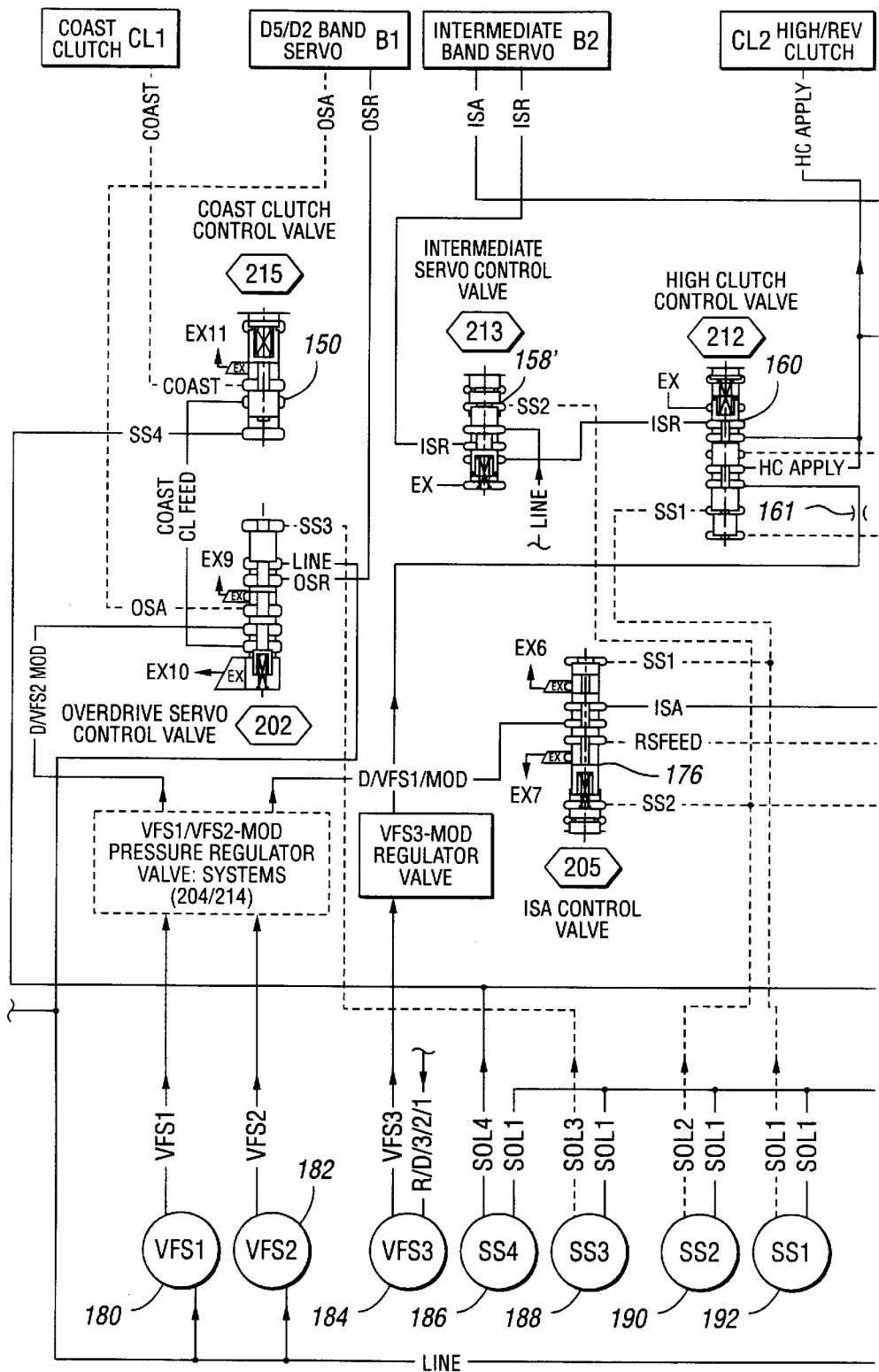
Figure 35B:
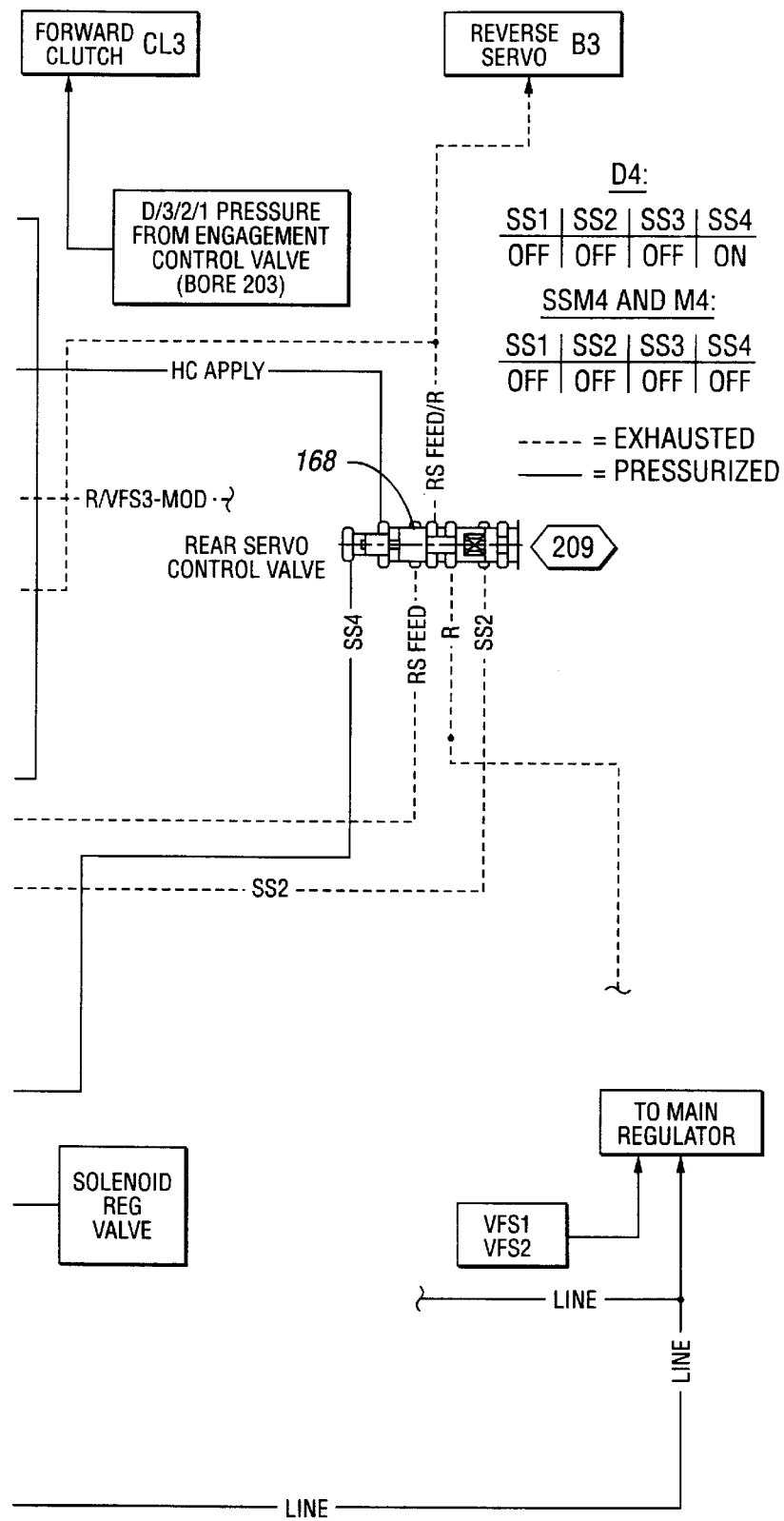

FIGS. 35a and 35b show the control system for the modified or supplemental transmission corresponding to the transmission of FIG. 2 when the transmission is in the D4 mode with no engine braking. The shift control system, as explained previously, has a different intermediate servo control valve 158' and a different high clutch control valve 160'. The functions of the shift solenoids SS1, SS2 and SS3 basically are the same as the functions described with respect to the transmission control system for the transmission of FIG. 2. Additionally, the high clutch apply circuit is connected through the rear servo control valve to a differential area, which provides an override function when the shift solenoid 186 malfunctions or stays at its low pressure state.

When the direct clutch CL2 is applied in fourth gear or in fifth gear, a simultaneous engagement of the reverse servo must be prevented in order to avoid a gear tie-up. The downshifted high clutch control valve 160 causes VFS3-MOD pressure to be connected over control orifice 161 shown in FIG. 35a. The intermediate servo release side for brake B2 is connected through the intermediate servo release control valve 158' to line pressure, which keeps the intermediate servo disengaged.

The shift solenoid stage for fifth gear for the control system for the transmissions of FIGS. 1 and 2, as well as for the modified or supplemental transmission, is set forth as follows:

| SS1 | SS2 | SS3 | SS4 |
|-----|-----|-----|-----|
| OFF | OFF | ON | ON or OFF |

Figure 26A:
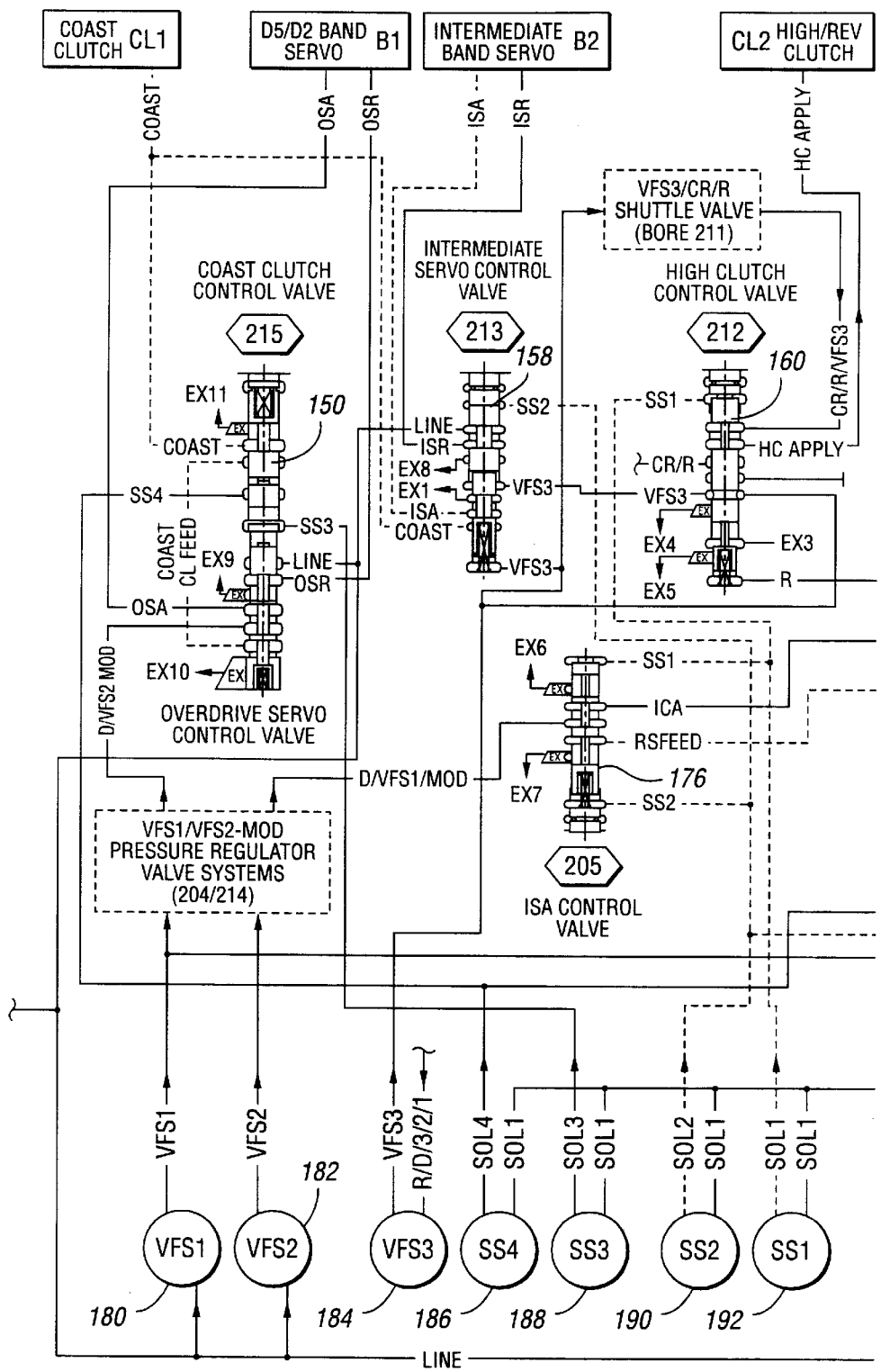
FIG. 26 shows a shift control system corresponding to FIGS. 22a through 25b wherein the valve elements are conditioned for fifth gear drive mode D5.
Figure 26B:
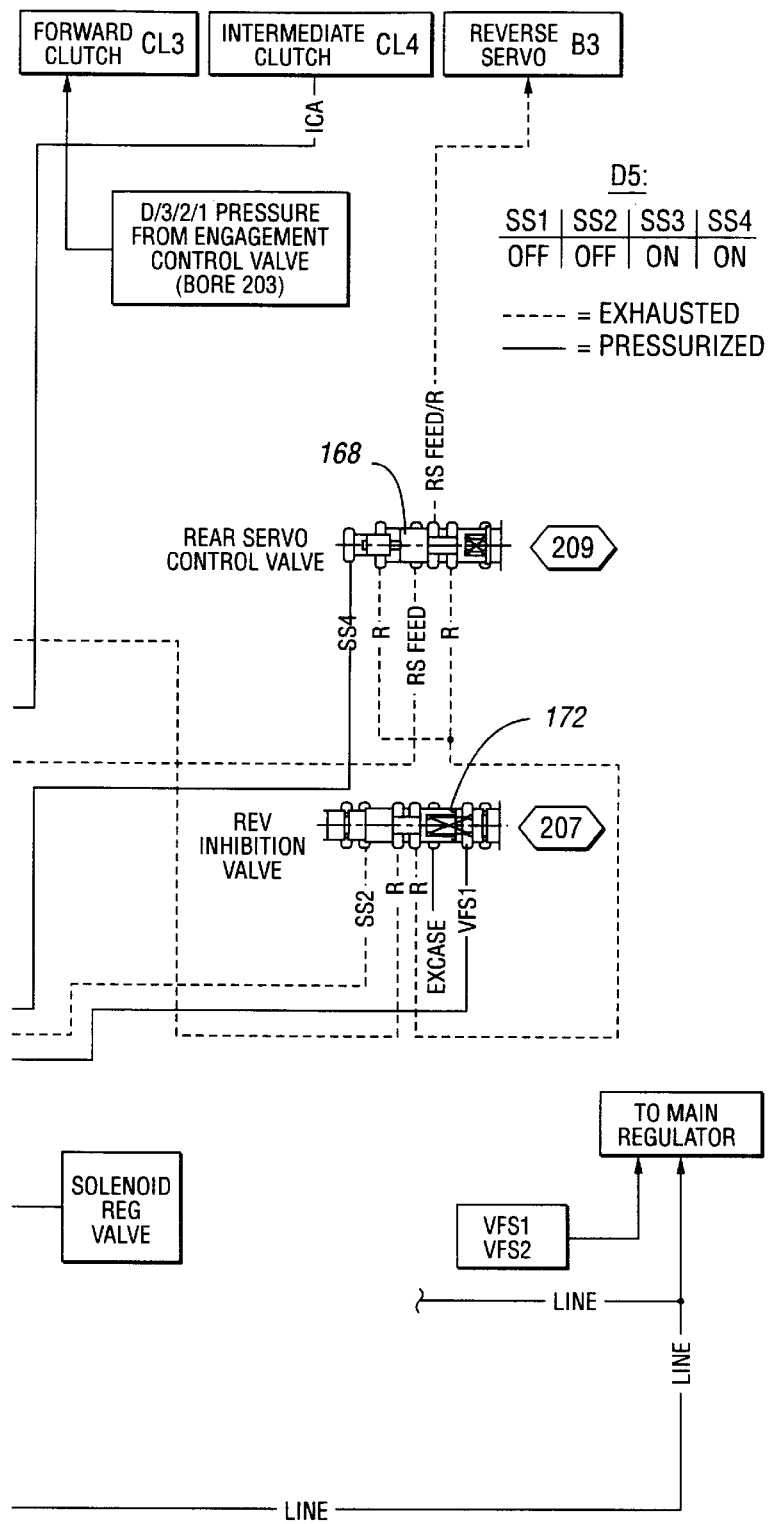

FIGS. 26a and 26b show the control system for the transmission of FIG. 1 when the transmission is in the D5 mode. At that time, shift solenoid 192 and shift solenoid 190 are deenergized. This causes the same control functions as previously described for third gear for the high clutch and the intermediate brake 56 in the Simpson planetary gear set. The high clutch and the forward clutch hold capacity, which provides the direct gear state in the Simpson gear set.

Shift solenoid 186 can be energized or deenergized since the overdrive servo control valve in bore 215 is in the downshift position. When it is energized by the shift solenoid 188 (SS3), the coast clutch feed pressure circuit (COAST CL FEED) shown in FIG. 26a is exhausted through the exhaust port EX10 seen in FIG. 26a. There then is no feed passage provided to the coast clutch control valve, which prevents engagement of the coast clutch in case the SS4 solenoid state fails in its low pressure position. Similarly, the ISA control valve 176 is in the downshift position, thereby exhausting the reverse servo feed circuit through the exhaust port EX7 shown in FIG. 26a, which prevents a pressure feed to the rear servo control valve 168 in FIG. 26b.

Shift solenoid 188 is energized at this time. The overdrive servo control valve in bore 215, seen in FIG. 26a, is in the upshift position. The overdrive servo release area OSR is connected with the exhaust port EX9 also seen in FIG. 26a. The overdrive servo apply area OSA is connected to VFS2-MOD pressure. The overdrive servo strokes and builds up overdrive brake band capacity. The sun gear of the overdrive planetary gear unit then is decelerated down to zero speed. Thus, a 4–5 upshift is completed and the transmission is in fifth gear.

A 5–4 downshift is executed by the control release of VFS2-MOD pressure at the overdrive brake band B1. Capacity control of B1 then can be terminated by deenergizing shift solenoid 188, which allows downshifting of the overdrive servo control valve in bore 215. The overdrive servo release side then is connected with line pressure and the overdrive servo apply side OSA is exhausted into the exhaust port EX9 shown in FIG. 26a. The downshift from fifth to fourth then is complete.

When the control system for the transmission of FIG. 2 is conditioned for operation in the D5 mode as seen in FIGS. 33a and 33b, the valves function in the same way previously described with respect to the control system for the transmission of FIG. 1 except that the intermediate servo control valve 158' and the high clutch control valve 160' are different. The upshift control function of the overdrive planetary gear set is triggered by energizing shift solenoid 188.

Figure 36A:
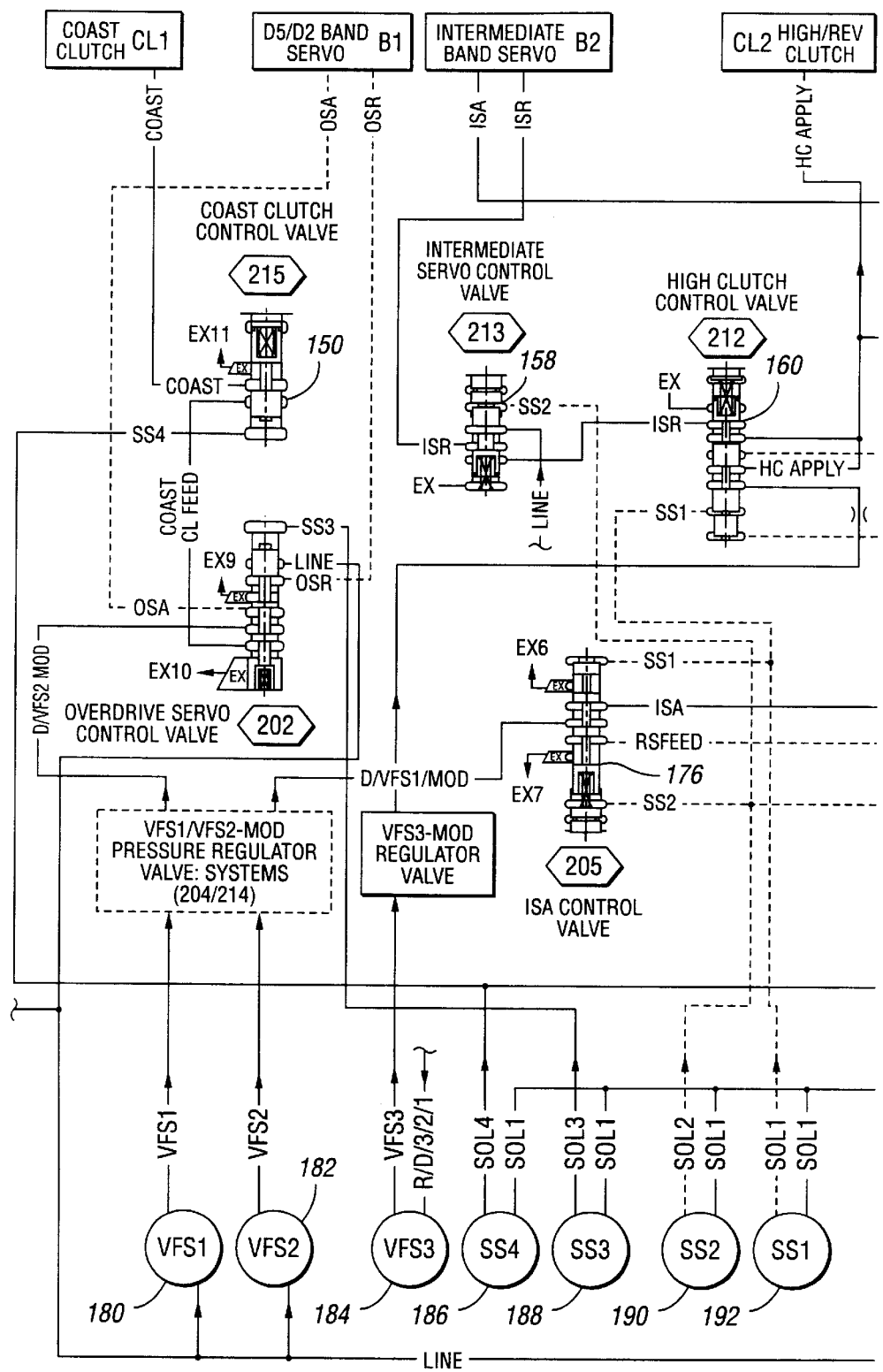
Figure 36B:
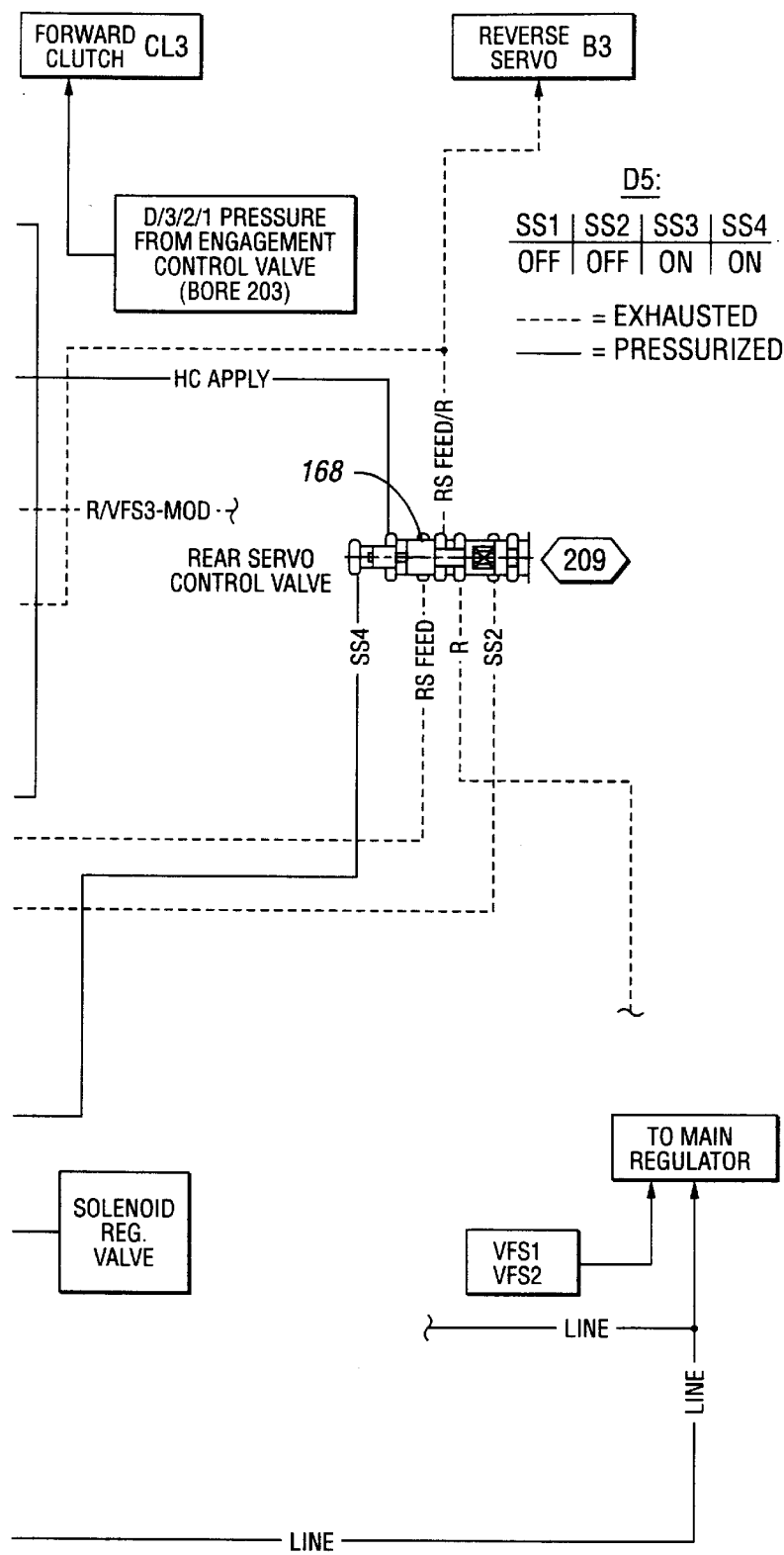

When the modified or supplemental transmission corresponding to the transmission of FIG. 2 operates in the D5 mode, the valves are in the positions shown in FIGS. 36a and 36b. Again, the intermediate servo control valve 158' and the high clutch control valve 160' are different. The shift control functions for the shift solenoid 188 are the same as those previously described with respect to the control system for the transmission of FIG. 2.

Figure 37A:
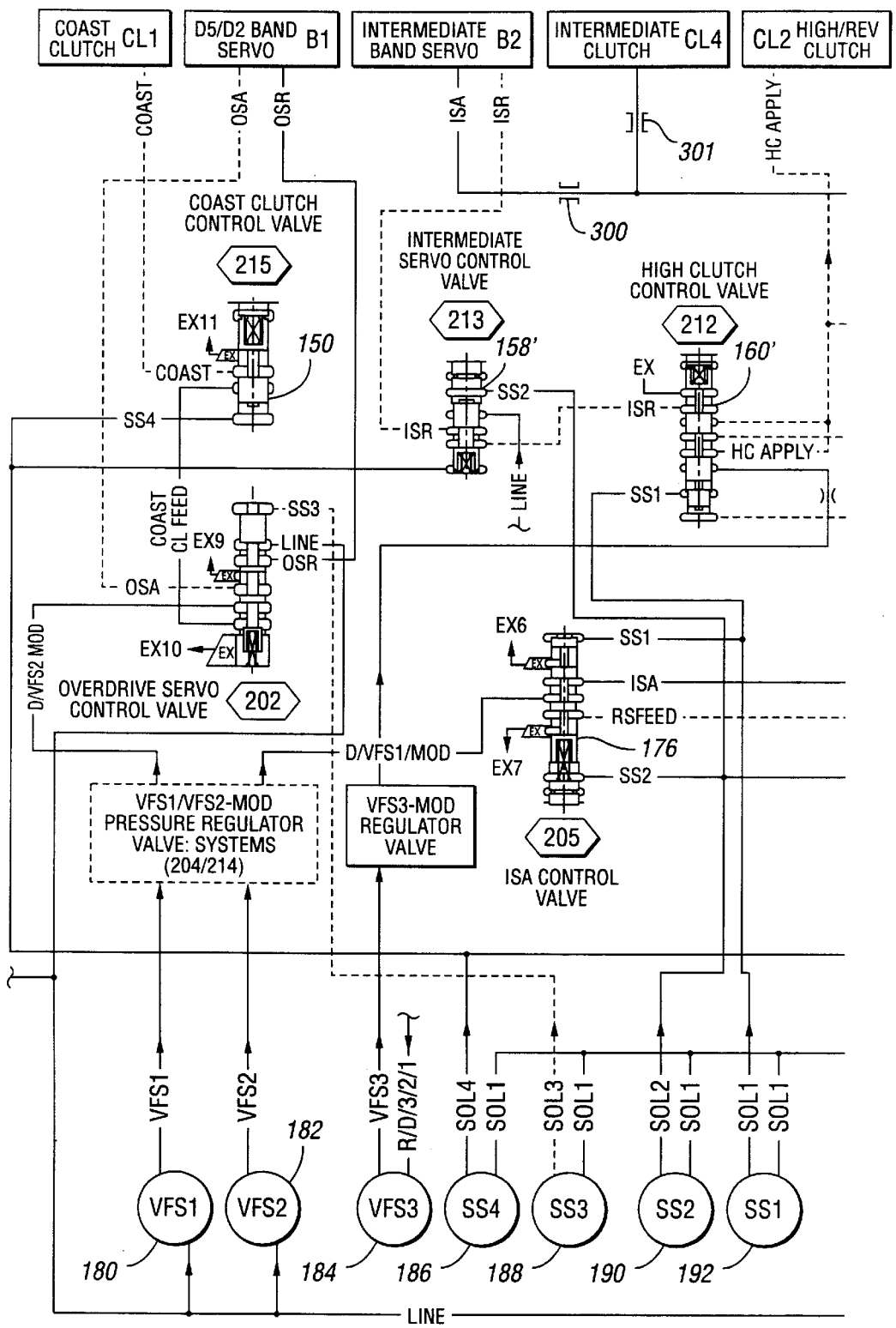
FIGS. 37a and 37b show an optional design of the control valve system of FIGS. 32a through 36b for the modified version of the non-synchronous transmission shown in FIG. 1.
Figure 37B:
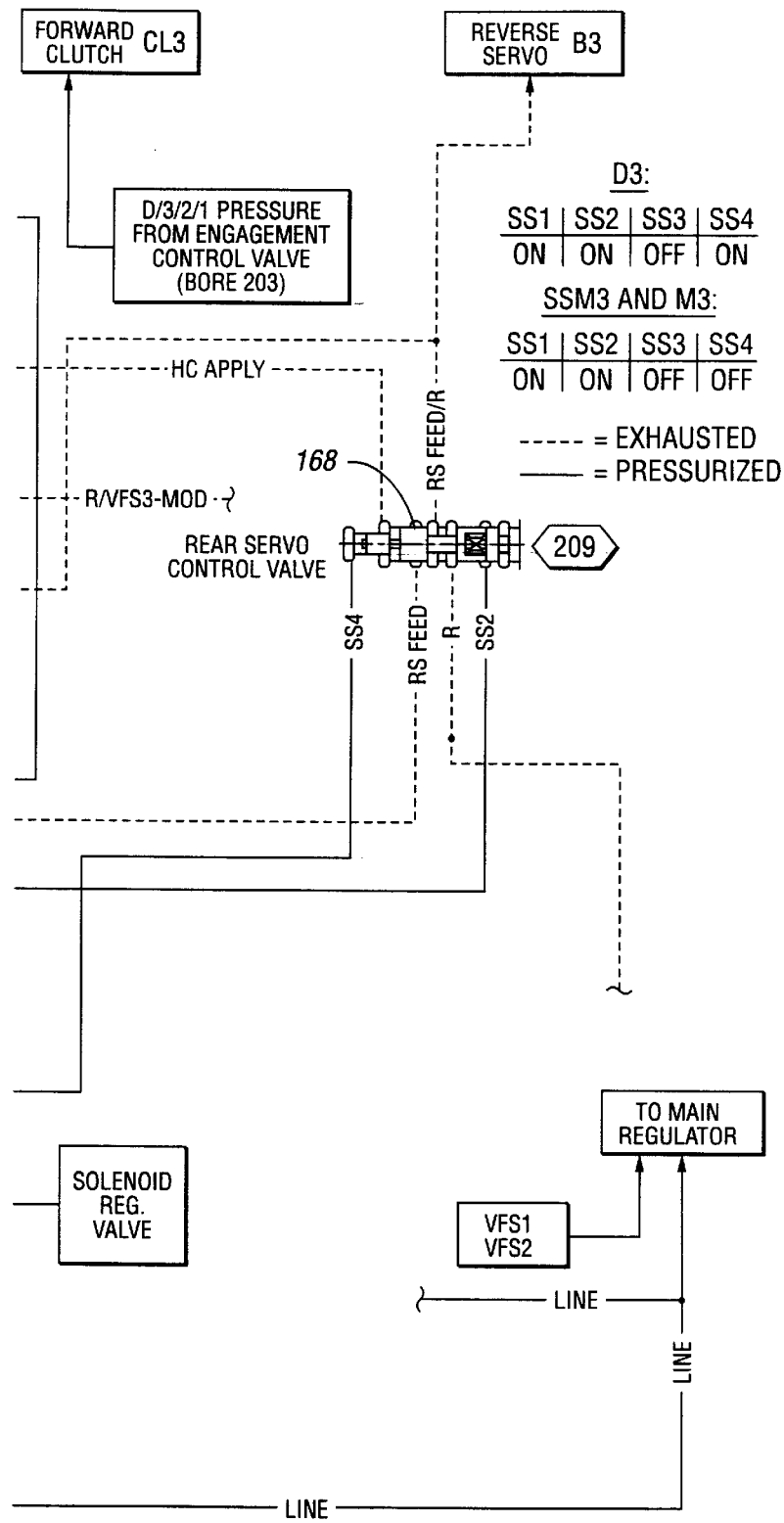

An optional control system for the transmission of FIG. 1 now will be described. The previously described shift control system for the modified or supplemental transmission, shown in FIGS. 32a through 36b, can also be applied to the transmission of FIG. 1 with an optional design feature added to the previously described control system. This additional design feature is shown in FIGS. 37a and 37b. Taking the D3 automatic mode, the M3 select-shift manual mode SSM3, and the manual mode M3 as an example. By opening both control orifices 301 and 300, the intermediate servo apply pressure from the ISA control valve at 176 can be optionally connected simultaneously to the intermediate clutch CL4 and the ISA apply. As previously described, the simultaneous engagement at the intermediate clutch CL4 and the intermediate brake band B2 have to be prevented in the transmission shown in FIG. 1 in order to prevent "tie-up". This is accomplished by connecting SS4 pressure to the back side of the intermediate servo control valve 158'. When SS4 is energized, the shift valve 158' is downshifted, applying line pressure to the intermediate servo release side. This prevents the previously described "tie-up" situation. The other solenoid states previously described remain unchanged.

A reverse inhibitor function is available when the high clutch CL2 is engaged and the rear servo B3 is engaged. This prevents reverse operation when the manual lever is in the R position and the vehicle speed is high and the driver moves the lever into the reverse position.

The reverse inhibitor function will be described with reference to FIGS. 5a, 5b, 5c and 5d. It is used in both the transmission of FIG. 1 and the transmission of FIG. 2. The solenoid states for the on/off solenoids and the three variable force solenoids at this time are set as follows.

| | SS 1 | SS 2 | SS3 | SS4 | VFS1 | VFS2 | VFS3 |
|---|---|---|---|---|---|---|---|
| R-Inhibition | ON | ON | OFF or ON | OFF or ON | LOW | HIGH | LOW |

The shift solenoid SS1 is energized by moving the high clutch control valve 160, seen in FIG. 5a, into the upshift position. This connects the CR/R pressure circuit, seen in FIG. 5c, to the high clutch CL2 with the variable force solenoid 182 set "high". The engagement control valve 164 is in the downshift position. This connects the CR pressure to the high clutch. CR pressure is the output pressure of the reverse modulator valve 166, which is controlled by VFS3 pressure. Since the variable force solenoid VFS3 is set to zero pressure, the output of the CR modulator valve 166 is also zero. This provides zero capacity for the high clutch.

VFS1 pressure must be low since VFS1 pressure acts as a back pressure on the reverse inhibitor valve 172 seen in FIG. 5d. With the shift solenoid SS2 energized, the reverse inhibitor valve moves into the upshift position, thereby exhausting. the R feed pressure through the rear servo control valve 168 in FIG. 5c. The exhaust port is shown in FIG. 5d in the reverse inhibitor valve 172. Shift solenoid 186 (SS4) can be either energized or deenergized since both feed pressures, reverse servo feed and reverse pressure, are exhausted. This provides zero capacity for the rear brake band B3, thereby providing a reverse inhibitor function.

VFS1 pressure is connected to one end of the reverse inhibitor valve 172, as seen in FIG. 5d. This is required in order to provide reverse by overriding the reverse inhibitor valve function in case the shift solenoid 186 should fail.

In the case of the modified or supplemental transmission corresponding to the transmission of FIG. 2, the solenoid stages are the same as they are for the control system for the other two transmissions. This is shown in FIGS. 32a and 32b. At this time, the zero high clutch capacity state is achieved by setting variable force solenoid 2 "high" and variable force solenoid 3 "low". This provides zero CR pressure for the high clutch. This function is the same as it is for the dimensions of FIGS. 1 and 2. The reverse inhibitor valve is deleted for the modified or supplemental transmission corresponding to the transmission of FIG. 2.

The function of the deleted reverse inhibitor valve is provided by connecting SS2 pressure to the back (spring side) of the rear servo control valve 176. When the shift solenoid 190 is energized, the rear servo control valve 168 is locked in its downshift position. This connects the reverse servo feed pressure passage to the reverse servo. The reverse servo feed pressure circuit is exhausted through the intermediate servo control valve 176, which is in its downshift position. The exhaust port is shown at EX7 in FIG. 5d. The rear brake band B3 has zero capacity, thereby achieving the reverse inhibitor function.

Figure 38A:
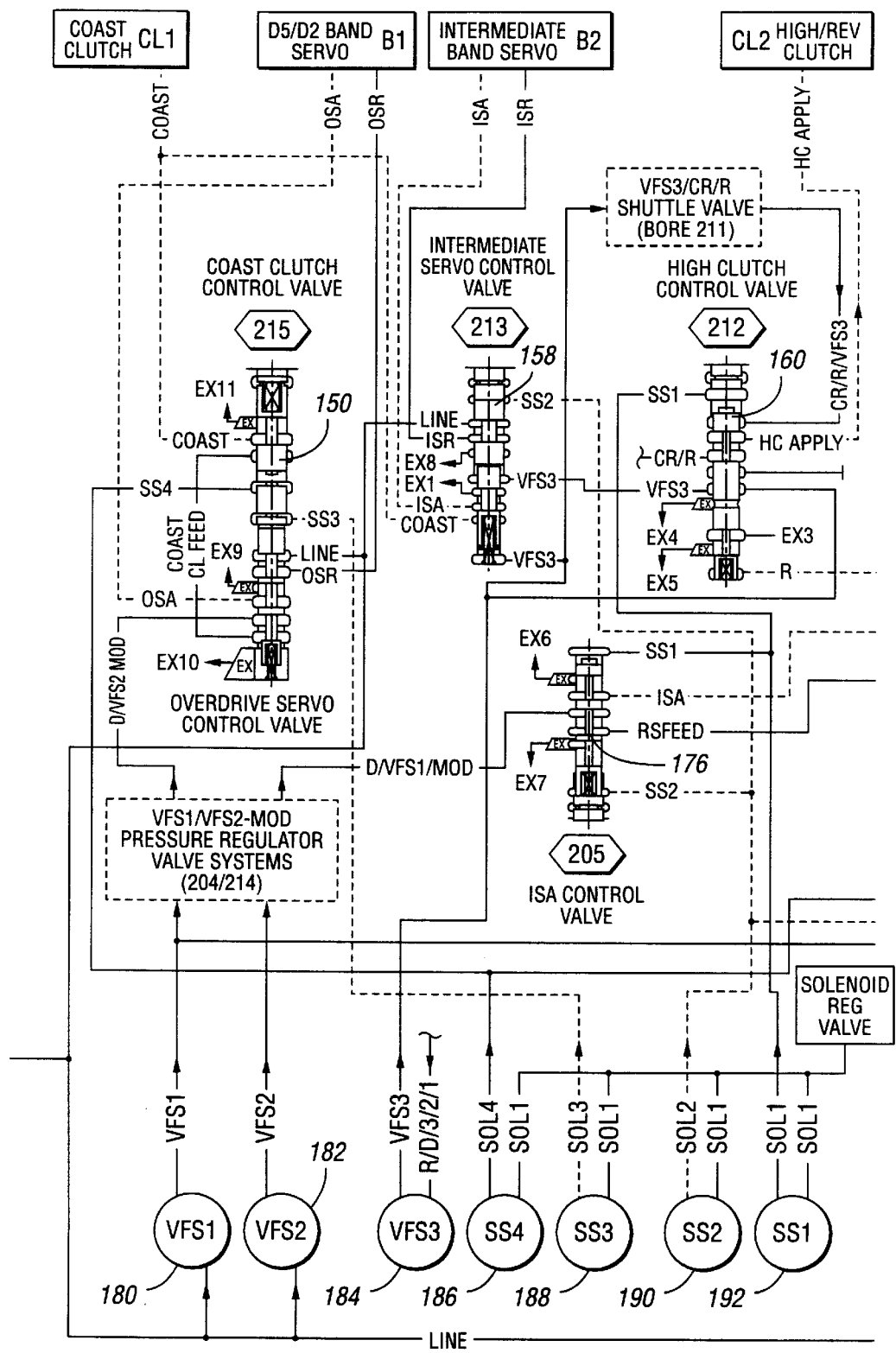
FIGS. 38a and 38b show a control system for preventing a "tie-up" condition for the high clutch CL2 and the reverse servo B3.
Figure 38B:
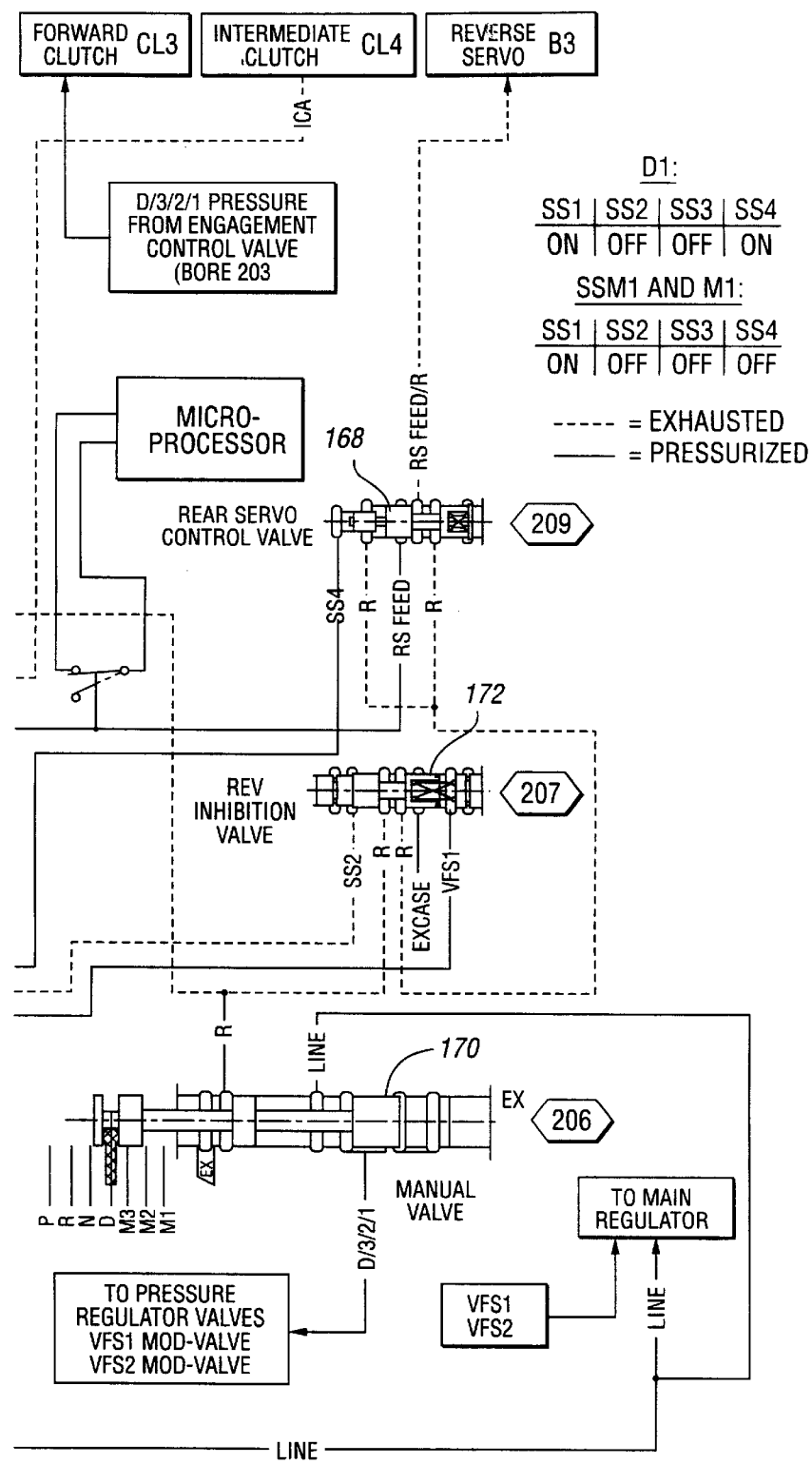

The transmission of FIG. 1 can generate a "tie-up" of the direct clutch CL2 and the reverse servo B3 are engaged at the same time. This can be triggered by a stuck ISA control valve 176 in downshift position. If SS4 is in upshift position, the rear servo B3 could be applied simultaneously with the high clutch CL2. FIGS. 38a and 38b show a design feature which prevents this event electronically. A pressure switch is added in the RS feed circuit which is located between the rear servo control valve 168 and the ISA control valve 176. The pressure switch provides input to the microprocessor. The switch, when closed, provides 12 volts to the microprocessor when the RS feed circuit is pressurized. If the RF feed circuit is exhausted, the switch is open and 0 voltage is input to the microprocessor. Depending on the "solenoid state", the RF feed circuit is pressurized or exhausted. If the "pressure state" of the RS feed circuit does not match the associated "solenoid state", a "stuck ISA control valve" at 176 in the downshift position has been detected which would trigger the previously described "tie-up" condition. Knowing that the RS-feed circuit state is high, SS7 will be energized to prevent the engagement of the rear servo.

Having described preferred embodiments of the invention, what we claim and desire to secure by U.S. Letters Patent is:

1. A transmission control system for a multiple ratio automatic transmission, said transmission comprising a first multiple ratio planetary gear set and a second simple planetary gear set arranged in series between an engine and a driven member, and an electronic transmission controller;

multiple clutches and brakes for controlling relative motion of gear elements of said first and second gear sets to establish five forward driving speed ratios;

a source of line pressure;

a valve circuit establishing fluid pressure distribution from said pressure source to said clutches and brakes including at least two variable force solenoid valves and at least three on/off shift solenoid valves;

brake servo control valve means in said circuit for controlling pressure distribution to said brakes and a clutch control valve means in said circuit for controlling pressure distribution to said clutches;

one of said variable force solenoid valves establishing controlled pressure distribution to the clutches and brakes for said multiple ratio planetary gear set through said brake servo control valve means and through said clutch control valve means;

another of said variable force solenoid valves establishing controlled pressure distribution to the clutches and brakes for said simple planetary gear set through said brake servo control valve means and through said clutch control valve means;

said shift solenoid valves communicating hydraulically with said brake servo control valve means and said clutch control valve means for effecting shifting movement thereof to establish and disestablish pressure distribution paths to said clutches and brakes whereby speed ratio change patterns are obtained;

a manual select system in said circuit between said electronic transmission controller and said clutch and brake servo control valve means having an automatic mode ratio change position for automatic ratio changes and multiple manual mode positions for effecting continuous manually selected ratios;

said controller having output driver portions communicating with said variable force solenoid valves and said shift solenoid valves and signal input portions receiving engine, transmission and manual select system operating variables whereby shift solenoid valve states are determined by said variables and by selected positions of said manual select system.

2. The control system as set forth in claim 1 wherein one of said multiple clutches acts on a gear element of said second gear set to establish a two-way torque flow path therethrough for forward drive and engine braking and one of said multiple brakes acts on a gear element of said first gear set to establish torque reaction during torque flow therethrough during forward drive and during engine braking.

3. The control system as set forth in claim 1 wherein said manual select system has an automatic drive range position and at least two manual shift positions, each manual shift position being dedicated to a given speed ratio for said first and second gear sets.

4. The control system as set forth in claim 2 wherein said manual select system has an automatic drive range position and at least two manual shift positions, each manual shift position being dedicated to a given speed ratio for said first and second gear sets.

5. The control system as set forth in claim 2 wherein said manual select system has an automatic drive range position and at least two manual shift positions, each manual shift position being dedicated to a given speed ratio for said first and second gear sets and providing engine braking in each of said manual shift positions for said first and second gear sets.

6. The control system as set forth in claim 3 wherein said manual select system includes select-shift manual switch means for activating selected ones of said shift solenoid valve states when said manual select system is in one of said manual shift positions whereby a manual upshift from a manually selected speed ratio and a manual downshift from a manually selected speed ratio are selectively accomplished.

7. The control system as set forth in claim 2 wherein said select system includes select-shift manual switch means for activating selected ones of said shift solenoid valve states when said manual select system is in one of said manual shift positions whereby engine braking in the manually selected speed ratios is provided.

8. A transmission control system for a multiple ratio automatic transmission, said transmission comprising a first multiple ratio planetary gear set and a second simple planetary gear set arranged in series between an engine and a driven member, and an electronic transmission controller;

multiple clutches and brakes for controlling relative motion of gear elements of said first and second gear sets to establish five forward driving speed ratios;

a source of line pressure;

a valve circuit establishing fluid pressure distribution from said pressure source to said clutches and brakes including at least two variable force solenoid valves and at least three on/off shift solenoid valves;

a pressure build-up system forming a part of said valve circuit;

brake servo control valve means in said circuit for controlling pressure distribution to said brakes and a clutch control valve means in said circuit for controlling pressure distribution to said clutches, each control valve means being in fluid pressure communication with said shift solenoid valves whereby the former are actuated by the latter selectively between two operating positions in accordance with the operating states of the latter;

one of said variable force solenoid valves establishing controlled pressure distribution to the clutches and brakes for said multiple ratio planetary gear set through said brake servo control valve means and through said clutch control valve means;

another of said variable force solenoid valves establishing controlled pressure distribution to the clutches and brakes for said simple planetary gear set through said brake servo control valve means and through said clutch control valve means;

said shift solenoid valve means communicating hydraulically with said brake servo control valve means and said clutch control valve means for effecting shifting movement thereof to establish and disestablish pressure distribution paths to said clutches and brakes whereby speed ratio change patterns are obtained;

a manual select system in said circuit between said electronic transmission controller and said clutch and brake servo control valve means having an automatic mode ratio change position for automatic ratio changes and multiple manual mode positions for effecting continuous manually selected ratios;

said controller having output driver portions communicating with said variable force solenoid valves and said shift solenoid valves and signal input portions receiving engine, transmission and manual select system operating variables whereby said shift solenoid valve operating states are determined by said variables and by selected positions of said manual select system;

said pressure build-up system comprising a first pressure modulator valve means communicating with a first of said variable force solenoid valves for distributing pressure through said clutch and brake servo control valve means to one of said clutches acting on gear elements of said first gear set and to one of said brakes for said first gear set and a second pressure modulator valve means communicating with a second of said variable force solenoid valves for distributing pressure through said clutch and brake servo control valve means to another of said clutches for said second gear set and to a brake for said second gear set whereby controlled clutch and brake pressure build-up is accomplished.

9. The control system as set forth in claim 8 wherein said pressure build-up system includes a third variable force solenoid valve communicating directly with a third of said clutches and with a third modulator valve means, said third clutch controlling relative motion of the gear elements of the first gear set to establish direct drive ratio in the first gear set, said third variable force solenoid valve means being dedicated to the control of the third clutch.

10. The control system set forth in claim 9 wherein said third of said clutches is a direct drive clutch for connecting together elements of said multiple ratio gear set to effect a ratio of unity.

11. The control system as set forth in claim 8 wherein said valve circuit includes a main regulator valve means communicating with said pressure source for maintaining a controlled pressure feed for said clutch control valve means and said brake servo control valve means;

said regulator valve means including separate valve pressure areas in fluid communication respectively with said first and second variable force solenoid valves whereby torque capacity of said clutches and brakes is maintained at all times including upshift events and downshift events.

12. The control system as set forth in claim 7 wherein said valve circuit includes a main regulator valve means communicating with said pressure source for maintaining a controlled pressure feed for said clutch control valve means and said brake servo control valve means;

said regulator valve means including separate valve pressure areas in fluid communication, respectively, with said first and second variable force solenoid valves whereby torque capacity of said clutches and brakes is maintained at all times including upshift events and downshift events.

13. A transmission control system for a multiple ratio automatic transmission, said transmission comprising a first multiple ratio planetary gear set and a second simple planetary gear set arranged in series between an engine and a driven member, and an electronic transmission controller responsive to engine and transmission operating variables;

multiple clutches and brakes for controlling relative motion of gear elements of said first and second gear sets to establish five forward driving speed ratios;

a source of line pressure;

a valve circuit establishing fluid pressure distribution from said pressure source to said clutches and brakes including at least two variable force solenoid valves and at least three on/off shift solenoid valves;

a pressure build-up system forming a part of said valve circuit;

brake servo control valve means in said circuit for controlling pressure distribution to at least one of said brakes and a clutch control valve means in said circuit for controlling pressure distribution to at least one of said clutches;

first and second modulator control valve means communicating respectively with separate ones of said variable force solenoids for modulating said line pressure to produce a modulated variable force solenoid pressure;

said first modulator control valve means communicating with said brake servo control valve means and said clutch control valve means whereby modulated variable force solenoid pressure is distributed through said clutch control valve means to one of said clutches acting on gear elements of said first gear set and to one of said brakes for said first gear set, said second servo modulator control valve means communicating with said second variable force solenoid valve for distributing pressure through said clutch control valve means to another of said clutches for said second gear set and to a brake for said second gear set whereby controlled clutch and brake pressure build-up is accomplished;

said variable force solenoid valves establishing controlled pressure distribution to said clutches and brakes through said brake servo control valve means and through said clutch control valve means;

said shift solenoid valves communicating hydraulically with said brake servo control valve means and said clutch control valve means for effecting shifting movement thereof to establish and disestablish pressure distribution paths to said clutches and brakes, whereby speed ratio change patterns are obtained as determined by the operating states of said shift solenoid valve means; and a manual select system in said circuit between said electronic transmission controller and said clutch control valve means and said brake servo control valve means having an automatic mode ratio change position for automatic ratio changes and multiple manual mode positions for effecting continuous manually selected ratios;

said controller having output driver portions communicating with said variable force solenoid valves and said shift solenoid valves and signal input portions receiving engine, transmission and manual select system operating variables whereby said shift solenoid valve operating states are determined by said variables and by selected positions of said manual select system;

the operating states of said variable force solenoid valves thereby determining the torque capacity of said clutches and brakes during operation including start-up torque capacity in any transmission ratio.

14. The control system as set forth in claim 13 wherein separate ones of said shift solenoid valves communicate with said brake servo control valve means and said clutch control valve means, said manual select system variables from said transmission controller, when the manual select system is in selected manual mode positions, communicating with said brake servo control valve means and said clutch control valve means whereby engine braking is effected.

15. The control valve system as set forth in claim 11 including a lubrication oil supply passage and separate transmission lubrication oil flow circuits for separate regions of said transmission and a transmission lubrication and cooler, said regulator valve means including a regulating valve land controlling oil flow to said lubrication oil supply passage, and lubrication oil flow control valve means in said lubrication oil flow circuits for distributing lubrication oil to said cooler and said lubrication oil flow circuits when oil flow from said regulator valve means is greater than a predetermined value and for distributing lubrication oil solely to said lubrication oil flow circuit when oil flow from said regulator valve means is less than said predetermined value.

16. The transmission control system as set forth in claim 11 including a reverse brake servo means for establishing a torque reaction during reverse drive and a reverse ratio inhibitor valve means communicating with one of said shift solenoid valves for exhausting said reverse brake servo means independently of the operating states of the other shift solenoid valves.

17. The control system as set forth in claim 13 wherein said transmission includes a reverse brake for anchoring a reaction gear element in said first multiple ratio gear set, said control system comprising a reverse brake servo and a reverse brake servo control valve means for applying and releasing said reverse brake;

a pressure switch means for monitoring pressure distribution between said brake servo control valve means and said reverse brake servo;

said pressure switch means communicating with said valve circuit for detecting an inoperable reverse brake servo control valve means;

said electronic transmission controller communicating with said pressure switch whereby shift solenoid valve states are determined thus preventing simultaneous engagement of said clutches and brakes for forward drive.

\* \* \* \* \*